(12) United States Patent
Li et al.

(10) Patent No.: US 7,998,542 B2
(45) Date of Patent: *Aug. 16, 2011

(54) COMPOSITION, RETARDATION PLATE, LIQUID-CRYSTAL DISPLAY DEVICE, AND METHOD FOR PRODUCING RETARDATION PLATE

(75) Inventors: Yi Li, Minami-ashigara (JP); Masaru Yoshikawa, Minami-ashigara (JP); Makoto Takahashi, Minami-ashigara (JP); Takafumi Hosokawa, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 221 days.

This patent is subject to a terminal disclaimer.

(21) Appl. No.: 12/223,070

(22) PCT Filed: Jan. 23, 2007

(86) PCT No.: PCT/JP2007/051328
§ 371 (c)(1),
(2), (4) Date: Nov. 5, 2008

(87) PCT Pub. No.: WO2007/083848
PCT Pub. Date: Jul. 26, 2007

(65) Prior Publication Data
US 2009/0174844 A1    Jul. 9, 2009

(30) Foreign Application Priority Data

Jan. 23, 2006 (JP) ................. 2006-014040
Nov. 7, 2006 (JP) ................. 2006-301196

(51) Int. Cl.
*C09K 19/34* (2006.01)
*C09K 19/32* (2006.01)
*C09K 19/12* (2006.01)
*C09K 19/20* (2006.01)
*C09K 19/38* (2006.01)
*G02F 1/13363* (2006.01)

(52) U.S. Cl. ............ 428/1.1; 252/299.61; 252/299.62; 252/299.66; 252/299.67; 349/117

(58) Field of Classification Search ............ 428/1.1; 349/117; 252/299.61, 299.62, 299.66, 299.67
See application file for complete search history.

(56) References Cited

FOREIGN PATENT DOCUMENTS

| | | |
|---|---|---|
| EP | 1 506 991 A2 | 2/2005 |
| JP | 7-191305 A | 7/1995 |
| JP | 8-50206 A | 2/1996 |
| JP | 2000-327924 A | 11/2000 |
| JP | 2002-129162 A | 5/2002 |
| JP | 2005-179636 A | 7/2005 |
| JP | 2005-316234 A | 11/2005 |
| JP | 2006-276203 A | 10/2006 |

OTHER PUBLICATIONS

English translation by computer for JP 2000-327924, http://www4.ipdl.inpit.go.jp/Tokujitu/PAJdetail.ipdl?N0000=60&N0120=01&N2001=2&N3001=2000-327924.*
Notification Concerning Transmittal of International Preliminary Report on Patentability (Form PCT/IB/326), International Preliminary Report on Patentability (Form PCT/IB/373), Written Opinion of the International Search Authority (Form PCT/ISA/237) mailed in corresponding International Patent Application No. PCT/JP2007/051328, Jul. 29, 2008, The International Bureau of WIPO, Geneva, CH.
PCT/ISA/210 and PCT/ISA/237, 2007.

* cited by examiner

*Primary Examiner* — Shean C Wu
(74) *Attorney, Agent, or Firm* — Buchanan Ingersoll & Rooney PC

(57) ABSTRACT

A composition comprising at least one liquid-crystal compound and a polymer having at least one group of the following formula:

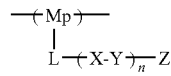

wherein Mp represents a trivalent linking group; L represents a single bond, or a divalent linking group; X represents a substituted or unsubstituted cyclic linking group; Y represents a single bond, or a divalent linking group; Z represents a substituted or unsubstituted cyclic group; n is 1 to 10.

14 Claims, No Drawings

COMPOSITION, RETARDATION PLATE, LIQUID-CRYSTAL DISPLAY DEVICE, AND METHOD FOR PRODUCING RETARDATION PLATE

BACKGROUND OF THE INVENTION

1. Field of the Invention

The present invention relates to a composition useful for forming an optically-anisotropic layer, to a retardation plate produced with the composition, and to a method for producing the retardation plate.

2. Background Art

A liquid-crystal display device generally comprises a liquid-crystal cell sandwiched between a first polarizer and a second polarizer, in which the liquid-crystal cell has a liquid-crystal layer containing a rod-shaped liquid-crystal compound between a pair of substrates. In case where the retardation to occur inside the rod-shaped liquid-crystal compound-containing liquid-crystal cell is to be canceled by an optical compensatory sheet that has an optically-anisotropic layer formed of a discotic liquid-crystal compound (e.g., 2,3,6,7,10,11-hexa{4-(4-acryloyloxyhexyloxy)benzoyloxy}triphenylene) (for example, as in JP-A-8-50206), it is impossible to simultaneously cancel the retardation for the wavelengths of all light since the wavelength dispersion of the rod-shaped liquid-crystal compound differs from that of the discotic liquid-crystal compound, therefore often resulting in discoloration (for example, failure in black coloration).

A benzene compound tri-substituted with a heterocyclic group is reported (Molecular Crystals and Liquid Crystals, 2001, Vol. 370, p. 391). It is not easy to attain low wavelength dispersion by the use of the compound, and a compound having a smaller wavelength dispersion [having a smaller value of Re (short wavelength (e.g., 450 nm))/Re (long wavelength (e.g., 650 nm))] is desired.

The retardation $Re(\lambda)$ of a retardation plate must be determined in accordance with the optical properties of the liquid-crystal cell that the retardation plate is to compensate. The retardation ($\Delta nd$) is a product of the refractive anisotropy ($\Delta n$) of an optically-anisotropic layer and the thickness (d) of the optically-anisotropic layer; and an optically-anisotropic layer having a large refractive anisotropy ($\Delta n$) can compensate a liquid-crystal cell even though the thickness (d) of the layer is small. Regarding a retardation plate where the liquid crystal is aligned and fixed, the retardation Re of the plate varies depending on the tilt angle (mean tilt angle) of the aligned liquid crystal in the plate, and therefore the tilt angle in the retardation plate of the type must be controlled.

However, it is difficult to control the tilt angle of a heterocyclic group-substituted, tri-substituted benzene-type discotic liquid-crystal compound, and in particular, it is difficult to hybrid-align the compound at a low tilt angle, and therefore, an alignment controller capable of lowering the tilt angle of a discotic liquid-crystal compound to a desired angle is desired.

On the other hand, examples of adding an alignment controller or an alignment promoter to a liquid-crystal compound are disclosed, but the effect of the controller or the promoter for a tri-substituted benzene-type discotic liquid-crystal compound is not clarified, and the related art is unsatisfactory for controlling the tilt angle of the compound to a desired angle (JP-A-2002-129162).

Regarding tilt angle control, it is desired that the tilt angle change is small even though the temperature in polymerization varies, but the temperature dependence of tilt angle is great and it is desired to solve the problem.

SUMMARY OF THE INVENTION

An object of the invention is to provide a composition useful for stably forming an optically-anisotropic layer that contributes to optical compensation in liquid-crystal display devices. In particular, it is to provide a composition useful for forming an optically-anisotropic layer of which the optical anisotropy is expressed by the hybrid alignment of a discotic liquid-crystal compound therein, with no (or little) defects caused by fluctuation of optical characteristics or by alignment failure.

Another object of the invention is to provide a retardation plate useful for optical compensation in liquid-crystal display devices.

For attaining the objects, the invention provides the following:

(1) A composition comprising at least one liquid-crystal compound and a polymer having at least one group of the following formula (A) as the constitutive unit thereof:

wherein Mp represents a trivalent linking group; L represents a single bond, or a divalent linking group; X represents a substituted or unsubstituted cyclic linking group; Y represents a single bond, or a divalent linking group; Z represents a substituted or unsubstituted cyclic group; n indicates an integer of from 1 to 10; when n is 2 or more, then X's and Y's may be the same or different.

(2) The composition of (1), wherein X in formula (A) is a liquid-crystalline group.

(3) The composition of (1) or (2), wherein X in formula (A) is a substituted or unsubstituted cyclic aliphatic group having from 3 to 20 carbon atoms, or a substituted or unsubstituted phenylene group having from 6 to 30 carbon atoms.

(4) The composition of any one of (1) to (3), wherein in formula (A), Mp is the following Mp-1 or Mp-2:

wherein * indicates the linking position to L;

and L is a divalent linking group selected from —O—, —NR$^{a11}$— (where R$^{a11}$ represents a hydrogen atom, a substituted or unsubstituted aliphatic hydrocarbon group having from 1 to 10 carbon atoms, or a substituted or unsubstituted aryl group having from 6 to 20 carbon atoms), —S—, —C(=O)—, —S(=O)$_2$—, and a substituted or unsubstituted alkylene group having from 1 to 20 carbon atoms, and a group formed by linking two or more of these.

(5) The composition of any one of (1) to (4), wherein in formula (A), Y is a single bond, or a divalent linking group selected from —O—, —NR$^{a12}$— (where R$^{a12}$ represents a hydrogen atom, a substituted or unsubstituted aliphatic hydrocarbon group having from 1 to 10 carbon atoms, or a substituted or unsubstituted aryl group having from 6 to 20 carbon atoms), —S—, —C(=O)—, and —S(=O)$_2$—, and a group formed by linking two or more of these; Z is a substituted or unsubstituted phenyl group; and n is an integer of from 1 to 4.

(6) The composition of any one of (1) to (5), wherein the polymer further has a constitutive unit derived from a fluoroaliphatic group-having monomer.

(7) The composition of any one of (1) to (6), which contains a polymer not having a group of formula (A) as the constitutive unit thereof but having a constitutive unit derived from a fluoroaliphatic group-having monomer.

(8) The composition of any one of (1) to (6), which contains a polymer not having a group of formula (A) as the constitutive unit thereof but having a constitutive unit derived from a fluoroaliphatic group-having monomer and having a hydrophilic group.

(9) The composition of any one of (1) to (6), which contains a polymer having a repetitive unit of the following formula (F):

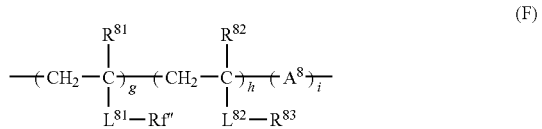

wherein R$^{81}$ and R$^{82}$ each independently represent a hydrogen atom or a methyl group; L$^{81}$ and L$^{82}$ each independently represent a single bond or a divalent linking group having from 1 to 20 carbon atoms; Rf" represents a fluoroalkyl group having from 1 to 30 carbon atoms; R$^{83}$ represents a hydrogen atom or a hydrophilic group; A$^8$ represents a polymerization unit; g, h and i each indicate a mass fraction of the respective polymerization units.

(10) The composition of any one of (1) to (9), wherein at least one liquid-crystal compound has a viscosity of from 500 to 1000 mPa·s at 80 to 150° C.

(11) The composition of any one of (1) to (10), wherein at least one liquid-crystal compound is represented by the following formula (DI):

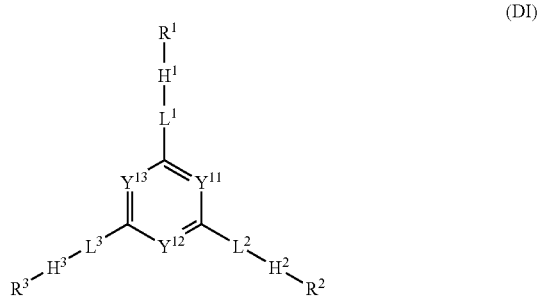

wherein Y$^{11}$, Y$^{12}$ and Y$^{13}$ each independently represent a methine group or a nitrogen atom; L$^1$, L$^2$ and L$^3$ each independently represent a single bond or a divalent linking group; H$^1$, H$^2$ and H$^3$ each independently represent the following formula (DI-A) or (DI-B); R$^1$, R$^2$ and R$^3$ each independently represent the following formula (DI-R):

wherein YA$^1$ and YA$^2$ each independently represent a methine group or a nitrogen atom; XA represents an oxygen atom, a sulfur atom, a methylene group or an imino group; * indicates the position at which the formula bonds to any of L$^1$ to L$^3$; and ** indicates the position at which the formula bonds to any of R$^1$ to R$^3$,

wherein YB$^1$ and YB$^2$ each independently represent a methine group or a nitrogen atom; XB represents an oxygen atom, a sulfur atom, a methylene group or an imino group; * indicates the position at which the formula bonds to any of L$^1$ to L$^3$; and ** indicates the position at which the formula bonds to any of R$^1$ to R$^3$,

wherein * indicates the position at which the formula bonds to H$^1$, H$^2$ or H$^3$ in formula (DI); F$^1$ represents a divalent linking group having at least one cyclic structure; L$^{21}$ represents a single bond or a divalent linking group; n1 indicates an integer of from 0 to 4; L$^{22}$ represents —O—, —O—CO—, —CO—O—, —O—CO—O—, —S—, —NH—, —SO$_2$—, —CH$_2$—, —CH=CH— or —C≡C—, L$^{23}$ represents a divalent linking group selected from —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; Q$^1$ represents a polymerizing group or a hydrogen atom.

(12) The composition of any one of (1) to (11), wherein at least one liquid-crystal compound is a liquid-crystal compound of the following formula (DII) or a liquid-crystal compound of the following formula (DIII):

wherein Y$^{31}$, Y$^{32}$ and Y$^{33}$ each independently represent a methine group or a nitrogen atom; R$^{31}$, R$^{32}$ and R$^{33}$ each independently represent the following formula (DII-R):

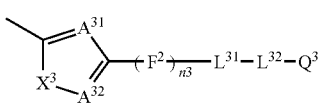
(DII-R)

wherein $A^{31}$ and $A^{32}$ each independently represent a methine group or a nitrogen atom; $X^3$ represents an oxygen atom, a sulfur atom, a methylene group or an imino group; $F^2$ represents a divalent cyclic linking group having a 6-membered cyclic structure; n3 indicates an integer of from 1 to 3; $L^{31}$ represents —O—, —O—CO—, —CO—O—, —O—CO—O—, —S—, —NH—, —SO$_2$—, —CH$_2$—, —CH=CH— or —C≡C—, $L^{32}$ represents a divalent linking group selected from —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^3$ represents a polymerizing group or a hydrogen atom,

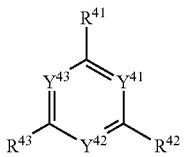
(DIII)

wherein $Y^{41}$, $Y^{42}$ and $Y^{43}$ each independently represent a methine group or a nitrogen atom; $R^{41}$, $R^{42}$ and $R^{43}$ each independently represent the following formula (DIII-A), (DIII-B) or (DIII-C):

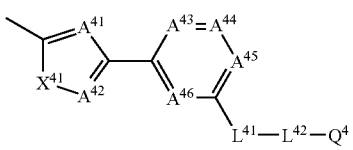
(DIII-A)

wherein $A^{41}$, $A^{42}$, $A^{43}$, $A^{44}$, $A^{45}$ and $A^{46}$ each independently represent a methine group or a nitrogen atom; $X^{41}$ represents an oxygen atom, a sulfur atom, a methylene group or an imino group; $L^{41}$ represents —O—, —O—CO—, —CO—O—, —O—CO—O—, —S—, —NH—, —SO$_2$—, —CH$_2$—, —CH=CH— or —C≡C—, $L^{42}$ represents a divalent linking group selected from —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^4$ represents a polymerizing group or a hydrogen atom,

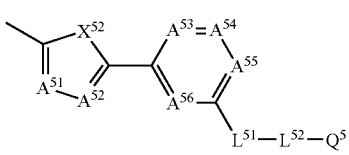
(DIII-B)

wherein $A^{51}$, $A^{52}$, $A^{53}$, $A^{54}$, $A^{55}$ and $A^{56}$ each independently represent a methine group or a nitrogen atom; $X^{52}$ represents an oxygen atom, a sulfur atom, a methylene group or an imino group; $L^{51}$ represents —O—, —O—CO—, —CO—O—, —O—CO—O—, —S—, —NH—, —SO$_2$—, —CH$_2$—, —CH=CH— or —C≡C—, $L^{52}$ represents a divalent linking group selected from —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^5$ represents a polymerizing group or a hydrogen atom,

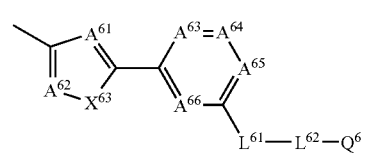
(DIII-C)

wherein $A^{61}$, $A^{62}$, $A^{63}$, $A^{64}$, $A^{65}$ and $A^{66}$ each independently represent a methine group or a nitrogen atom; $X^{63}$ represents an oxygen atom, a sulfur atom, a methine group or an imino group; $L^{61}$ represents —O—, —O—CO—, —CO—O—, —O—CO—O—, —S—, —NH—, —SO$_2$—, —CH$_2$—, —CH=CH— or —C≡C—, $L^{62}$ represents a divalent linking group selected from —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^6$ represents a polymerizing group or a hydrogen atom.

(13) A retardation plate having an optically-anisotropic layer formed with a composition of any one of (1) to (12).

(14) A liquid-crystal display device having a retardation plate of (13).

(15) A method for producing a retardation plate, which comprises forming an optically-anisotropic layer with a composition of any one of (1) to (12).

The invention provides a composition useful for stably forming an optically-anisotropic layer that contributes to optical compensation in liquid-crystal display devices. In particular, the invention provides a composition useful for forming an optically-anisotropic layer in which the mean tilt angle of the hybrid-aligned discotic liquid-crystal compound can be accurately controlled to fall within a range of from 10 to 40° and in which the mean tilt angle fluctuation caused by some slight change in the alignment temperature of the compound can be reduced.

DETAILED DESCRIPTION OF THE INVENTION

The invention is described in detail hereinunder. In this description, the numerical range expressed by the wording "a number to another number" means the range that falls between the former number indicating the lowermost limit of the range and the latter number indicating the uppermost limit thereof.

"Group" of an alkyl group and others in the invention may have a substituent or many not have a substituent, unless otherwise specifically indicated. Accordingly, for example, in an expression of "alkyl group having from A to B carbon atoms (where A and B are numerals)", the alkyl group may or may not have a substituent. When the group has a substituent, it should be so interpreted that the scope of from A to B carbon atoms which indicates the number of the carbon atoms constituting the group includes the carbon atoms constituting the substituent of the group.

Re(λ), Rth(λ), tilt angle and mean tilt angle as referred to in this description are described in detail hereinunder.

In this description, Re(λ) and Rth(λ) are an in-plane retardation and a thickness direction retardation, respectively, of a film at a wavelength of λ. Re(λ) is determined by applying light having a wavelength of λ nm to a film in the normal direction of the film, using KOBRA 21ADH (by Oji Scientific Instruments). Rth(λ) is determined as follows: Based on three retardation data determined in three different directions, or that is, Re(λ) as above, a retardation value measured by applying light having a wavelength of 1 nm to the sample in the direction tilted by +40° relative to the normal direction of the film with the slow axis (judged by KOBRA 21ADH) as the tilt axis (rotation axis) thereof, and a retardation value measured by applying light having a wavelength of λ nm to the sample in the direction tilted by −40° relative to the normal direction of the film with the slow axis as the tilt axis thereof, Rth(λ) is computed by KOBRA 21ADH. For this, an estimated value of the mean refractivity of the film and the film thickness must be inputted to the instrument. For the estimated value of the mean refractivity of films, usable are the data given in Polymer Handbook (John Wiley & Sons, Inc.) and the data given in catalogs of various optical films. When the mean refractivity of a film is unknown, it may be measured with an Abbe's refractometer. Data of the mean refractivity of some typical optical films are as follows: Cellulose acylate (1.48), cyclo-olefin polymer (1.52), polycarbonate (1.59), polymethyl methacrylate (1.49), polystyrene (1.59).

The mean tilt angle of the discotic liquid-crystal compound molecule in an optically-anisotropic layer as referred to in this description is described. The angle formed by one face of an optically-anisotropic layer (in the retardation plate of the invention, this is the surface of the layer that faces the alignment film therein) and the physical symmetric axis of the discotic liquid-crystal compound molecule in the optically-anisotropic layer is a tilt angle θ1; and the angle formed by the other face of the optically-anisotropic layer (in the retardation plate of the invention, this is the interface of the layer to air) and the physical symmetric axis thereof is a tilt angle θ2, and the mean value ((θ1+θ2)/2) is the mean tilt angle. However, it is difficult to accurately and directly measure the tilt angle θ1 to one face of the layer and the tilt angle θ2 to the other face thereof. Therefore, in this description, θ1 and θ2 are computed as follows: This method could not accurately express the actual alignment state of discotic liquid-crystal compound molecules, but may be effective as a means for indicating the relative relationship of some optical characteristics of an optical film.

In this method, the following two points are assumed for facilitating the computation, and the tilt angle at two interfaces of an optically-anisotropic layer is determined.

1. It is assumed that an optically-anisotropic layer is a multi-layered structure that comprises a layer containing discotic compounds and rod-shaped compounds. It is further assumed that the minimum unit layer constituting the structure (on the assumption that the tilt angle of the discotic compounds and the rod-shaped compounds is uniform inside the layer) is an optically-monoaxial layer.

2. It is assumed that the tilt angle in each layer varies monotonously as a linear function in the direction of the thickness of an optically-anisotropic layer.

A concrete method for computation is as follows:

(1) In a plane in which the tilt angle in each layer monotonously varies as a linear function in the direction of the thickness of an optically-anisotropic layer, the incident angle of light to be applied to the optically-anisotropic layer is varied, and he retardation is measured at three or more angles. For simplifying the measurement and the computation, it is desirable that the retardation is measured at three angles of −40°, 0° and +40° relative to the normal direction to the optically-anisotropic layer of being at an angle of 0°. For the measurement, for example, used are KOBRA-21ADH and KOBRA-WR (by Oji Scientific Instruments), and transmission ellipsometers AEP-100 (by Shimadzu), M150 and M520 (by Nippon Bunko) and ABR10A (by Uniopt).

(2) In the above model, the refractive index of each layer for normal light is represented by n0; the refractive index thereof for abnormal light is by ne (ne is the same in all layers, and the same shall apply to n0); and the overall thickness of the multi-layer structure is by d. On the assumption that the tilting direction in each layer and the monoaxial optical axis direction of the layer are the same, the tilt angle θ1 in one face of the optically-anisotropic layer and the tilt angle θ2 in the other face thereof are fitted as variables in order that the calculated data of the angle dependence of the retardation of the optically-anisotropic layer could be the same as the found data thereof, and θ1 and θ2 are thus computed.

In this, n0 and ne may be those known in literature and catalogues. When they are unknown, they may be measured with an Abbe's refractometer. The thickness of the optically-anisotropic layer may be measured with an optical interference thickness gauge or on a photograph showing the cross section of the layer taken by a scanning electronic microscope.

The composition and the retardation plate of the invention are sequentially described below.

The composition of the invention contains at least one liquid-crystal compound and a polymer having at least one group of the following formula (A) as the constitutive unit thereof (hereinafter this may be referred to as "polymer for use in the invention"). The polymer for use in the invention, and liquid-crystal compounds preferred for use in the invention are sequentially described below. Polymer having a group of formula (A) as its constitutive unit:

(1) Group of Formula (A):

(A)

wherein Mp represents a trivalent linking group; L represents a single bond, or a divalent linking group; X represents a substituted or unsubstituted cyclic linking group; Y represents a single bond, or a divalent linking group; Z represents a substituted or unsubstituted cyclic group; n indicates an integer of from 1 to 10, provided that, when n is 2 or more, then X's and Y's may be the same or different.

In formula (A), Mp is a trivalent linking group, and it forms the backbone chain of the polymer for use in the invention. As will be described hereinunder, the backbone chain of the polymer may contain any other repetitive unit than this. Mp is preferably a substituted or unsubstituted linear or branched alkylene group having from 2 to 20 carbon atoms (the number of the carbon atoms constituting the group does not include the number of the carbon atoms constituting the substituent of the group—the same shall apply to the others of Mp) (e.g., ethylene group, propylene group, methylethylene group, butylene group, hexylene group), a substituted or unsubstituted cyclic alkylene group having from 3 to 10 carbon atoms (e.g., cyclopropylene group, cyclobutylene group, cyclohexylene group), a substituted or unsubstituted vinylene group, a substituted or unsubstituted cyclic vinylene group, a substituted or unsubstituted phenylene group, an oxygen atom-having group (e.g., groups containing any of ether group, acetal group, ester group, carbonate group), a nitrogen atom-having group (e.g., groups containing any of amino group, imino group, amido group, urethane group, ureido group, imido group, imidazole group, oxazole group, pyrrole group, anilide group, maleimido group) a sulfur atom-having group (e.g., groups containing any of sulfido group, sulfone group, thiophene group), a phosphorus atom-having group (e.g., groups containing any of phosphine group, phosphate group), a silicon atom-having group (e.g., groups containing siloxane group), or a group formed by linking two or more of these groups, in which one hydrogen is substituted with -L-X; more preferably it is a substituted or unsubstituted ethylene group, a substituted or unsubstituted methylethylene group, a substituted or unsubstituted cyclohexylene group, a substituted or unsubstituted vinylene group, in which one hydrogen atom is substituted with -L-X; even more preferably it is a substituted or unsubstituted ethylene group, a substituted or unsubstituted methylethylene group, a substituted or unsubstituted vinylene group, in which one hydrogen atom is substituted with -L-X; still more preferably a substituted or unsubstituted ethylene group, or a substituted or unsubstituted methylethylene group in which one hydrogen atom is substituted with -L-X. Concretely, Mp-1 and Mp-2 mentioned below are preferred.

Preferred examples of Mp are shown below, to which, however, Mp should not be limited. In the following examples of Mp, the position indicated by * means the position at which the formula bonds to L.

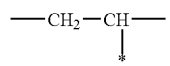

(Mp-1)

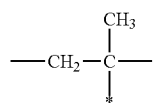

(Mp-2)

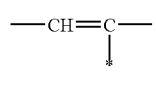

(Mp-3)

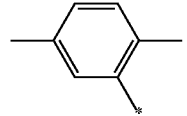

(Mp-4)

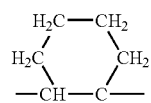

(Mp-5)

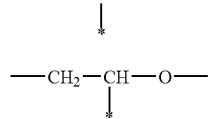

(Mp-6)

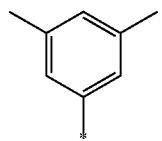

(Mp-7)

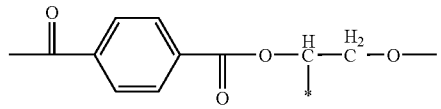

(Mp-8)

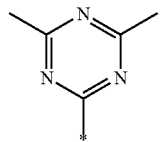

(Mp-9)

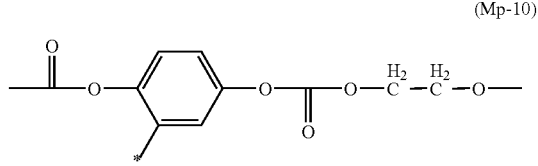

(Mp-10)

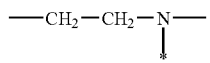

(Mp-11)

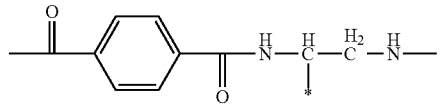

(Mp-12)

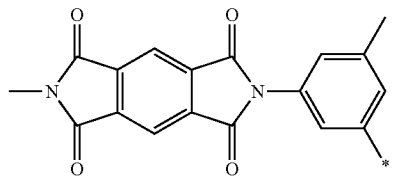

(Mp-13)

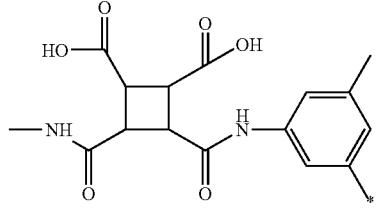

(Mp-14)

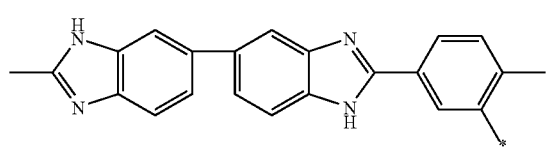

(Mp-15)

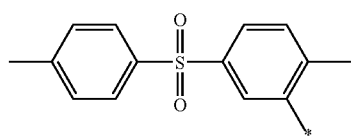

(Mp-16)

-continued

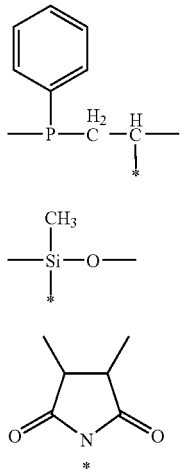

(Mp-17)

(Mp-18)

(Mp-19)

-Mp(L)- is preferably a group having a structure of only any one or more of —CR$_2$—CRL- (where R represents a hydrogen atom or a substituent) and —CR=CL- (where R represents a hydrogen atom or a substituent); more preferably a group having a structure of —CR$_2$—CRL- (where R represents a hydrogen atom or a substituent) alone; even more preferably —CR$_2$—CRL- (where R represents a hydrogen atom or a substituent); still more preferably Mp-1 or Mp-2.

The divalent linking group L in formula (A) includes a substituted or unsubstituted alkylene group having from 1 to 20 carbon atoms (e.g., methylene group, ethylene group, propylene group, butylene group, isopropylene group), a substituted or unsubstituted alkenylene group having from 2 to 20 carbon atoms (e.g., vinylene group, butene group), a substituted or unsubstituted arylene group (e.g., o-phenylene group, m-phenylene group, p-phenylene group, 1,4-naphthylene group), —O—, —NR$^{a1}$—, —S—, —PR$^{a2}$—, —Si(R$^{a3}$)(R$^{a4}$), —C(=O)—, —C(=O)O—, —C(=O)NR$^{a5}$, —OC(=O)O—, —OC(=O)NR$^{a6}$—, —NR$^{a7}$C(=O)NR$^{a8}$, —(—O)$_2$CH—. R$^{a1}$ to R$^{a8}$ each represents a hydrogen atom or a substitutable substituent, including, for example, a hydrogen atom, a halogen atom, an alkyl group (including a cycloalkyl group such as a monocycloalkyl group and a bicycloalkyl group having one or more cyclic structures), an alkenyl group (including a cycloalkenyl group, a bicycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic-oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic-thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclicazo group, an imido group, a phosphino group, a phosphinyl group, a phosphinyloxy group, a phosphinylamino group, a silyl group.

In addition, L may also be a group formed by linking two or more of the above-mentioned linking groups, for example, as shown below. In L, the position indicated by * is the position at which the group bonds to Mp.

In the following L-1 to L-7, m indicates an integer of from 1 to 20. m is preferably an integer of from 1 to 16, more preferably an integer of from 3 to 12, even more preferably an integer of 3 to 6, for suitably controlling the degree of freedom of X and Z. Suitably controlling the degree of freedom of X and Z increases the interaction between the polymer and the liquid crystal to be aligned, whereby the orientation of X and Z may be more suitably controlled and the pretilt angle of the liquid crystal to be aligned may be more effectively controlled.

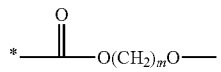

(L-1)

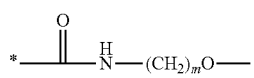

(L-2)

(L-3)

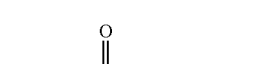

(L-4)

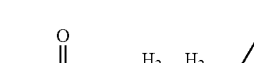

(L-5)

(L-6)

(L-7)

In formula (A), L is more preferably a divalent linking group selected from —O—, —NR$^{a11}$— (where R$^{a11}$ represents a hydrogen atom, a substituted or unsubstituted aliphatic hydrocarbon group having from 1 to 10 carbon atoms, or a substituted or unsubstituted aryl group having from 6 to 20 carbon atoms), —S—, —C(=O)—, —S(=O)$_2$—, and a substituted or unsubstituted alkylene group having from 1 to 20 carbon atoms, and a group formed by linking two or more of these.

The linking group formed by linking two or more of the above-mentioned groups includes —C(=O)O—, —OC(=O)—, —OC(=O)O—, —C(=O)NH—, —NHC(=O)—, —C(=O)O(CH$_2$)$_m$O— (where m has the same meaning as that of m in (L-1) to (L-7), and its preferred range is also the same as that therein).

In case where Mp in formula (A) is (Mp-1) or (Mp-2), L is preferably a divalent linking group selected from —O—, —NR$^{a11}$— (where R$^{a11}$ represents a hydrogen atom, a substituted or unsubstituted aliphatic hydrocarbon group having from 1 to 10 carbon atoms, or a substituted or unsubstituted aryl group having from 6 to 20 carbon atoms), —S—, —C(=O)—, —S(=O)$_2$—, and a substituted or unsubstituted alkylene group having from 1 to 20 carbon atoms, and a group formed by linking two or more of these; more preferably a group selected from —O—, —C(=O)O—, —C(=O)NH—, and a divalent linking group of a combination of one or more of these with an alkylene group. For example, it is (L-1), (L-2) or (L-3) mentioned above.

The substituted or unsubstituted cyclic linking group for X in formula (A) includes a substituted or unsubstituted cyclic aliphatic group having from 3 to 20 carbon atoms, a substituted or unsubstituted phenylene group having from 6 to 30 carbon atoms, a saturated or unsaturated, substituted or unsubstituted heterocyclic linking group, and is preferably a substituted or unsubstituted cyclic aliphatic group having from 3 to 20 carbon atoms, or a substituted or unsubstituted phenylene group having from 6 to 30 carbon atoms.

More preferably, the substituted or unsubstituted cyclic aliphatic group having from 3 to 20 carbon atoms has from 3 to 15 carbon atoms, and, for example, the group includes a cyclopropylene group, an unsubstituted cyclopentylene group, a cyclohexylene group. The substituent includes an alkyl group, a halogen atom, a nitro group, a cyano group, a carboxyl group, an alkoxy group, an aryloxy group. More preferably, the substituted or unsubstituted phenylene group having from 6 to 30 carbon atoms has from 6 to 20 carbon atoms, and for example, the group includes an o-phenylene group, an m-phenylene group, a p-phenylene group, a methoxyphenylene group, a methylphenylene group, a trifluorophenylene group. The substituent includes an alkyl group, a halogen atom, a nitro group, a carboxyl group, an alkoxy group, an aryloxy group.

More preferably, the saturated or unsaturated, substituted or unsubstituted heterocyclic linking group has from 3 to 15 carbon atoms, and for example, the group includes a pyridine ring linking group, a piperidine ring linking group, a furan ring linking group, a benzimidazole ring linking group, an imidazole ring linking group, a thiophene ring linking group, a pyrrole ring linking group. The substituent, if any, in the group includes an alkyl group, a halogen atom, a nitro group, a cyano group, a carboxyl group, an alkoxy group, an aryloxy group.

X in formula (A) is more preferably an unsubstituted cyclohexylene group, a substituted or unsubstituted phenylene group having from 6 to 20 carbon atoms; even more preferably a substituted or unsubstituted p-phenylene group having from 6 to 10 carbon atoms.

The divalent linking group for Y in formula (A) is a substituted or unsubstituted alkylene group having from 1 to 20 carbon atoms (e.g., methylene group, ethylene group, propylene group, butylene group, isopropylene group), a substituted or unsubstituted alkenylene group having from 2 to 20 carbon atoms (e.g., vinylene group, butene group), a substituted or unsubstituted arylene group (e.g., o-phenylene group, m-phenylene group, p-phenylene group, 1,4-naphthylene group), —O—, —NR$^{a12}$—, —S—, —PR$^{a2}$—, —Si(R$^{a3}$)(R$^{a4}$)—, —C(=O)—, —C(=O)O—, —C(=O)NR$^{a5}$, —C(=O)O—, —OC(=O)NR$^{a6}$—, —NR$^{a7}$C(=O)NR$^{a8}$, —(—O)$_2$CH—. R$^{a12}$, R$^{a2}$ to R$^{a8}$ each represents a substitutable substituent, including, for example, a hydrogen atom, a halogen atom, an alkyl group (including a cycloalkyl group such as a monocycloalkyl group and a bicycloalkyl group having one or more cyclic structures), an alkenyl group (including a cycloalkenyl group, a bicycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic-oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic-thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic-azo group, an imido group, a phosphino group, a phosphinyl group, a phosphinyloxy group, a phosphinylamino group, a silyl group.

Y in formula (A) is preferably a single bond, or a divalent linking group selected from —O—, —NR$^{a12}$— (where R$^{a12}$ represents a hydrogen atom, a substituted or unsubstituted alkyl group having from 1 to 10 carbon atoms, or a substituted or unsubstituted aryl group having from 6 to 20 carbon atoms), —S—, —C(=O)—, —S(=O)$_2$—, and a group formed by linking two or more of these.

More preferably, Y is a single bond, —C(=O)O—, —OC(=O)—, —OC(=O)O—, —C(=O)NH—, —NHC(=O)—; even more preferably a single bond, —O—, —C(=O)O—, —OC(=O)—, —OC(=O)O—.

The substituted or unsubstituted cyclic linking group for Z in formula (A) includes a substituted or unsubstituted cyclic aliphatic group having from 5 to 20 carbon atoms (e.g., unsubstituted cyclopentyl group, cyclohexyl group, pentylcyclohexyl group, propylcyclohexyl group), a substituted or unsubstituted aryl group having from 6 to 30 carbon atoms (e.g., unsubstituted phenyl group, cyanophenyl group, methoxyphenyl group, ethoxyphenyl group, butoxyphenyl group, octyloxyphenyl group, halogen atom-substituted phenyl group, trifluoromethylphenyl group, trifluoromethoxyphenyl group, unsubstituted naphthyl group, cyanobiphenyl group, biphenyl group, perfluorohexylethyloxyphenyl group, hydroxybutylphenyl group, carboxyphenyl group, sulfophenyl group), or a substituted or unsubstituted heterocyclic group (e.g., pyridyl group, dimethylaminopyridiyl group, N-methylimidazolyl group).

In formula (A), Z is more preferably a substituted or unsubstituted cyclohexyl group having from 6 to 15 carbon atoms, or a substituted or unsubstituted aryl group having from 6 to 20 carbon atoms; even more preferably a substituted or unsubstituted phenyl group having from 6 to 15 carbon atoms; still more preferably a substituted phenyl group having from 6 to 10 carbon atoms.

In formula (A) the group moment of Z is preferably at least 2.0 Deby, more preferably at least 3.0 Deby, still more preferably at least 4.0 Deby. Having Z of the type, the polymer may be effective for reducing the mean tilt angle within a broad temperature range. For making Z have such a large group moment, for example, Z may be a substituted cyclic group in which the substituent is any of a cyano group, a trifluoromethyl group or a halogen atom (e.g., fluorine atom, chlorine atom, bromine atom). Of those substituents, more preferred are a cyano group and a fluorine atom. Of Z having the same group moment value, one of which the direction of the group moment is in parallel to the major axis direction of the mesogen moiety of the polymer is more effective, and is favorable in point of the tilt angle temperature dependence thereof. Regarding the position of the substituent in Z of the type, the substituent therein is preferably p-positioned and/or m-positioned, more preferably at least p-positioned, even more preferably both p-positioned and m-positioned. The number or the substituents is preferably from 1 to 3, more preferably 1 or 2.

In particular, when Y is a single bond or a divalent linking group selected from —O—, —NR$^{a12}$— (where R$^{a12}$ is a hydrogen atom, a substituted or unsubstituted aliphatic hydrocarbon group having from 1 to 10 carbon atoms, or a substituted or unsubstituted aryl group having from 6 to 20 carbon atoms), —S—, —C(=O)— and —S(=O)$_2$—, and a group formed by linking at least two of these, then Z is preferably a substituted or unsubstituted phenyl group. In this case, n is more preferably an integer of from 1 to 4.

In formula (A), n is an integer of from 1 to 10, preferably an integer of from 1 to 4, more preferably 1 or 2.

Preferred examples of the constitutive units of formula (A) are mentioned below, to which, however, the invention should not be limited.

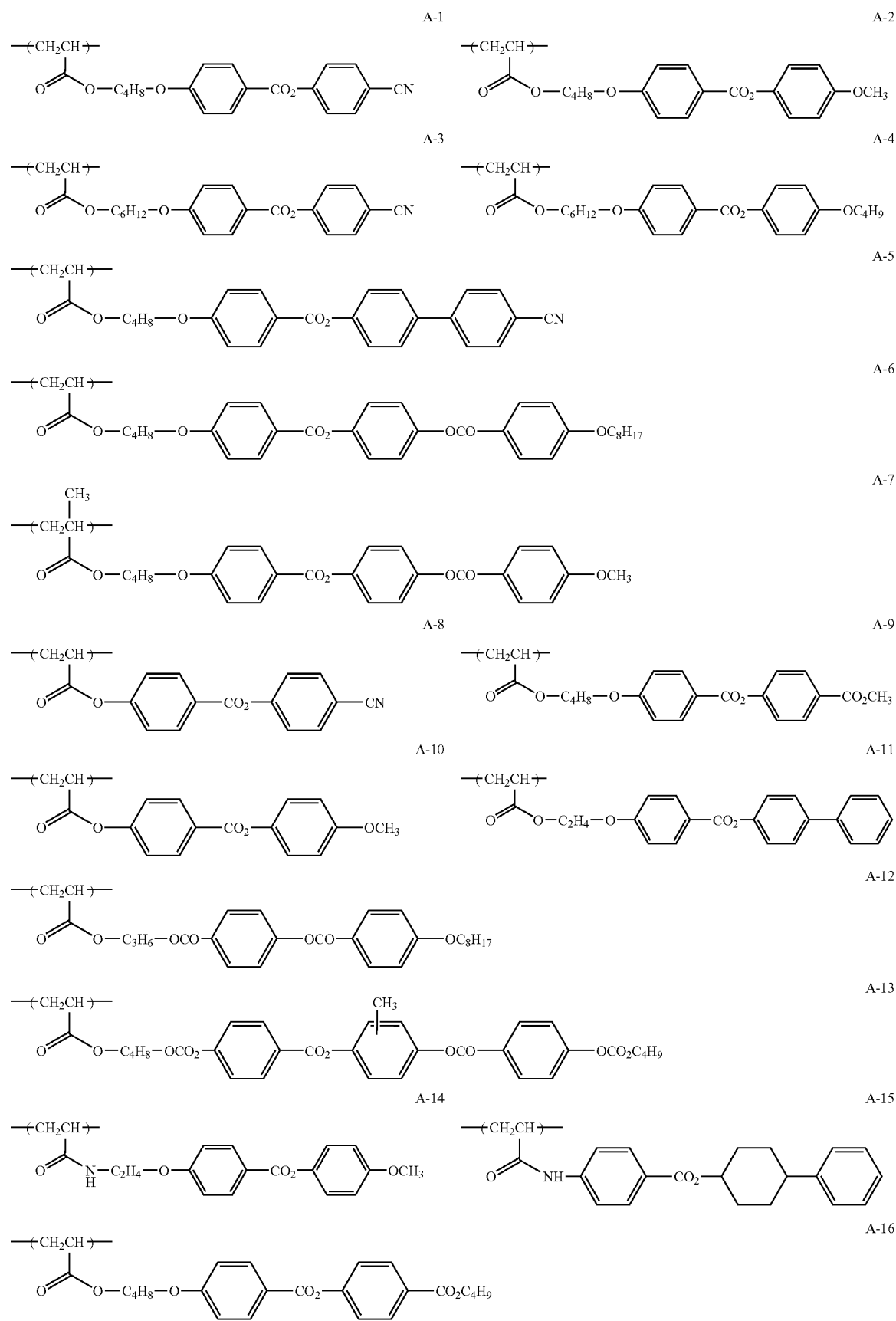

-continued
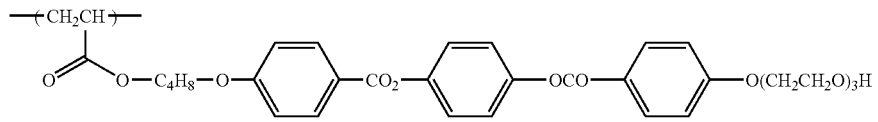
A-17
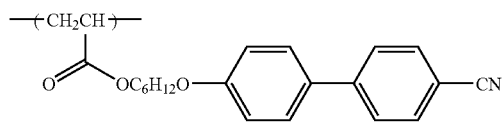
A-18
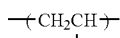
A-19
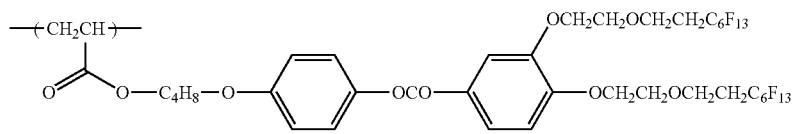
A-20
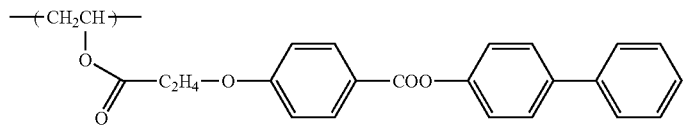
A-21
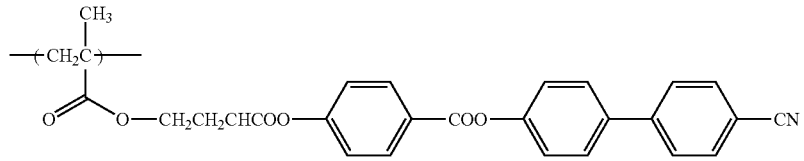
A-22
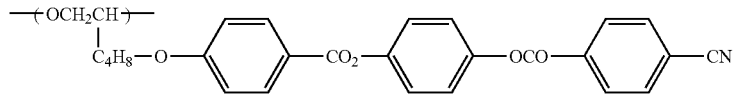
A-23
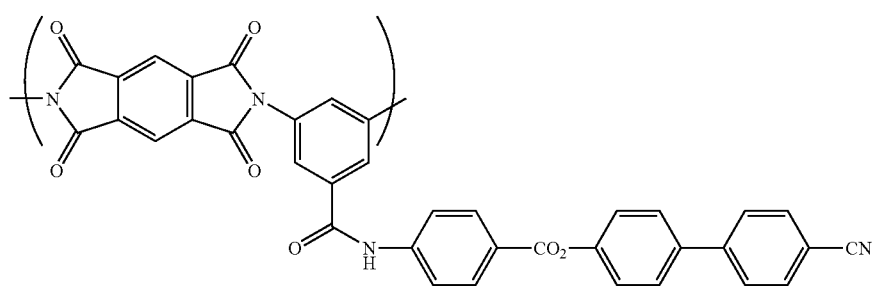
A-24
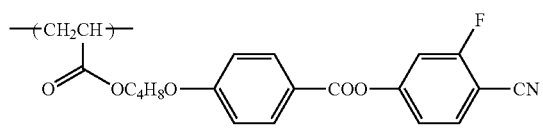
A-25
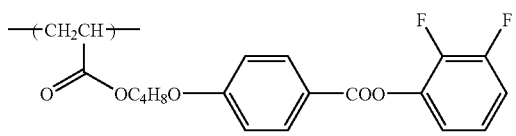
A-26
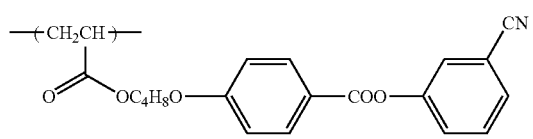
A-27
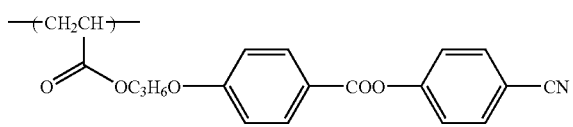
A-28
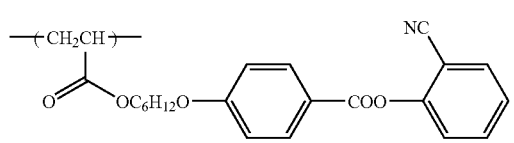
A-29
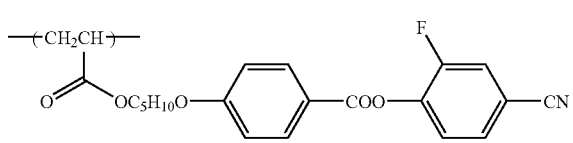
A-30

-continued

A-31
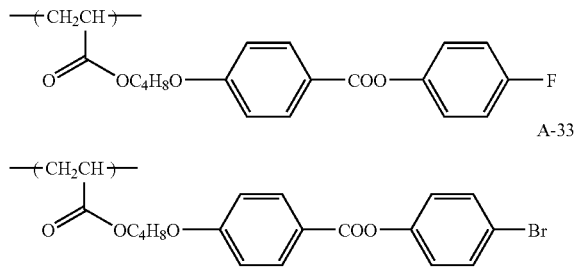

A-32
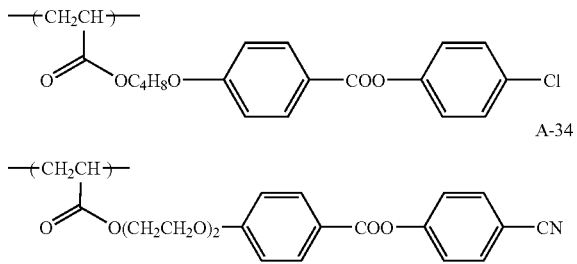

A-33

A-34

(2) Other Constitutive Units than Group of Formula (A) that May be in the Polymer:

The polymer for use in the invention may be a homopolymer of the constitutive unit of the group of formula (A) alone, but may also be a copolymer comprising a combination of the group with any other constitutive unit. The other constitutive unit is preferably a constitutive unit derived from a fluoroaliphatic group-having monomer, more preferably a constitutive unit of a group of the following formula (B), details of which are described below:

$$-(Mp')-$$
$$\phantom{xxx}|$$
$$\phantom{xxx}L'-Rf$$
(B)

wherein Mp' represents a trivalent linking group; L' represents a single bond or a divalent linking group; Rf represents a substituent having at least one fluorine atom.

Mp' has the same meaning as that of Mp in formula (A), and its preferred range is also the same as that therein.

L' is preferably —O—, —NR$^{a11}$— (where R$^{a11}$ represents a hydrogen atom, an aliphatic hydrocarbon group having from 1 to 10 carbon atoms, or an aryl group having from 6 to 20 carbon atoms), —S—, —C(=O)—, —S(=O)$_2$, and a substituted or unsubstituted alkylene group having from 1 to 20 carbon atoms, and a group formed by linking at least two of these. The divalent linking group formed by linking at least two or the above groups includes —C(=O)O—, —OC(=O)—, —OC(=O)O—, —C(=O)NH—, —NHC(=O)—, and —C(=O)O(CH$_2$)$_{ma}$O— (where ma indicates an integer of from 1 to 20).

In case where Mp' in formula (B) is (Mp-1) or (Mp-2), L' is preferably a divalent linking group selected from —O—, —NR$^{a11}$— (where R$^{a11}$ represents a hydrogen atom, an aliphatic hydrocarbon group having from 1 to 10 carbon atoms, or an aryl group having from 6 to 20 carbon atoms), —S—, —C(=O)—, —S(=O)$_2$, and a substituted or unsubstituted alkylene group having from 1 to 20 carbon atoms, and a group formed by linking at least two of these; more preferably a divalent linking group selected from —O—, —C(=O)O—, and —C(=O)NH—, and a group of a combination of at least one of these groups with an alkylene group (e.g., (L-1), (L-2), (L-3)).

Preferred examples of Rf are an aliphatic hydrocarbon group having from 1 to 30 carbon atoms and substituted with at least one fluorine atom (e.g., trifluoroethyl group, perfluorohexylethyl group, perfluorohexylethoxyethyl group, perfluorohexylpropyl group, perfluorobutylethyl group, perfluorooctylethyl group), an aryl group having from 6 to 20 carbon atoms and substituted with at least one fluorine atom (e.g., 4-trifluoromethylphenyl group, 4-(perfluorohexylethoxy)ethoxyphenyl group). Also preferably, Rf has a group CF$_3$ or CF$_2$H at its terminal, more preferably a group CF$_3$.

More preferably, Rf is an alkyl group having a group CF$_3$ at its terminal, or an alkyl group having CF$_2$H at its terminal. The alkyl group having CF$_3$ at its terminal is an alkyl group in which a part or all of the hydrogen atoms constituting the alkyl group are substituted with a fluorine atom. Preferably, at least 50% of the hydrogen atoms constituting the alkyl group having CF$_3$ at its terminal are substituted with a fluorine atom; more preferably at least 60% thereof are substituted; and even more preferably at least 70% thereof are substituted. The remaining hydrogen atoms may be substituted with the substituent in the substituent group D given hereinunder.

The alkyl group having a group CF$_2$H at its terminal is an alkyl group in which a part or all of the hydrogen atoms constituting the alkyl group are substituted with a fluorine atom. Preferably, at least 50% of the hydrogen atoms constituting the alkyl group having CF$_2$H at its terminal are substituted with a fluorine atom; more preferably at least 60% thereof are substituted; and even more preferably at least 70% thereof are substituted. The remaining hydrogen atoms may be substituted with the substituent in the substituent group D given hereinunder. Substituent Group D:

In this description, the substituent group D includes an alkyl group (preferably having from 1 to 20 carbon atoms, more preferably from 1 to 12 carbon atoms, even more preferably from 1 to 8 carbon atoms, such as methyl group, ethyl group, isopropyl group, tert-butyl group, n-octyl group, n-decyl group, n-hexadecyl group, cyclopropyl group, cyclopentyl group, cyclohexyl group), an alkenyl group (preferably having from 2 to 20 carbon atoms, more preferably from 2 to 12 carbon atoms, even more preferably from 2 to 8 carbon atoms, such as vinyl group, allyl group, 2-butenyl group, 3-pentenyl group), an alkynyl group (preferably having from 2 to 20 carbon atom, more preferably from 2 to 12 carbon atoms, even more preferably from 2 to 8 carbon atoms, such as propargyl group, 3-pentynyl group), an aryl group (preferably having from 6 to 30 carbon atoms, more preferably 6 to 20 carbon atoms, even more preferably from 6 to 12 carbon atoms, such as phenyl group, p-methylphenyl group, naphthyl group), a substituted or unsubstituted amino group (preferably having from 0 to 20 carbon atoms, more preferably from 0 to 10 carbon atoms, even more preferably from 0 to 6 carbon atoms, such as unsubstituted amino group, methylamino group, dimethylamino group, diethylamino group, dibenzylamino group), an alkoxy group (preferably having from 1 to 20 carbon atoms, more preferably from 1 to 12 carbon atoms, even more preferably from 1 to 8 carbon atoms, such as methoxy group, ethoxy group, butoxy group), an aryloxy group (preferably having from 6 to 20 carbon atoms, more preferably from 6 to 16 carbon atoms, even more preferably from 6 to 12 carbon atoms, such as phenyloxy group, 2-naphthyloxy group), an acyl group (preferably having from 1 to 20 carbon atoms, more preferably from 1 to 16 carbon atoms, even more preferably from 1 to 12 carbon atoms, such as acetyl group, benzoyl group, formyl group, pivaloyl group), an alkoxycarbonyl group (preferably having from 2 to 20 carbon atoms, more preferably from 2 to 16 carbon atoms, even more preferably from 2 to 12 carbon atoms, such as methoxycarbonyl group, ethoxycarbonyl group), an aryloxycarbonyl group (preferably having from 7 to 20 carbon atoms, more preferably from 7 to 16 carbon atoms, even more preferably from 7 to 10 carbon atoms, such as phenyloxycarbonyl group), an acyloxy group (preferably having from 2 to 20 carbon atoms, more preferably from 2 to 16 carbon atoms, even more preferably from 2 to 10 carbon atoms, such as acetoxy group, benzoyloxy group), an acylamino group (preferably having from 2 to 20 carbon atoms, more preferably from 2 to 16 carbon atoms, even more preferably from 2 to 10 carbon atoms, such as acetylamino group, benzoylamino group), an alkoxycarbonylamino group (preferably having from 2 to 20 carbon atoms, more preferably from 2 to 16 carbon atoms, even more preferably from 2 to 12 carbon atoms, such as methoxycarbonylamino group), an aryloxycarbonylamino group (preferably having from 7 to 20 carbon atoms, more preferably from 7 to 16 carbon atoms, even more preferably from 7 to 12 carbon atoms, such as phenyloxycarbonylamino group), a sulfonylamino group (preferably having from 1 to 20 carbon atoms, more preferably from 1 to 16 carbon atoms, even more preferably from 1 to 12 carbon atoms, such as methanesulfonylamino group, benzenesulfonylamino group), a sulfamoyl group (preferably having from 0 to 20 carbon atoms, more preferably from 0 to 16 carbon atoms, even more preferably from 0 to 12 carbon atoms, such as sulfamoyl group, methylsulfamoyl group, dimethylsulfamoyl group, phenylsulfamoyl group), a carbamoyl group (preferably having from 1 to 20 carbon atoms, more preferably from 1 to 16 carbon atoms, even more preferably from 1 to 12 carbon atoms, such as unsubstituted carbamoyl group, methylcarbamoyl group, diethylcarbamoyl group, phenylcarbamoyl group), an alkylthio group (preferably having from 1 to 20 carbon atoms, more preferably from 1 to 16 carbon atoms, even more preferably from 1 to 12 carbon atoms, such as methylthio group, ethylthio group), an arylthio group (preferably having from 6 to 20 carbon atoms, more preferably from 6 to 16 carbon atoms, even more preferably from 6 to 12 carbon atoms, such as phenylthio group), a sulfonyl group (preferably having from 1 to 20 carbon atoms, more preferably from 1 to 16 carbon atoms, even more preferably from 1 to 12 carbon atoms, such as mesyl group, tosyl group), a sulfinyl group (preferably having from 1 to 20 carbon atoms, more preferably from 1 to 16 carbon atoms, even more preferably from 1 to 12 carbon atoms, such as methanesulfinyl group, benzenesulfinyl group), an ureido group (preferably having from 1 to 20 carbon atoms, more preferably from 1 to 16 carbon atoms, even more preferably from 1 to 12 carbon atoms, such as unsubstituted ureido group, methylureido group, phenylureido group), a phosphoramido group (preferably having from 1 to 20 carbon atoms, more preferably from 1 to 0.16 carbon atoms, even more preferably from 1 to 12 carbon atoms, such as diethylphosphoramido group, phenylphosphoramido group), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, and having a hetero atom such as a nitrogen atom, an oxygen atom or a sulfur atom, for example, imidazolyl group, pyridyl group, quinolyl group, furyl group, piperidyl group, morpholino group, benzoxazolyl group, benzimidazolyl group, benzothiazolyl group), a silyl group (preferably having from 3 to 40 carbon atoms, more preferably from 3 to 30 carbon atoms, even more preferably from 3 to 24 carbon atoms, such as trimethylsilyl group, triphenylsilyl group). These substituents may be further substituted with any of these substituents. When the substituent has two or more substituents, then they may be the same or different. If possible, the substituents may bond to each other to form a ring.

Examples of the alkyl group having a group $CF_3$ at its terminal and the alkyl group having a group $CF_2H$ at its terminal are shown below.

R1: n-$C_8F_{17}$—
R2: n-$C_6F_{13}$—
R3: n-$C_4F_9$—
R4: n-$C_8F_{17}$—$(CH_2)_2$—
R5: n-$C_5F_{13}$—$(CH_2)_2$—
R6: n-$C_4F_9$—$(CH_2)_2$—
R7: H—$(CF_2)_8$—
R8: H—$(CF_2)_6$—
R9: H—$(CF_2)_4$—
R10: H—$(CF_2)_8$—$(CH_2)$—
R11: H—$(CF_2)_6$—$(CH_2)$—
R12: H—$(CF_2)_4$—$(CH_2)$—
R13: n-$C_4F_9$—$(CH_2)_2$—O—$(CH_2)_3$—O—
R14: n-$C_6F_{13}$—$(CH_2)_2$—O—
R15: n-$C_4F_9$—$(CH_2)_2$—O—

Specific examples of preferred repetitive units derived from fluoroaliphatic group-having monomers are mentioned below, to which, however, the invention should not be limited.

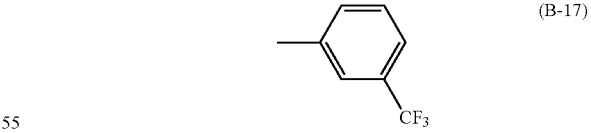

| | Rf = | |
|---|---|---|
| | —$CH_2CH_2C_4F_9$ | (B-1) |
| | —$CH_2CH_2CH_2C_4F_9$ | (B-2) |
| | —$CH_2CH_2C_6F_{13}$ | (B-3) |
| | —$CH_2CH_2C_8F_{17}$ | (B-4) |
| | —$CH_2CH_2OCH_2CH_2C_4F_9$ | (B-5) |
| | —$CH_2CH_2OCH_2CH_2CH_2C_4F_9$ | (B-6) |
| | —$CH_2CH_2OCH_2CH_2C_6F_{13}$ | (B-7) |
| | —$CH_2CH_2OCH_2CH_2C_8F_{17}$ | (B-8) |
| | —$CH_2CH_2C_4F_8H$ | (B-9) |
| | —$CH_2CH_2CH_2C_4F_8H$ | (B-10) |
| | —$CH_2CH_2C_6F_{12}H$ | (B-11) |
| | —$CH_2CH_2C_8F_{16}H$ | (B-12) |
| | —$CH_2CH_2OCH_2CH_2C_4F_8H$ | (B-13) |
| | —$CH_2CH_2OCH_2CH_2CH_2C_4F_8H$ | (B-14) |
| | —$CH_2CH_2OCH_2CH_2C_6F_{12}H$ | (B-15) |
| | —$CH_2CH_2OCH_2CH_2C_8F_{16}H$ | (B-16) |

(B-17)

| | Rf = | |
|---|---|---|
| | —$CH_2CH_2C_4F_9$ | (B-18) |
| | —$CH_2CH_2CH_2C_4F_9$ | (B-19) |
| | —$CH_2CH_2C_6F_{13}$ | (B-20) |
| | —$CH_2CH_2C_8F_{17}$ | (B-21) |
| | —$CH_2CH_2OCH_2CH_2C_4F_9$ | (B-22) |
| | —$CH_2CH_2OCH_2CH_2CH_2C_4F_9$ | (B-23) |
| | —$CH_2CH_2OCH_2CH_2C_6F_{13}$ | (B-24) |
| | —$CH_2CH_2OCH_2CH_2C_8F_{17}$ | (B-25) |
| | —$CH_2CH_2C_4F_8H$ | (B-26) |
| | —$CH_2CH_2CH_2C_4F_8H$ | (B-27) |
| | —$CH_2CH_2C_6F_{12}H$ | (B-28) |
| | —$CH_2CH_2C_8F_{16}H$ | (B-29) |
| | —$CH_2CH_2OCH_2CH_2C_4F_8H$ | (B-30) |

-continued

—CH₂CH₂OCH₂CH₂CH₂C₄F₈H (B-31)
—CH₂CH₂OCH₂CH₂C₆F₁₂H (B-32)
—CH₂CH₂OCH₂CH₂C₈F₁₆H (B-33)

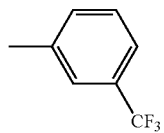
(B-34)

The polymer for use in the invention may contain a repetitive unit having a structure of formula (A), and a repetitive unit derived from a fluoroaliphatic group-having monomer, and in addition to these, may further contain any other constitutive unit derived from a monomer copolymerizable with the monomers to form these constitutive units.

The copolymerizable monomer is not specifically defined. Preferred monomers are, for example, monomers to constitute hydrocarbon polymers (e.g., polyethylene, polypropylene, polystyrene, polymaleinimide, polyacrylic acid, polyacrylate, polyacrylamide, polyacrylanilide), polyethers, polyesters, polycarbonates, polyamides, polyamic acids, polyimides, polyurethanes and polyureides. These may be in the polymer for improving the solubility of the polymer in solvent and for preventing aggregation of the polymer.

Preferably, the backbone chain structure of the comonomer is the same as the group of formula (A).

Specific examples of the copolymerizable constitutive units are mentioned below, to which, however, the invention should not be limited. Especially preferred are (C-3), (C-13), (C-15), (C-16), (C-18); and more preferred are (C-3), (C-13), (C-16).

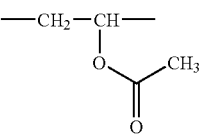
(C-1)

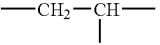
(C-2)

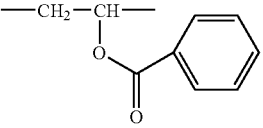
(C-3)

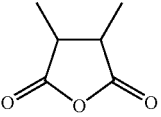
(C-4)

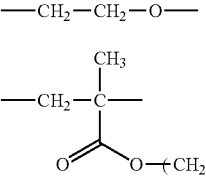
(C-5)

(C-6)

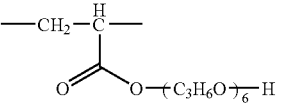
(C-7)

(C-8)

(C-9)

(C-10)

(C-11)

(C-12)

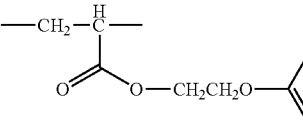
(C-13)

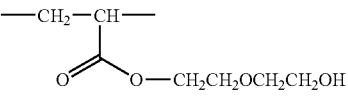
(C-14)

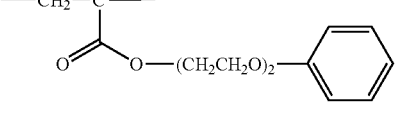
(C-15)

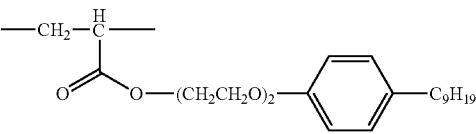
(C-16)

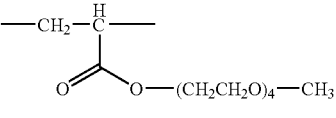
(C-17)

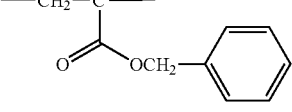
(C-18)

(C-19)

-continued (C-20) 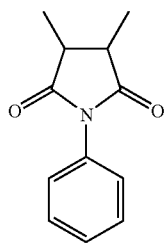

(C-21) 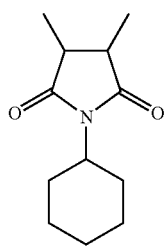

(C-22) 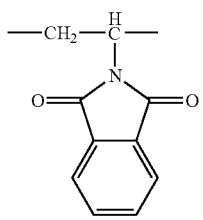

(C-23) 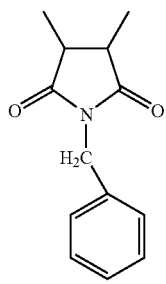

(C-24) 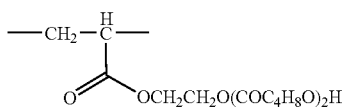

(C-25) 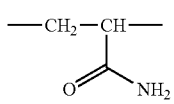

(C-26) 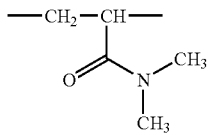

(C-27) 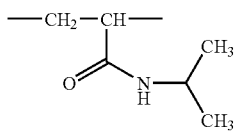

(C-28) 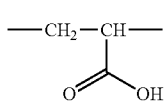

-continued (C-29) 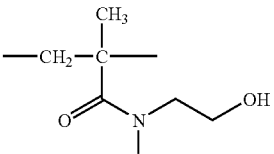

(C-30) 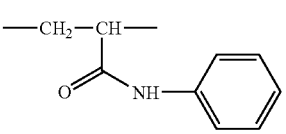

(C-31) 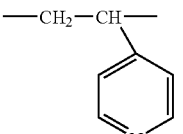

(C-32) 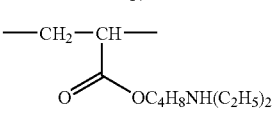

(C-33) 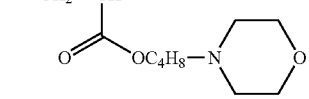

The content of the group of formula (A) in the polymer for use in the invention is preferably from 1 to 90% by mass, more preferably from 5 to 80% by mass.

The content of the repetitive unit derived from a fluoro-aliphatic group-having monomer (preferably the group of formula (B)) in the polymer for use in the invention is from 5 to 90% by mass, more preferably from 10 to 80% by mass.

The content of the other constitutive unit than the above-mentioned two in the polymer for use in the invention is preferably at most 60% by mass, more preferably at most 50% by mass.

The copolymer may be a random copolymer where the constitutive units are irregularly aligned, or a block copolymer where they are regularly aligned. In the block copolymer, the constitutive units may be aligned in any order, and the same constitutive component may be aligned twice or more.

One or more different types of the group of formula (A) and the group of formula (B) may constitute the copolymer. In the copolymer that comprises two or more different types of the groups, the content of the constitutive groups is the overall content thereof.

Regarding the molecular weight range of the polymer for use in the invention, the weight-average molecular weight (Mw) of the polymer is preferably from 1000 to 1,000,000, more preferably from 2000 to 200,000, even more preferably from 3000 to 100,000. The molecular weight distribution of the polymer for use in the invention is preferably from 1 to 4, more preferably from 1 to 3.

The amount of the polymer to be in the composition of the invention is preferably from 0.001 to 10% by mass of the liquid-crystal compound therein, more preferably from 0.01 to 5.0% by mass, even more preferably from 0.05 to 1.0% by mass.

Regarding its physical properties, the polymer for use in the invention is liquid-crystalline. In particular, X in formula (A) is liquid-crystalline. Preferably, the polymer is liquid-crystalline at a temperature between 25° C. and 250° C.

"Liquid-crystalline" as referred to herein means that the polymer is in a highly viscous and fluid state between crystal and liquid, and it may be either thermotropic liquid-crystalline indicating that the state thermally changes, or a lyotropic liquid-crystalline indicating that the state changes depending on the concentration of the polymer, but is preferably the former thermotropic liquid-crystalline state. The thermotropic liquid-crystalline state includes nematic liquid-crystalline and smectic liquid-crystalline, depending on the alignment state thereof, and the polymer of the invention may be a liquid-crystalline polymer of any alignment state, but is preferably a nematic liquid-crystalline polymer.

Preferred examples of the polymer to be in the composition of the invention are shown in Table 1 below.

TABLE 1

| | Constitution of Repetitive Units in Polymer to be in Composition | Copolymerization Ratio (% by mass) | Number-Average Molecular Weight Mn |
|---|---|---|---|
| AD-1 | A-1/B-3 | 60/40 | 10000 |
| AD-2 | A-2/B-3 | 60/40 | 9000 |
| AD-3 | A-3/B-3 | 60/40 | 12000 |
| AD-4 | A-4/B-3 | 60/40 | 9000 |
| AD-5 | A-5/B-3 | 60/40 | 6500 |
| AD-6 | A-10/B-3 | 60/40 | 12000 |
| AD-7 | A-13/B-3 | 60/40 | 10000 |
| AD-8 | A-15/B-3 | 60/40 | 9500 |
| AD-9 | A-17/B-3 | 60/40 | 8500 |
| AD-10 | A-19/B-3 | 60/40 | 10000 |
| AD-11 | A-1/B-11 | 20/80 | 11000 |
| AD-12 | A-1/B-3/C-13 | 30/40/30 | 16500 |
| AD-13 | A-1/B-3/C-3 | 30/40/30 | 12000 |
| AD-14 | A-1/B-3/C-13 | 10/40/50 | 10000 |
| AD-15 | A-5/B-3/C-13 | 30/40/30 | 18000 |
| AD-16 | A-1/B-3/C-13/C-12 | 20/40/30/5 | 11000 |
| AD-17 | A-5/B-3/C-13 | 30/40/30 | 9000 |
| AD-18 | A-6/B-3/C-13 | 40/40/20 | 12000 |
| AD-19 | A-20/B-3/C-13 | 20/20/55 | 10000 |
| AD-20 | A-1/B-11/C-13 | 5/80/15 | 8500 |
| AD-21 | A-1/B-3/C-13 | 27/20/53 | 16000 |
| AD-22 | A-1/B-3/C-16 | 20/40/40 | 18000 |
| AD-23 | A-25/B-3/C-13 | 20/40/40 | 15000 |
| AD-24 | A-28/B-3/C-13 | 40/30/30 | 21000 |
| AD-25 | A-1/B-3/C-20 | 40/20/40 | 19000 |
| AD-26 | A-1/B-1/B-3/C-13 | 40/15/15/30 | 17500 |
| AD-27 | A-1/B-3/C-13/C-20 | 40/30/15/15 | 14600 |

The composition of the invention may contain any other polymer than the polymer having the constitutive unit of formula (A). The polymer not containing a group of formula (A) as the constitutive unit thereof (hereinafter this may be referred to as "additive polymer") may be in the composition, for example, for the purpose of controlling the mean tilt angle of liquid crystal (by reducing the effect of the polymer that has a group of formula (A) as the constitutive unit thereof, therefore inhibiting the reduction in the mean tilt angle of liquid crystal), or for the purpose of controlling the surface tension and the viscosity of the composition.

Accordingly, the structure of the additive polymer except the polymer that has the constitutive unit of formula (A) is not specifically defined, and the additive polymer may be any one capable of being mixed with and dissolved in the composition but not containing a group of formula (A) as the constitutive unit thereof.

One preferred example of the additive polymer is a fluorine-containing polymer, for which, for example, preferably used are known fluoropolymer, fluorine-containing surfactant polymers. Of those, more preferred are polymers that contain a constitutive unit derived from a fluoroaliphatic group-having monomer. Preferred examples of the constitutive unit of the type are polymers that contain a constitutive unit of formula (B) mentioned above.

wherein Mp' represents a trivalent linking group; L' represents a single bond or a divalent linking group; Rf represents a substituent having at least one fluorine atom.

Preferably, the additive polymer has a hydrophilic group. The hydrophilic group is a polar group capable of strongly interacting with water. The hydrophilic group includes, for example, a hydroxyl group, an amino group, a carboxylic acid group, a sulfonic acid group, a phosphoric acid group, a group having a salt structure of the acid group, and a group having a polyoxyalkylene chain (e.g., polyoxyethylene group, polyoxypropylene group). Of those, more preferred are a hydroxyl group, an amino group, a carboxylic acid group, a sulfonic acid group, and a polyoxyalkylene chain-having group; and even more preferred are a hydroxyl group, a carboxylic acid group, and a polyoxyalkylene chain-having group.

Especially preferred examples of the additive polymer are polymers having a repetitive unit of the following formula (F):

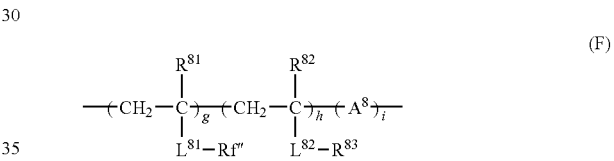

wherein $R^{81}$ and $R^{82}$ each independently represent a hydrogen atom or a methyl group; $L^{81}$ and $L^{82}$ each independently represent a single bond, or a divalent linking group having from 1 to 20 carbon atoms; $Rf''$ represents a fluoroalkyl group having from 1 to 30 carbon atoms; $R^{83}$ represents a hydrogen atom or a hydrophilic group; $A^8$ represents a polymerization unit; g, h and i each indicate a mass fraction of the respective polymerization units.

$R^{81}$ and $R^{82}$ each independently represent a hydrogen atom or a methyl group. $Rf''$ has the same meaning as that of Rf in formula (B), and its preferred range is also the same as therein. $L^{81}$ and $L^{82}$ each independently represent a single bond, or a divalent linking group having from 1 to 20 carbon atoms, preferably a group of formula (FL-1), (FL-2) or (FL-3), more preferably a group of formula (FL-1).

wherein * indicates the position at which the formula bonds to the carbon atom of the polymer backbone chain; ** indicates the position at which the formula bonds to the side branch of $Rf''$ or $R^{83}$; $L^{91}$ represents a linking group having from 1 to 19 carbon atoms; and p is 0 or 1.

$L^{91}$ is preferably a linking group having from 1 to 15 carbon atoms, more preferably a linking group having from 1 to 6 carbon atoms, and it may have any of a saturated bond or an unsaturated bond and may have a linear structure or a branched structure. $L^{91}$ may have a cyclic structure, in which the cyclic structure may contain a hetero atom selected from O, N and S.

(FL-2)

wherein * indicates the position at which the formula bonds to the carbon atom of the polymer backbone chain; ** indicates the position at which the formula bonds to the side branch of $Rf''$ or $R^{83}$; $L^{92}$ represents a linking group having from 1 to 19 carbon atoms; and q is 0 or 1.

The preferred range of $L^{92}$ is the same as that of $L^{91}$ in formula (FL-1).

(FL-3)

wherein * indicates the position at which the formula bonds to the carbon atom of the polymer backbone chain; ** indicates the position at which the formula bonds to the side branch of $R^{m}$ or $R^{83}$; $L^{93}$ represents a linking group having from 1 to 19 carbon atoms; and r is 0 or 1.

The preferred range of $L^{93}$ is the same as that of $L^{91}$ in formula (FL-1).

$R^{83}$ represents a hydrogen atom or a hydrophilic group, preferably a hydrogen atom, a hydroxyl group, an amino group, a carboxylic acid group, a sulfonic acid group, or a polyoxyalkylene chain-having group. The polyoxyalkylene chain-having group is preferably a poly(oligo)ethyleneoxy chain, a poly(oligo)propyleneoxy chain, or a poly(oligo)butyleneoxy chain.

The composition of the invention may contain one or more repetitive units of formula (F) as the constitutive unit thereof. In the composition, the additive polymer may be a copolymer comprising two or more such repetitive units of formula (F), and its terminal may be a hydroxyl group or may be substituted with a substituent.

Preferably, the degree of polymerization of the polyalkyleneoxy chain is from 1 to 10,000, more preferably from 1 to 100.

$A^8$ represents a polymerization unit, and it may be formed of any monomer copolymerizable with he monomer that form the other constitutive unit, and may contain or may not contain a functional group. Its concrete examples not having a functional group are olefins (e.g., ethylene, propylene, isoprene, vinyl chloride, vinylidene chloride), acrylates (e.g., methyl acrylate, phenyl acrylate, 2-hydroxyethyl acrylate, 4-hydroxybutyl acrylate, 3-trimethoxysilylpropyl acrylate, acrylate having polyethylene oxide in the ester moiety thereof, acrylate having polydimethylsiloxane in the ester moiety thereof), methacrylates (e.g., methyl methacrylate, benzyl methacrylate, 2-hydroxyethyl methacrylate, glycidyl methacrylate, 3-triethoxysilylpropyl methacrylate, methacrylate having polypropylene oxide in the ester moiety thereof), styrene derivatives (e.g., styrene, p-methoxystyrene), vinylpyridines (e.g., 2-vinylpyridine, 4-vinylpyridine), vinyl ethers (e.g., methyl vinyl ether, hydroxyethyl vinyl ether, hydroxybutyl vinyl ether), vinyl esters (e.g., vinyl acetate, vinyl propionate, vinyl cinnamate), acrylamides (e.g., N-hydroxyacrylamide, 3-aminopropylacrylamide), methacrylamides (e.g., N-hydroxymethacrylamide, 3-aminopropylmethacrylamide), acrylonitriles, carboxyl group-having vinyl monomers (e.g., acrylic acid, crotonic acid, maleic acid, itaconic acid). Of those, preferred are acrylates, methacrylates, acrylamides, methacrylamides, styrene derivatives, vinyl ethers, vinyl esters, carboxyl group-having vinyl monomers; and more preferred are acrylate, methacrylates, acrylamides, methacrylamides, vinyl ethers, vinyl esters.

g, h and i each indicate a mass fraction (%) of the respective polymerization units. Preferably, $20 \leq g \leq 100$; $0 \leq h \leq 80$; $0 \leq i \leq 80$. More preferably, $20 \leq g \leq 90$; $10 \leq h \leq 80$; $0 \leq i \leq 70$. Even more preferably, $30 \leq g \leq 90$; $10 \leq h \leq 70$; $0 \leq i \leq 50$.

The copolymer may be a random copolymer where the constitutive units are irregularly aligned, or a block copolymer where they are regularly aligned. In the block copolymer, the constitutive units may be aligned in any order. The copolymer may comprise only one of a constitutive unit, or two or more different types of constitutive units.

The additive polymer may be used for attaining various effects. In each case, the most suitable composition may be selected for it from the range mentioned above. Some typical examples are mentioned below, in which the range to be selected for the composition is shown below, but the application of the additive polymer for use in the invention should not be limited to these examples.

The additive polymer may be used for controlling the mean tilt angle of liquid crystal. For example, when both a polymer that contains a group of formula (A) as the constitutive unit thereof and an additive polymer are used, then the mean tilt angle of liquid crystal may be made higher than in a case where the additive polymer is not used. In this case, the above mentioned value g has an important meaning. Specifically, the value g is preferably on the same level as that of the mass fraction of the constitutive unit derived from a fluoroaliphatic group-having monomer in the polymer that contains a group of formula (A) as the constitutive unit thereof (preferably the structure of formula (B)). When the mass fraction of the constitutive unit derived from a fluoroaliphatic group-having monomer (preferably the structure of formula (B)) is represented by g', and when $\Delta g = g - g'$, then preferably $0 \leq |\Delta g| \leq 10$, more preferably $0 |\Delta g| \leq 5$.

On the other hand, in case where the additive polymer must be used without having an influence on the mean tilt angle of liquid crystal, or that is, when the additive polymer is used for lowering the surface tension of the composition and for increasing the wettability thereof, then it is desirable that the value g is higher than the mass fraction of the constitutive unit derived from a fluoroaliphatic group-having monomer in the polymer that has a group of formula (A) as the constitutive unit thereof (preferably the structure of formula (B)). In this case, $\Delta g$ is preferably larger than 10, more preferably $10 < \Delta g \leq 95$, even more preferably $15 \leq \Delta g \leq 90$. This is because, firstly, adding the polymer having a high fluorine content is effective for lowering the surface tension of the entire composition, and secondly, by separating the polymer which contains a group of formula (A) as the constitutive unit thereof and which has an influence on the mean tilt angle of liquid crystal, from the additive polymer (thereby making the additive polymer having a higher fluorine content segregated in the air interface direction), the tilt angle change to be caused by the addition of the additive polymer may be reduced.

Regarding the molecular weight range of the additive polymer, the weight-average molecular weight (Mw) of the polymer is preferably from 1000 to 1,000,000, more preferably from 2000 to 200,000, even more preferably from 3000 to 100,000. Preferably, the molecular weight distribution of the polymer is from 1 to 4, more preferably from 1 to 3.

Preferred examples of the compound of formula (F) that may be in the composition of the invention are shown below, to which, however, the invention should not be limited.

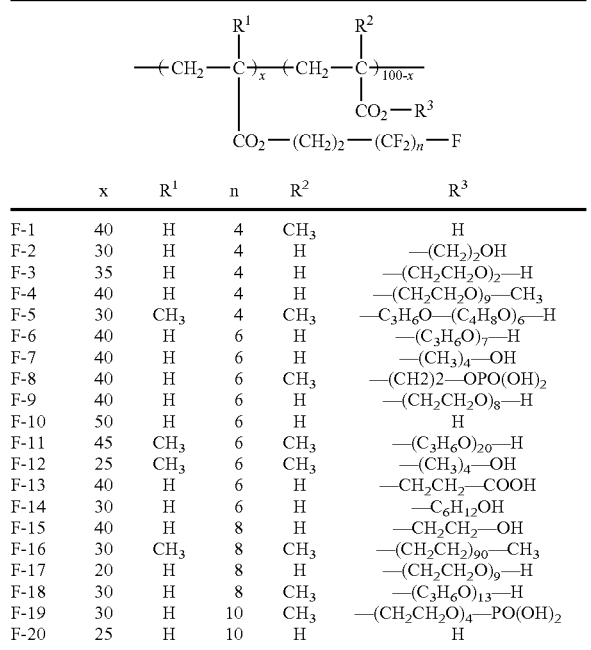

| | x | $R^1$ | n | $R^2$ | $R^3$ |
|---|---|---|---|---|---|
| F-1 | 40 | H | 4 | $CH_3$ | H |
| F-2 | 30 | H | 4 | H | —$(CH_2)_2OH$ |
| F-3 | 35 | H | 4 | H | —$(CH_2CH_2O)_2$—H |
| F-4 | 40 | H | 4 | H | —$(CH_2CH_2O)_9$—$CH_3$ |
| F-5 | 30 | $CH_3$ | 4 | $CH_3$ | —$C_3H_6O$—$(C_4H_8O)_6$—H |
| F-6 | 40 | H | 6 | H | —$(C_3H_6O)_7$—H |
| F-7 | 40 | H | 6 | H | —$(CH_3)_4$—OH |
| F-8 | 40 | H | 6 | $CH_3$ | —$(CH2)2$—$OPO(OH)_2$ |
| F-9 | 40 | H | 6 | H | —$(CH_2CH_2O)_8$—H |
| F-10 | 50 | H | 6 | H | H |
| F-11 | 45 | $CH_3$ | 6 | $CH_3$ | —$(C_3H_6O)_{20}$—H |
| F-12 | 25 | $CH_3$ | 6 | $CH_3$ | —$(CH_3)_4$—OH |
| F-13 | 40 | H | 6 | H | —$CH_2CH_2$—COOH |
| F-14 | 30 | H | 6 | H | —$C_6H_{12}OH$ |
| F-15 | 40 | H | 8 | H | —$CH_2CH_2$—OH |
| F-16 | 30 | $CH_3$ | 8 | $CH_3$ | —$(CH_2CH_2)_{90}$—$CH_3$ |
| F-17 | 20 | H | 8 | H | —$(CH_2CH_2O)_9$—H |
| F-18 | 30 | H | 8 | $CH_3$ | —$(C_3H_6O)_{13}$—H |
| F-19 | 30 | H | 10 | $CH_3$ | —$(CH_2CH_2O)_4$—$PO(OH)_2$ |
| F-20 | 25 | H | 10 | H | H |

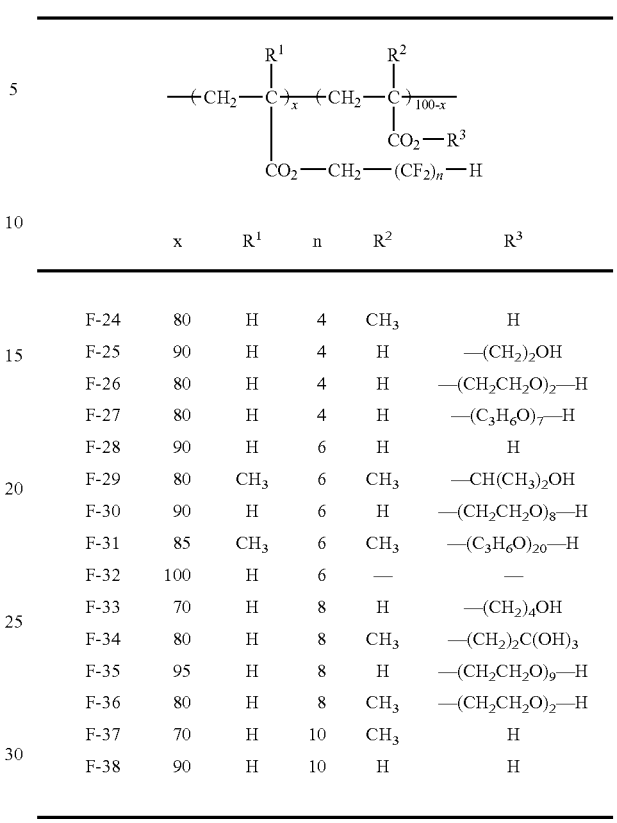

| | x | $R^1$ | n | $R^2$ | $R^3$ |
|---|---|---|---|---|---|
| F-24 | 80 | H | 4 | $CH_3$ | H |
| F-25 | 90 | H | 4 | H | —$(CH_2)_2OH$ |
| F-26 | 80 | H | 4 | H | —$(CH_2CH_2O)_2$—H |
| F-27 | 80 | H | 4 | H | —$(C_3H_6O)_7$—H |
| F-28 | 90 | H | 6 | H | H |
| F-29 | 80 | $CH_3$ | 6 | $CH_3$ | —$CH(CH_3)_2OH$ |
| F-30 | 90 | H | 6 | H | —$(CH_2CH_2O)_8$—H |
| F-31 | 85 | $CH_3$ | 6 | $CH_3$ | —$(C_3H_6O)_{20}$—H |
| F-32 | 100 | H | 6 | — | — |
| F-33 | 70 | H | 8 | H | —$(CH_2)_4OH$ |
| F-34 | 80 | H | 8 | $CH_3$ | —$(CH_2)_2C(OH)_3$ |
| F-35 | 95 | H | 8 | H | —$(CH_2CH_2O)_9$—H |
| F-36 | 80 | H | 8 | $CH_3$ | —$(CH_2CH_2O)_2$—H |
| F-37 | 70 | H | 10 | $CH_3$ | H |
| F-38 | 90 | H | 10 | H | H |

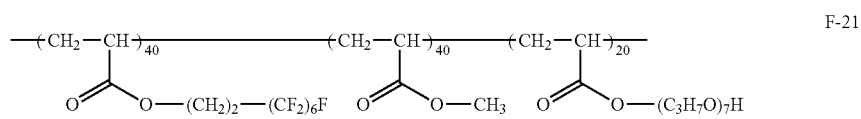

F-21

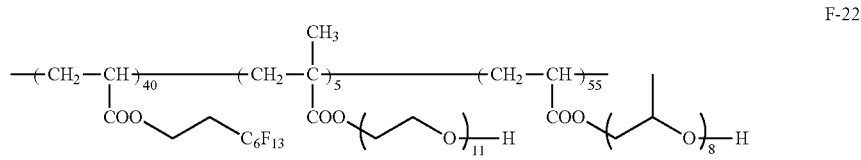

F-22

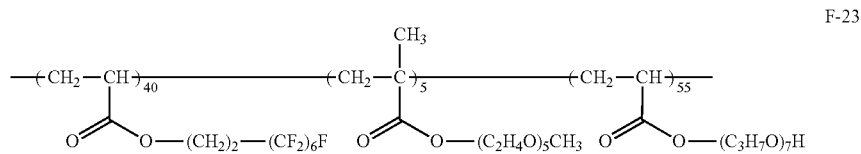

F-23

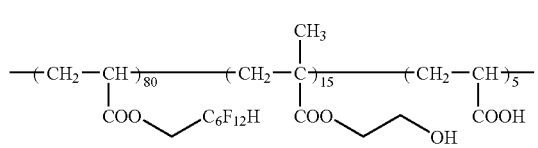

F-39

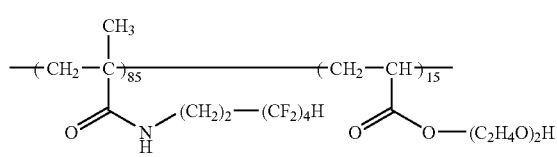

F-40

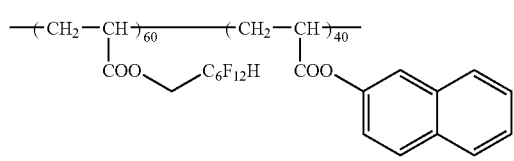

F-41

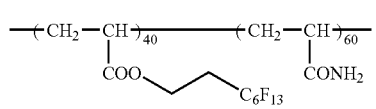

F-42

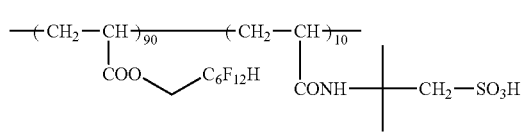

F-43

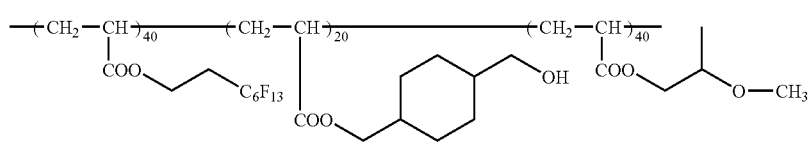

F-44

The polymer for use in the invention may be produced in any known method. The polymer for use in the invention may be produced through addition, condensation or substitution or a combination of any of these. Not specifically defined, when the polymer for use in the invention has an ethylenic repetitive unit, then it is desirable that the polymer is produced through radical polymerization of an ethylenic unsaturated compound corresponding to the repetitive unit, as the method is simple.

Liquid-Crystal Compound:

Not specifically defined, the liquid-crystal compound for use in the invention is preferably discotic liquid-crystal compound, more preferably a liquid-crystal compound having a discotic nematic phase.

Examples of the liquid-crystal compound for use in the invention are those of the following formula (DI): Compound of formula (DI):

The compound of formula (DI) for use in the invention is preferably a discotic liquid-crystal compound, more preferably a liquid-crystal compound having a discotic nematic phase.

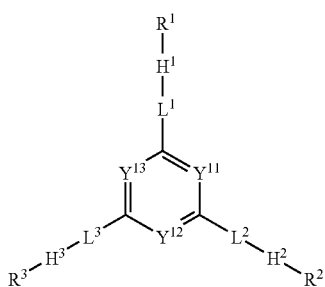

(DI)

In formula (DI), $Y^{11}$, $Y^{12}$ and $Y^{13}$ each independently represent a methine group or a nitrogen atom. When $Y^{11}$, $Y^{12}$ and $Y^{13}$ each are a methine group, the hydrogen atom of the methine group may be substituted with a substituent. The substituent that the methine group may have includes, for example, an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom, and a cyano group. Of those, preferred are an alkyl group, an alkoxy group, an alkoxycarbonyl group, an acyloxy group, a halogen atom and a cyano group; more preferred are an alkyl group having from 1 to 12 carbon atoms, an alkoxy group having from 1 to 12 carbon atoms, an alkoxycarbonyl group having from 2 to 12 carbon atoms, an acyloxy group having from 2 to 12 carbon atoms, a halogen atom and a cyano group.

Preferably, $Y^{11}$, $Y^{12}$ and $Y^{13}$ are all methine groups, more preferably unsubstituted methine groups.

In formula (DI), $L^1$, $L^2$ and $L^3$ each independently represent a single bond or a divalent linking group. The divalent linking group is preferably selected from —O—, —S—, —C(=O)—, —$NR^7$—, —CH=CH—, —C≡C—, a divalent cyclic group, and their combination. $R^7$ represents an alkyl group having from 1 to 7 carbon atoms, or a hydrogen atom, preferably an alkyl group having from 1 to 4 carbon atoms, or a hydrogen atom, more preferably a methyl group, an ethyl group or a hydrogen atom, even more preferably a hydrogen atom.

The divalent cyclic group for $L^1$, $L^2$ and $L^3$ is preferably a 5-membered, 6-membered or 7-membered group, more preferably a 5-membered or 6-membered group, even more preferably a 6-membered group. The ring in the cyclic group may be a condensed ring. However, a monocyclic ring is preferred to a condensed ring for it. The ring in the cyclic ring may be any of an aromatic ring, an aliphatic ring, or a hetero ring. Examples of the aromatic ring are a benzene ring and a naphthalene ring. An example of the aliphatic ring is a cyclohexane ring. Examples of the hetero ring are a pyridine ring and a pyrimidine ring. Preferably, the cyclic group contains an aromatic ring and a hetero ring.

Of the divalent cyclic group, the benzene ring-having cyclic group is preferably a 1,4-phenylene group. The naphthalene ring-having cyclic group is preferably a naphthalene-1,5-diyl group or a naphthalene-2,6-diyl group. The pyridine ring-having cyclic group is preferably a pyridine-2,5-diyl group. The pyrimidine ring-having cyclic group is preferably a pyrimidin-2,5-diyl group.

The divalent cyclic group for $L^1$, $L^2$ and $L^3$ may have a substituent. Examples of the substituent are a halogen atom, a cyano group, a nitro group, an alkyl group having from 1 to 16 carbon atoms, an alkenyl group having from 2 to 16 carbon atoms, an alkynyl group having from 2 to 16 carbon atoms, a halogen atom-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms.

$L^1$, $L^2$ and $L^3$ are preferably a single bond, *—O—CO—, *—CO—O—, *—CH=CH—, *—C≡C—, *-divalent cyclic group-, *—O—CO-divalent cyclic group-, *—CO—O-divalent cyclic group-, *—CH=CH-divalent cyclic group-, *—C≡C-divalent cyclic group-, *-divalent cyclic group-O—CO—, *-divalent cyclic group-CO—O—, *-divalent cyclic group-CH=CH—, or *-divalent cyclic group-C≡C—. More preferably, they are a single bond, *—CH=CH—, *—C≡C—, *—CH=CH-divalent cyclic group- or *—C≡C-divalent cyclic group-, even more preferably a single bond. * indicates the position at which the group bonds to the 6-membered ring of formula (DI) that contains $Y^{11}$, $Y^{12}$ and $Y^{13}$.

In formula (DI), $H^1$, $H^2$ and $H^3$ each independently represent the following formula (DI-A) or (DI-B):

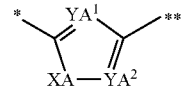

(DI-A)

In formula (DI-A), $YA^1$ and $YA^2$ each independently represent a methine group or a nitrogen atom. Preferably, at least one of $YA^1$ and $YA^2$ is a nitrogen atom, more preferably they are both nitrogen atoms. XA represents an oxygen atom, a sulfur atom, a methylene group or an imino group. XA is preferably an oxygen atom. * indicates the position at which the formula bonds to any of $L^1$ to $L^3$; and ** indicates the position at which the formula bonds to any of $R^1$ to $R^3$.

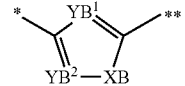

(DI-B)

In formula (DI-B), $YB^1$ and $YB^2$ each independently represent a methine group or a nitrogen atom. Preferably, at least one of $YB^1$ and $YB^2$ is a nitrogen atom, more preferably they are both nitrogen atoms. XB represents an oxygen atom, a sulfur atom, a methylene group or an imino group. XB is preferably an oxygen atom. * indicates the position at which the formula bonds to any of $L^1$ to $L^3$; and ** indicates the position at which the formula bonds to any of $R^1$ to $R^3$.

$R^1$, $R^2$ and $R^3$ each independently represent the following formula (DI-R):

$$*\text{-}(\text{-}L^{21}\text{-}F^1)_{n1}\text{-}L^{22}\text{-}L^{23}\text{-}Q^1 \quad \text{(DI-R)}$$

In formula (DI-R), * indicates the position at which the formula bonds to $H^1$, $H^2$ or $H^3$ in formula (DI). $F^1$ represents a divalent linking group having at least one cyclic structure. $L^{21}$ represents a single bond or a divalent linking group. When $L^{21}$ is a divalent linking group, it is preferably selected from a group consisting of —O—, —S—, —C(=O)—, —$NR^7$—, —CH=CH—, —C≡C—, and their combination. $R^7$ represents an alkyl group having from 1 to 7 carbon atoms, or a hydrogen atom, preferably an alkyl group having from 1 to 4 carbon atoms, or a hydrogen atom, more preferably a methyl group, an ethyl group or a hydrogen atom, even more preferably a hydrogen atom.

$L^{21}$ is preferably a single bond, —O—CO—, —CO—O—, —CH=CH— or —C≡C— (in which ** indicates the left side of $L^{21}$ in formula (DI-R)). More preferably it is a single bond.

In formula (DI-R), $F^1$ represents a divalent cyclic linking group having at least one cyclic structure. The cyclic structure is preferably a 5-membered ring, a 6-membered ring, or a 7-membered ring, more preferably a 5-membered ring or a 6-membered ring, even more preferably a 6-membered ring. The cyclic structure may be a condensed ring. However, a monocyclic ring is preferred to a condensed ring for it. The ring in the cyclic ring may be any of an aromatic ring, an aliphatic ring, or a hetero ring. Examples of the aromatic ring are a benzene ring, a naphthalene ring, an anthracene ring, a phenanthrene ring. An example of the aliphatic ring is a cyclohexane ring. Examples of the hetero ring are a pyridine ring and a pyrimidine ring.

The benzene ring-having group for $F^1$ is preferably a 1,4-phenylene group or a 1,3-phenylene group. The naphthalene ring-having group is preferably a naphthalene-1,4-diyl group, a naphthalene-1,5-diyl group, a naphthalene-1,6-diyl group, a naphthalene-2,5-diyl group, a naphthalene-2,6-diyl group, or a naphthalene-2,7-diyl group. The cyclohexane ring-having group is preferably a 1,4-cyclohexylene group. The pyridine ring-having group is preferably a pyridine-2,5-diyl group. The pyrimidine ring-having group is preferably a pyrimidin-2,5-diyl group. More preferably, $F^1$ is a 1,4-phenylene group, a 1,3-phenylene group, a naphthalene-2,6-diyl group, or a 1,4-cyclohexylene group.

$F^1$ may have a substituent. Examples of the substituent are a halogen atom (e.g., fluorine atom, chlorine atom, bromine atom, iodine atom), a cyano group, a nitro group, an alkyl group having from 1 to 16 carbon atoms, an alkenyl group having from 1 to 16 carbon atoms, an alkynyl group having from 2 to 16 carbon atoms, a halogen atom-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. The substituent is preferably a halogen atom, a cyano group, an alkyl group having from 1 to 6 carbon atoms, a halogen atom-substituted alkyl group having from 1 to 6 carbon atoms, more preferably a halogen atom, an alkyl group having from 1 to 4 carbon atoms, a halogen atom-substituted alkyl group having from 1 to 4 carbon atoms, even more preferably a halogen atom, an alkyl group having from 1 to 3 carbon atoms, or a trifluoromethyl group.

n1 indicates an integer of from 0 to 4. n1 is preferably an integer of from 1 to 3, more preferably 1 or 2. When n1 is 0, then $L^{22}$ in formula (DI-R) directly bonds to any of $H^1$ to $H^3$. When n1 is 2 or more, then $(-L^{21}-F^1)$'s may be the same or different.

$L^{22}$ represents —O—, —O—CO—, —CO—O—, —O—CO—O—, —S—, —NH—, —SO$_2$—, —CH$_2$—, —CH=CH— or —C≡C—, preferably —O—, —O—CO—, —CO—O—, —O—CO—O—, —CH$_2$—, —CH=CH— or —C≡C—, more preferably —O—, —O—CO—, —CO—O—, —O—CO—O—, or —CH$_2$—.

When the above group has a hydrogen atom, then the hydrogen atom may be substituted with a substituent. Examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2. to 6 carbon atoms, and an acylamino group having from 2 to 6 carbon atoms. Especially preferred are a halogen atom, and an alkyl group having from 1 to 6 carbon atoms.

$L^{23}$ represents a divalent linking group selected from —O—, —S—, —C(=O)—, —SO$_2$—, —NH—, —CH$_2$—, —CH=CH— and —C≡C—, and a group formed by linking two or more of these. The hydrogen atom in —NH—, —CH$_2$— and —CH=CH— may be substituted with any other substituent. Examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms. The group substituted with the substituent improves the solubility of the compound of formula (DI) in solvent, and therefore the composition of the invention containing the compound can readily form a coating liquid.

$L^{23}$ is preferably a linking group selected from a group consisting of —O—, —C(=O)—, —CH$_2$—, —CH=CH— and —C≡C—, and a group formed by linking two or more of these. $L^{23}$ preferably has from 1 to 20 carbon atoms, more preferably from 2 to 14 carbon atoms. Preferably, $L^{23}$ has from 1 to 16 (—CH$_2$—)'s, more preferably from 2 to 12 (—CH$_2$—)'s.

$Q^1$ represents a polymerizing group or a hydrogen atom. In case where the compound of formula (DI) is used in producing optical films of which the retardation is required not to change by heat, such as optical compensatory films, $Q^1$ is preferably a polymerizing group. The polymerization for the group is preferably addition polymerization (including ring-cleavage polymerization) or polycondensation. In other words, the polymerizing group preferably has a functional group that enables addition polymerization or polycondensation. Examples of the polymerizing group are shown below.

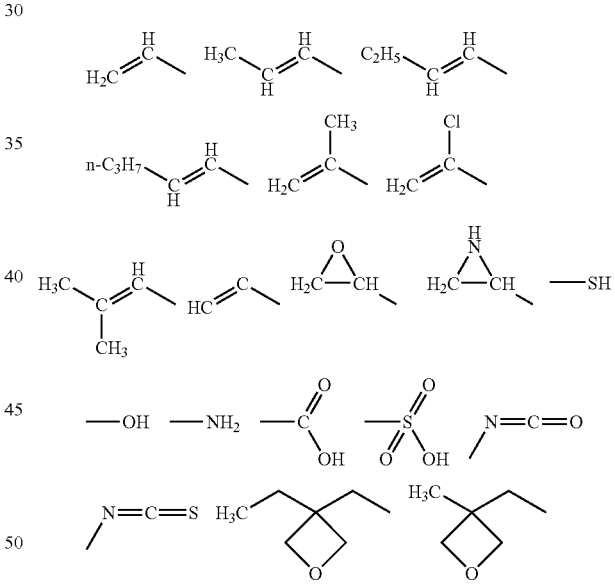

More preferably, the polymerizing group is addition-polymerizing functional group. The polymerizing group of the type is preferably a polymerizing ethylenic unsaturated group or a ring-cleavage polymerizing group.

Examples of the polymerizing ethylenic unsaturated group are the following (M-1) to (M-6):

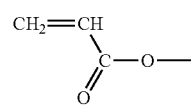

(M-1)

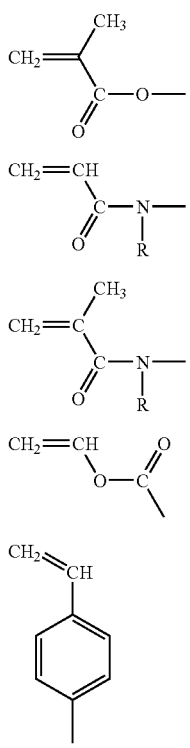

(M-2)

(M-3)

(M-4)

(M-5)

(M-6)

In formulae (M-3) and (M-4), R represents a hydrogen atom or an alkyl group. R is preferably a hydrogen atom or a methyl group. Of formulae (M-1) to (M-6), preferred are formulae (M-1) and (M-2), and more preferred is formula (M-1).

The ring-cleavage polymerizing group is preferably a cyclic ether group, more preferably an epoxy group or an oxetanyl group, most preferably an epoxy group.

A liquid-crystal compound of the following formula (DII) or a liquid-crystal compound of the following formula (DIII) is more preferred for the discotic liquid-crystal compound for use in the invention.

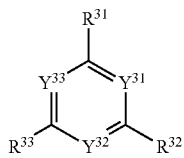

(DII)

In formula (DII), $Y^{31}$, $Y^{32}$ and $Y^{33}$ each independently represent a methine group or a nitrogen atom. $Y^{31}$, $Y^{32}$ and $Y^{33}$ have the same meaning as that of $Y^{11}$, $Y^{12}$ and $Y^{13}$ in formula (DI), and their preferred range is also the same as therein.

$R^{31}$, $R^{32}$ and $R^{33}$ each independently represent the following formula (DII-R):

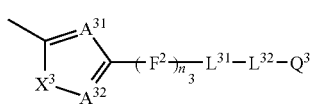

(DII-R)

In formula (DII-R), $A^{31}$ and $A^{32}$ each independently represent a methine group or a nitrogen atom. Preferably, at least one of $A^{31}$ and $A^{32}$ is a nitrogen atom; most preferably the two are both nitrogen atoms.

$X^3$ represents an oxygen atom, a sulfur atom, a methylene group or an imino group. Preferably, $X^3$ is an oxygen atom.

In formula (DII-R), $F^2$ represents a divalent cyclic linking group having a 6-membered cyclic structure. The 6-membered ring in $F^2$ may be a condensed ring. However, a monocyclic ring is preferred to a condensed ring for it. The 6-membered ring in $F^2$ may be any of an aromatic ring, an aliphatic ring, or a hetero ring. Examples of the aromatic ring are a benzene ring, a naphthalene ring, an anthracene ring and a phenanthrene ring. An example of the aliphatic ring is a cyclohexane ring. Examples of the hetero ring are a pyridine ring and a pyrimidine ring.

Of the divalent cyclic ring, the benzene ring-having cyclic group is preferably a 1,4-phenylene group or a 1,3-phenylene group. The naphthalene ring-having cyclic group is preferably a naphthalene-1,4-diyl group, a naphthalene-1,5-diyl group, a naphthalene-1,6-diyl group, a naphthalene-2,5-diyl group, a naphthalene-2,6-diyl group, or a naphthalene-2,7-diyl group. The cyclohexane ring-having cyclic group is preferably a 1,4-cyclohexylene group. The pyridine ring-having cyclic group is preferably a pyridine-2,5-diyl group. The pyrimidine ring-having cyclic group is preferably a pyrimidin-2,5-diyl group. More preferably, the divalent cyclic group is a 1,4-phenylene group, a 1,3-phenylene group, a naphthalene-2,6-diyl group, or a 1,4-cyclohexylene group.

$F^2$ may have a substituent. Examples of the substituent are a halogen atom (e.g., fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen atom-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. The substituent of the divalent cyclic group is preferably a halogen atom, a cyano group, an alkyl group having from 1 to 6 carbon atoms, a halogen atom-substituted alkyl group having from 1 to 6 carbon atoms, more preferably a halogen atom, an alkyl group having from 1 to 4 carbon atoms, a halogen atom-substituted alkyl group having from 1 to 4 carbon atoms, even more preferably a halogen atom, an alkyl group having from 1 to 3 carbon atoms, or a trifluoromethyl group.

n3 indicates an integer of from 1 to 3. n3 is preferably 1 or 2. When n3 is 2 or more, then $F^2$'s may be the same or different.

$L^{31}$ represents —O—, —O—CO—, —CO—O—, —O—CO—O—, —S—, —NH—, —SO$_2$—, —CH$_2$—, —CH═CH— or —C≡C—. When the above group has a hydrogen atom, then the hydrogen atom may be substituted with a substituent. The preferred range of $L^{31}$ may be the same as that of $L^{22}$ in formula (DI-R).

$L^{32}$ represents a divalent linking group selected from —O—, —S—, —C(═O)—, —SO$_2$—, —NH—, —CH$_2$—, —CH═CH— and —C≡C—, and a group formed by linking two or more of these, and when the group has a hydrogen atom, the hydrogen atom may be substituted with a substituent. The preferred range of $L^{32}$ may be the same as that of $L^{23}$ in formula (DI-R).

$Q^3$ represents a polymerizing group or a hydrogen atom, and its preferred range is the same as that of $Q^1$ in formula (DI-R).

Compounds of formula (DIII) are described in detail.

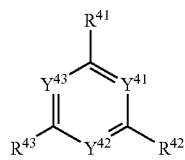
(DIII)

In formula (DIII), $Y^{41}$, $Y^{42}$ and $Y^{43}$ each independently represent a methine group or a nitrogen atom. When $Y^{41}$, $Y^{42}$ and $Y^{43}$ each are a methine group, the hydrogen atom of the methine group may be substituted with a substituent. Preferred examples of the substituent that the methine group may have are an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom, and a cyano group. Of those, more preferred are an alkyl group, an alkoxy group, an alkoxycarbonyl group, an acyloxy group, a halogen atom and a cyano group; even more preferred are an alkyl group having from 1 to 12 carbon atoms, an alkoxy group having from 1 to 12 carbon atoms, an alkoxycarbonyl group having from 2 to 12 carbon atoms, an acyloxy group having from 2 to 12 carbon atoms, a halogen atom and a cyano group.

Preferably, $Y^{41}$, $Y^{42}$ and $Y^{43}$ are all methine groups, more preferably unsubstituted methine groups.

$R^{41}$, $R^{42}$ and $R^{43}$ each independently represent the following formula (DIII-A), (DIII-B) or (DIII-C).

When a retardation plate and the like having a small wavelength dispersion are produced, $R^{41}$, $R^{42}$ and $R^{43}$ are preferably formula (DIII-A) or (DIII-C), more preferably formula (DIII-A).

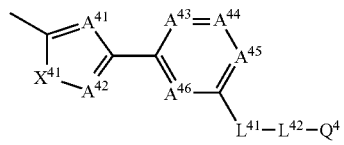
(DIII-A)

In formula (DIII-A), $A^{41}$, $A^{42}$, $A^{43}$, $A^{44}$, $A^{45}$ and $A^{46}$ each independently represent a methine group or a nitrogen atom. Preferably, at least one of $A^{41}$ and $A^{42}$ is a nitrogen atom; more preferably the two are both nitrogen atoms. Preferably, at least three of $A^{43}$, $A^{44}$, $A^{45}$ and $A^{46}$ are methine groups; more preferably, all of them are methine groups. When $A^{43}$, $A^{44}$, $A^{45}$ and $A^{46}$ are methine groups, the hydrogen atom of the methine group may be substituted with a substituent. Examples of the substituent that the methine group may have are a halogen atom (fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

$X^{41}$ represents an oxygen atom, a sulfur atom, a methylene group or an imino group, but is preferably an oxygen atom.

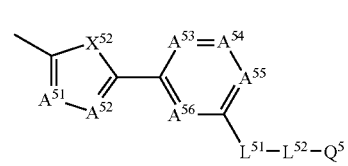
(DIII-B)

In formula (DIII-B), $A^{51}$, $A^{52}$, $A^{53}$, $A^{54}$, $A^{55}$ and $A^{56}$ each independently represent a methine group or a nitrogen atom. Preferably, at least one of $A^{51}$ and $A^{52}$ is a nitrogen atom; more preferably the two are both nitrogen atoms. Preferably, at least three of $A^{53}$, $A^{54}$, $A^{55}$ and $A^{56}$ are methine groups; more preferably, all of them are methine groups. When $A^{53}$, $A^{54}$, $A^{55}$ and $A^{56}$ are methine groups, the hydrogen atom of the methine group may be substituted with a substituent. Examples of the substituent that the methine group may have are a halogen atom (fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

$X^{52}$ represents an oxygen atom, a sulfur atom, a methylene group or an imino group, but is preferably an oxygen atom.

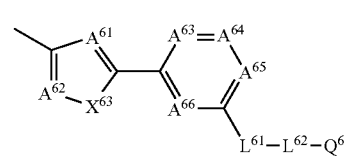
(DIII-C)

In formula (DIII-C), $A^{61}$, $A^{62}$, $A^{63}$, $A^{64}$, $A^{65}$ and $A^{66}$ each independently represent a methine group or a nitrogen atom. Preferably, at least one of $A^{61}$ and $A^{62}$ is a nitrogen atom;

more preferably the two are both nitrogen atoms. Preferably, at least three of $A^{63}$, $A^{64}$, $A^{65}$ and $A^{66}$ are methine groups; more preferably, all of them are methine groups. When $A^{63}$, $A^{64}$ $A^{65}$ and $A^{66}$ are methine groups, the hydrogen atom of the methine group may be substituted with a substituent. Examples of the substituent that the methine group may have are a halogen atom (fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

$X^{63}$ represents an oxygen atom, a sulfur atom, a methylene group or an imino group, but is preferably an oxygen atom.

$L^{41}$ in formula (DIII-A), $L^{51}$ in formula (DIII-B) and $L^{61}$ in formula (DIII-C) each independently represent —O—, —O—CO—, —CO—O—, —O—CO—O—, —S—, —NH—, —SO$_2$—, —CH$_2$—, —CH=CH— or —C≡C—; preferably —O—, —O—CO—, —CO—O—, —O—CO—O—, —CH$_2$—, —CH=CH— or —C≡C—; more preferably —O—, —O—CO—, —CO—O—, —O—CO—O— or —CH$_2$—. When above group has a hydrogen atom, then the hydrogen atom may be substituted with a substituent.

Preferred examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms.

$L^{42}$ in formula (DIII-A), $L^{52}$ in formula (DIII-B) and $L^{62}$ in formula (DIII-C) each independently represent a divalent linking group selected from —O—, —S—, —C(=O)—, —SO$_2$—, —NH—, —CH$_2$—, —CH=CH— and —C≡C—, and a group formed by linking two or more of these. The hydrogen atom in —NH—, —CH$_2$— and —CH=CH— may be substituted with a substituent. Preferred examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms.

Preferably, $L^{42}$, $L^{52}$ and $L^{62}$ each independently represent a divalent linking group selected from —O—, —C(=O)—, —CH$_2$—, —CH=CH— and —C≡C—, and a group formed by linking two or more of these. Preferably, $L^{42}$, $L^{52}$ and $L^{62}$ each independently have from 1 to 20 carbon atoms, more preferably from 2 to 14 carbon atoms. Preferably, $L^{42}$, $L^{52}$ and $L^{62}$ each independently have from 1 to 16 (—CH$_2$—)'s, more preferably from 2 to 12 (—CH$_2$—)'s.

$Q^4$ in formula (DIII-A), $Q^5$ in formula (DIII-B) and $Q^6$ in formula (DIII-C) each independently represent a polymerizing group or a hydrogen atom. Their preferred range is the same as that of $Q^1$ in formula (DI-R).

Specific examples of the compounds of formulae (DI), (DII) and (DIII) are shown below, to which, however, the invention should not be limited.

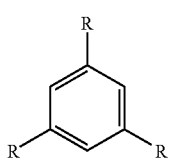 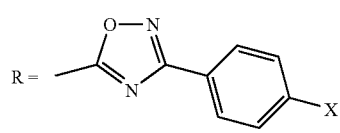 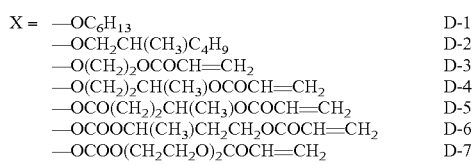

| X = | —OC$_6$H$_{13}$ | D-1 |
| | —OCH$_2$CH(CH$_3$)C$_4$H$_9$ | D-2 |
| | —O(CH$_2$)$_2$OCOCH=CH$_2$ | D-3 |
| | —O(CH$_2$)$_2$CH(CH$_3$)OCOCH=CH$_2$ | D-4 |
| | —OCO(CH$_2$)$_2$CH(CH$_3$)OCOCH=CH$_2$ | D-5 |
| | —OCOOCH(CH$_3$)CH$_2$CH$_2$OCOCH=CH$_2$ | D-6 |
| | —OCOO(CH$_2$CH$_2$O)$_2$COCH=CH$_2$ | D-7 |

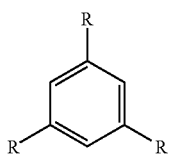 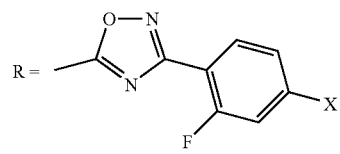 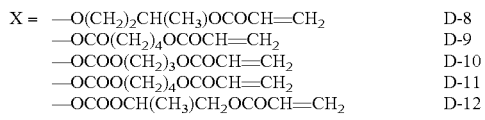

| X = | —O(CH$_2$)$_2$CH(CH$_3$)OCOCH=CH$_2$ | D-8 |
| | —OCO(CH$_2$)$_4$OCOCH=CH$_2$ | D-9 |
| | —OCOO(CH$_2$)$_3$OCOCH=CH$_2$ | D-10 |
| | —OCOO(CH$_2$)$_4$OCOCH=CH$_2$ | D-11 |
| | —OCOOCH(CH$_3$)CH$_2$OCOCH=CH$_2$ | D-12 |

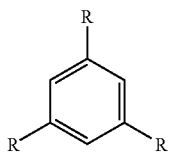 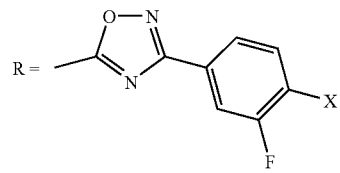 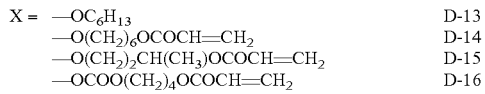

| X = | —OC$_6$H$_{13}$ | D-13 |
| | —O(CH$_2$)$_6$OCOCH=CH$_2$ | D-14 |
| | —O(CH$_2$)$_2$CH(CH$_3$)OCOCH=CH$_2$ | D-15 |
| | —OCOO(CH$_2$)$_4$OCOCH=CH$_2$ | D-16 |

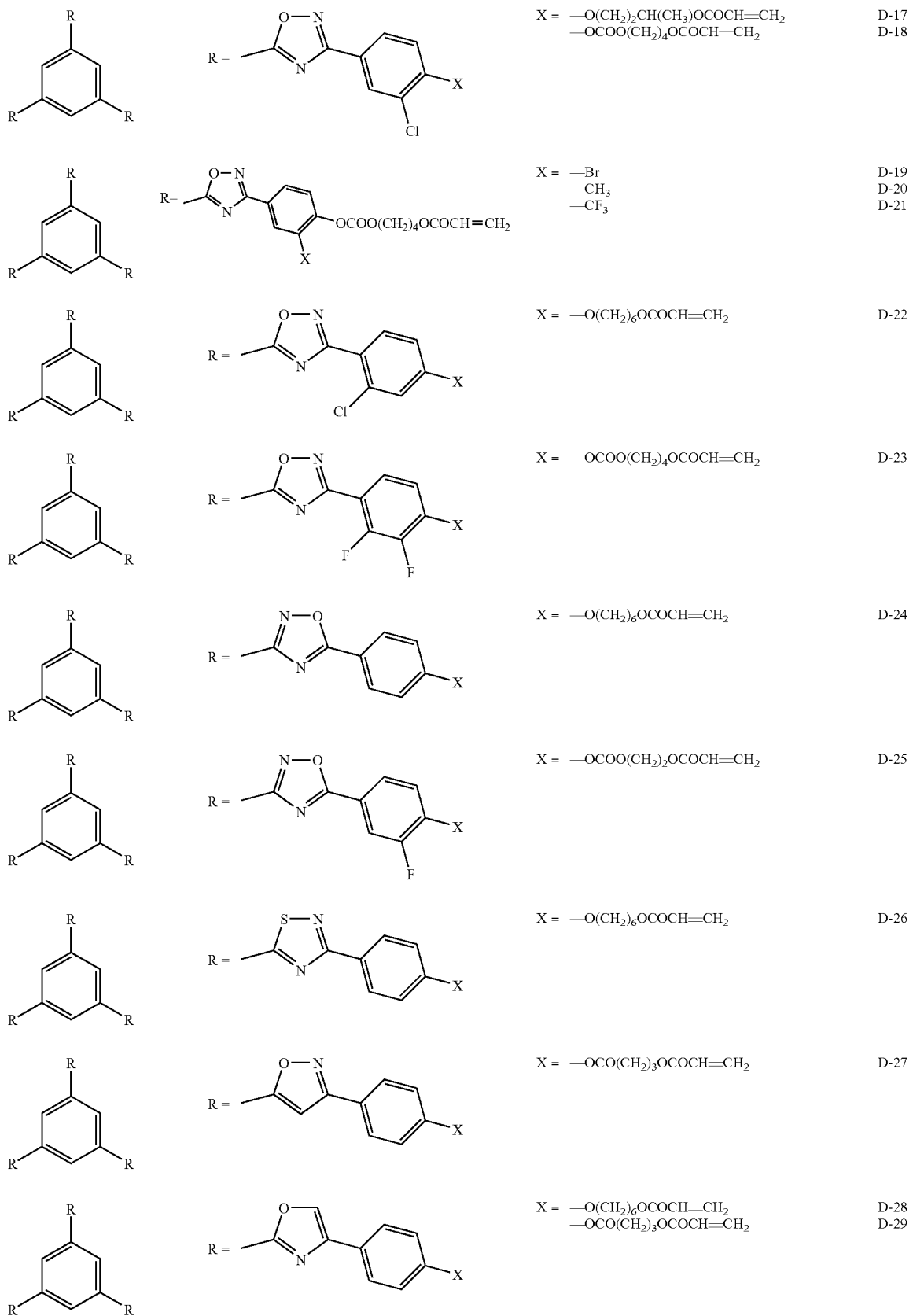

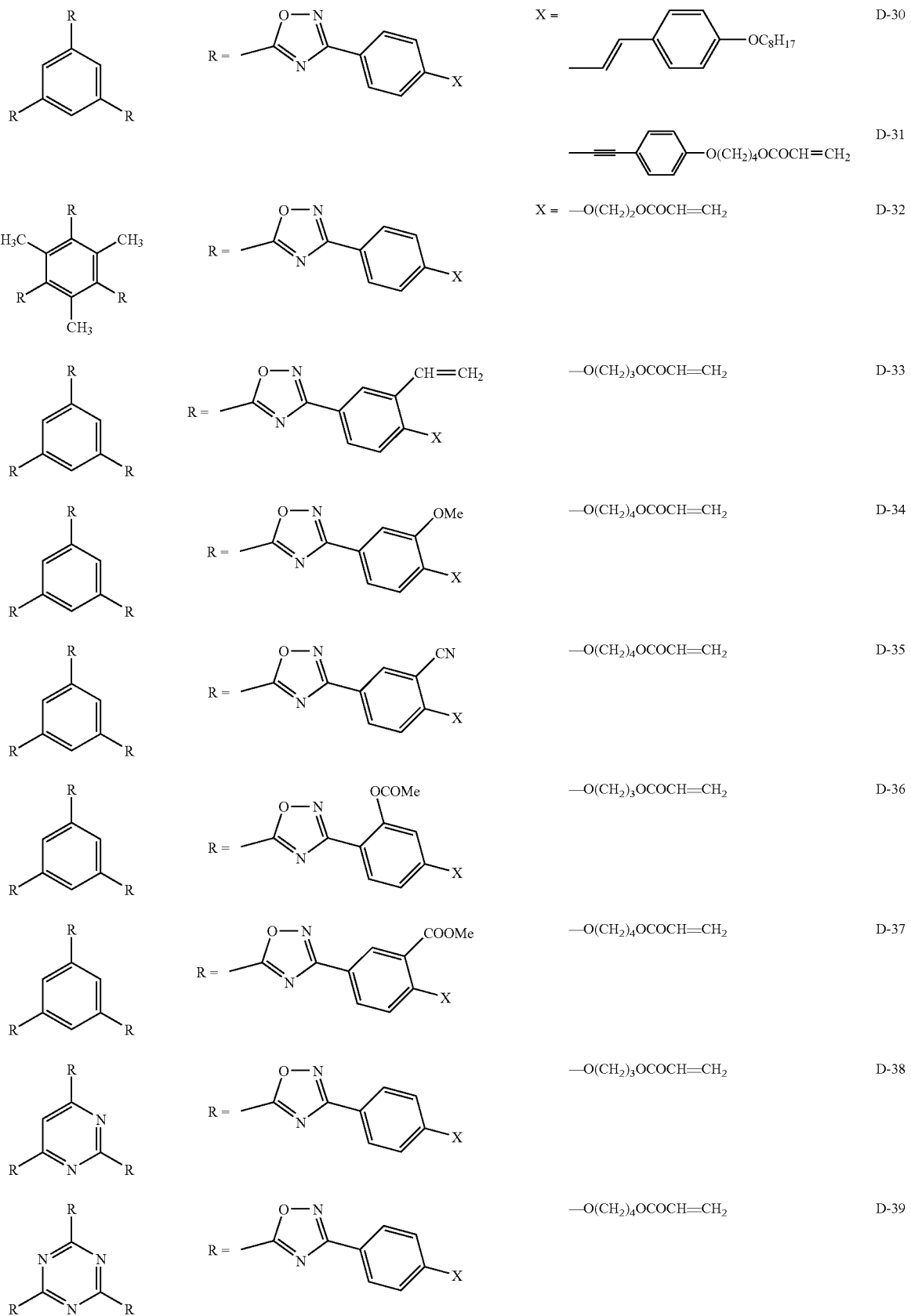

-continued

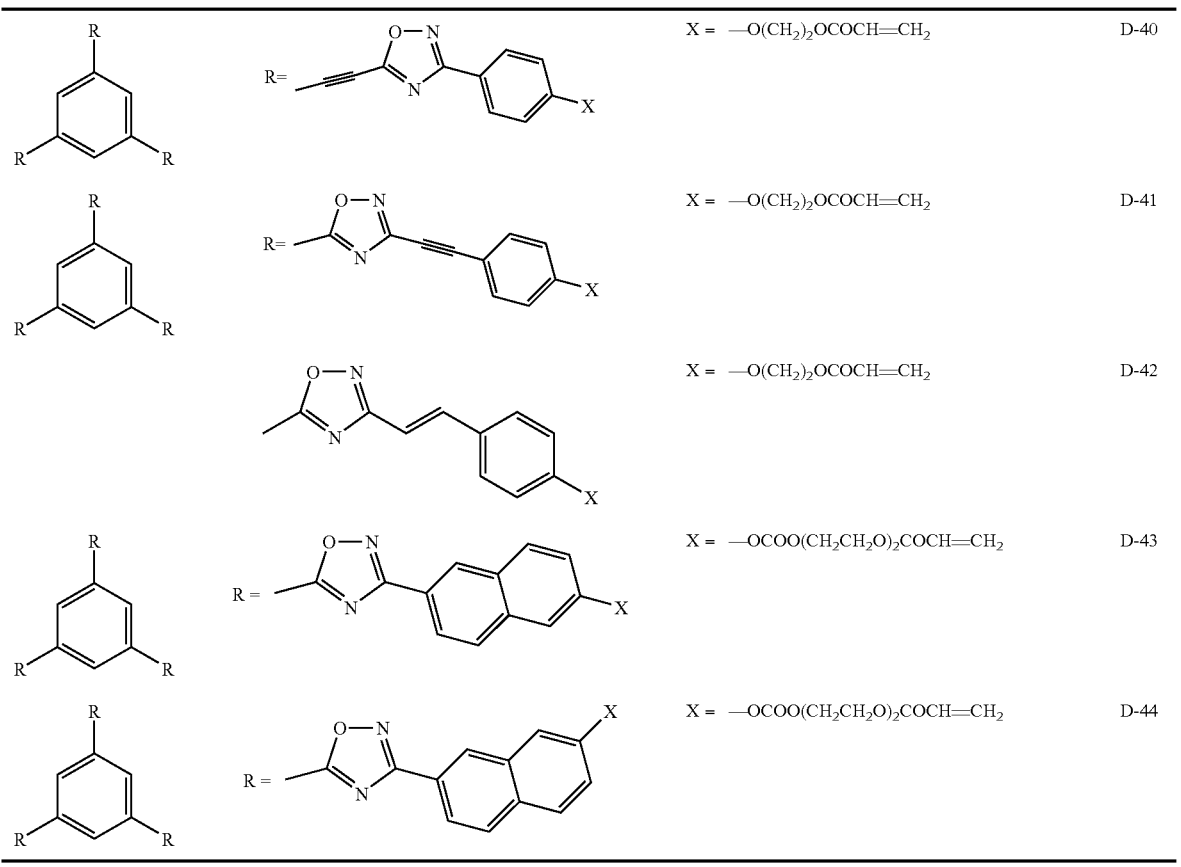

Compounds of formula (DIII) are shown below.

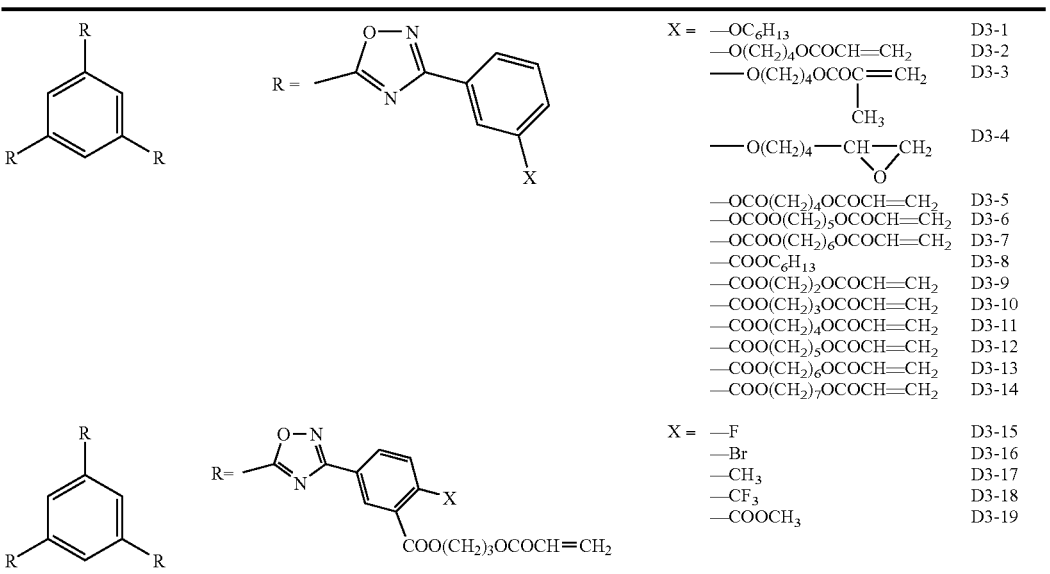

The liquid-crystal phase that the liquid-crystal compound of the invention expresses includes a columnar phase and a discotic nematic phase (ND phase). Of those liquid-crystal phases, preferred is a discotic nematic phase (ND phase) having a good monodomain property.

Preferably, the compound of formula (DI) expresses a liquid-crystal phase at a temperature falling within a range of from 20° C. to 300° C., more preferably from 40° C. to 280° C., even more preferably from 60° C. to 250° C. The wording "expresses a liquid-crystal phase at a temperature falling within a range of from 20° C. to 300° C." as referred to herein means that the liquid-crystal temperature range of the compound covers nearly 20° C. (concretely, for example, from 10° C. to 22° C.) and nearly 300° C. (concretely, for example, from 298° C. to 310° C.). The same shall apply to the range of from 40° C. to 280° C., and to the range of from 60° C. to 250° C.

The compound of formula (DI) for use in the invention may be produced in any known method.

Preferably, the viscosity of the liquid-crystal compound for use in the invention is from 500 to 1000 mPa·s at 80 to 150° C., more preferably from 600 to 900 mPa·s at that temperature.

Retardation Plate:

The retardation plate of the invention is characterized in that it has an optically-anisotropic layer formed with the composition of the invention. One embodiment of the retardation plate of the invention comprises a support, an alignment film formed on the support and an optically-anisotropic layer formed with the composition of the invention, in which the optically-anisotropic layer is controlled for its alignment by the alignment film and this is fixed in the alignment state thereof.

The optically-anisotropic layer, the alignment film and the support are sequentially described below.

(1) Optically-Anisotropic Layer:

The optically-anisotropic layer in the invention is formed with a composition that comprises a liquid-crystal compound of formula (DI) and a polymer having a structure of formula (A). In addition to these, the optically-anisotropic layer may optionally contain a polymerization initiator and any other additives. A coating liquid comprising them may be applied, for example, onto the surface of an alignment film formed on a support, and the liquid-crystal compound in the coating layer may be thereby aligned and fixed to form the intended optically-anisotropic layer. After the liquid-crystal compound in the thus-formed layer has been aligned and fixed therein, the support may be peeled away.

(1)-a Method of Layer Formation:

The optically-anisotropic layer may be formed by applying a coating liquid, which is prepared by dissolving a liquid-crystal compound of formula (DI) and a polymer in a solvent capable of dissolving them, onto an alignment film formed on a support and aligned thereon. If possible, the layer may also be formed in a mode of vapor deposition, but is preferably formed according to such a coating method. The coating method may be any known method of curtain-coating, dipping, spin-coating, printing, spraying, slot-coating, roll-coating, slide-coating, blade-coating, gravure-coating or wire bar-coating. Next, the coating layer is dried at 25° C. to 130° C. to remove the solvent, whereupon the molecules of the liquid-crystal compound therein are aligned and fixed by irradiation with UV rays, and the intended optically-anisotropic layer is thus formed. UV rays are preferably used for irradiation with light for polymerization. The irradiation energy is preferably from 20 mJ/cm$^2$ to 50 J/cm$^2$, more preferably from 100 mJ/cm$^2$ to 800 mJ/cm$^2$. For promoting the optical polymerization, the light irradiation may be attained under heat. Thus formed, the thickness of the optically-anisotropic layer may vary, depending on the optimum retardation value in accordance with the use of the layer for optical compensation or the like, but is preferably from 0.1 to 10 μm, more preferably from 0.5 to 5 μm.

Preferably, the molecules of the liquid-crystal compound are substantially uniformly aligned in the optically-anisotropic layer; more preferably, the molecules are fixed while substantially uniformly aligned therein; most preferably, the liquid-crystal compound is fixed through polymerization.

The ratio of the compound of formula (DI) or a polymer obtained from the compound of formula (DI) in the optically-anisotropic layer is preferably from 10 to 100% by mass, more preferably from 30 to 99% by mass, most preferably from 50 to 99% by mass.

(1)-b Other Materials for Use in Formation of Optically-Anisotropic Layer:

Preferably, the liquid-crystal compound is fixed while kept aligned in the optically-anisotropic layer, in which it is desirable that the fixation of the liquid-crystal compound is attained through polymerization of the polymerizing group introduced into the compound. For this, the coating liquid for the layer preferably contains a polymerization initiator. Polymerization includes thermal polymerization with a thermal polymerization initiator, photopolymerization with a photopolymerization initiator, and EB curing with electronic beams. Of those, preferred are photopolymerization (photo-curing) and EB curing. Preferred examples of the polymerization initiator that generates a radical by the action of light given thereto are α-carbonyl compounds (as in U.S. Pat. Nos. 2,367,661, 2,367,670), acyloin ethers (as in U.S. Pat. No. 2,448,828) α-hydrocarbon-substituted aromatic acyloin compounds (as in U.S. Pat. No. 2,722,512), polycyclic quinone compounds (as in U.S. Pat. Nos. 3,046,127, 2,951,758), combination of triarylimidazole dimer and p-aminophenyl ketone (as in U.S. Pat. No. 3,549,367), acridine and phenazine compounds (as in JP-A 60-105667, U.S. Pat. No. 4,239,850) and oxadiazole compounds (as in U.S. Pat. No. 4,212,970), acetophenone compounds, benzoin ether compounds, benzyl compounds, benzophenone compounds, thioxanthone compounds. The acetophenone compounds include, for example, 2,2-diethoxyacetophenone, 2-hydroxymethyl-1-phenylpropan-1-one, 4'-isopropyl-2-hydroxy-2-methyl-propiophenone, 2-hydroxy-2-methyl-propiophenone, p-dimethylaminoacetone, p-tert-butyldichloroacetophenone, p-tert-butyltrichloroacetophenone, p-azidobenzalacetophenone. The benzyl compounds include, for example, benzyl, benzyl dimethyl ketal, benzyl β-methoxyethyl acetal, 1-hydroxycyclohexyl phenyl ketone. The benzoin ether compounds include, for example, benzoin, benzoin methyl ether, benzoin ethyl ether, benzoin n-propyl ether, benzoin isopropyl ether, benzoin n-butyl ether, benzoin isobutyl ether. The benzophenone compounds include, for example, benzophenone, methyl o-benzoylbenzoate, Michler's ketone, 4,4'-bisdiethylaminobenzophenone, 4,4'-dichlorobenzophenone. The thioxanthone compounds include, for example, thioxanthone, 2-methylthioxanthone, 2-ethylthioxanthone, 2-isopropylthioxanthone, 4-isopropylthioxanthone, 2-chlorothioxanthone, 2,4-diethylthioxanthone. Of those aromatic ketones serving as a light-sensitive radical polymerization initiator, more preferred are acetophenone compounds and benzyl compounds in point of their curing capability, storage stability and odorlessness. One or more such aromatic ketones may be used herein as a light-sensitive radical polymerization initiator, either singly or as combined depending on the desired performance of the initiator. For the purpose of increasing the sensitivity thereof, a sensitizer may be added to the polymerization initiator. Examples of the sensitizer are n-butylamine, triethylamine, tri-n-butyl phosphine, thioxanthone.

Plural types of the photopolymerization initiators may be combined and used herein, and the amount thereof is preferably from 0.01 to 20% by mass of the solid content of the coating liquid, more preferably from 0.5 to 5% by mass. For light irradiation for polymerization of the liquid-crystal compound, preferably used are UV rays.

The solvent to be used in preparing the coating liquid for the optically-anisotropic layer is preferably an organic solvent. Examples of the organic solvent are amides (e.g., N,N-dimethylformamide), sulfoxides (e.g., dimethylsulfoxide), heterocyclic compounds (e.g., pyridine), hydrocarbons (e.g., toluene, hexane), alkyl halides (e.g., chloroform, dichloromethane), esters (e.g., methyl acetate, butyl acetate), ketones (e.g., acetone, 2-butanone, methyl isobutyl ketone, cyclohexanone), ethers (e.g., tetrahydrofuran, 1,2-dimethoxyethane). Of those, preferred are alkyl halides and ketones. Two or more different types of organic solvents may be combined for use herein.

The solid concentration of the liquid-crystal compound and other additives in the composition of the invention is preferably from 0.1% by mass to 60% by mass, more preferably from 0.5% by mass to 50% by mass, even more preferably 2% by mass to 40% by mass.

The viscosity of the composition of the invention is preferably from 0.01 mPa·s to 100 mPa·s, more preferably from 0.1 mPa·s to 50 mPa·s.

(1)-c Alignment State:

When used in a TN (twisted nematic) liquid-crystal mode retardation plate, the optically-anisotropic layer formed with the composition of the invention is preferably such that its discotic nematic phase is in a hybrid alignment state. "Hybrid alignment" as referred to herein means that the tilt angle of the liquid-crystal compound in the layer continuously varies in the direction of the thickness of the film.

When applied onto a support (more preferably onto an alignment film), a liquid-crystal compound may express its liquid-crystal phase, for example, after heated thereon. Accordingly, in the interface adjacent to the support, the liquid-crystal compound may be aligned at a tilt angle to the support surface or to the coating film interface (when an alignment film is provided, this is the alignment film interface) (for example, when a discotic liquid-crystal compound is used, the tilt angle is an angle formed by the direction of the support surface and the direction of the disc face of the liquid-crystal compound), and in interface adjacent to air, the compound may be aligned at a tilt angle to the air interface.

In the invention, the mean tilt angle of the optically-anisotropic layer (for example, the angle formed by the direction of the support surface and the direction of the disc face of the discotic liquid-crystal compound) is preferably from 10 to 40°, more preferably from 25 to 35°.

(2) Alignment Film:

An alignment film may be used in forming the retardation plate of the invention. The alignment film may be formed, for example, through rubbing treatment of a compound (preferably polymer), oblique vapor deposition of an inorganic compound, formation of a microgrooved layer, or accumulation of an organic compound (e.g., ω-tricosanoic acid, dioctadecylmethylammonium chloride, methyl stearate) according to a Langmuir-Blodgett's method (LB film). Further, there are known other alignment films that may have an alignment function through impartation of an electric field or magnetic field thereto or through light irradiation thereto.

In principle, the polymer to be used for the alignment film has a molecular structure that has the function of aligning liquid-crystal molecules. Preferably, the polymer for use in the invention has crosslinking functional group (e.g., double bond)—having side branches bonded to the backbone chain thereof or has a crosslinking functional group having the function of aligning liquid-crystal molecules introduced into the side branches thereof, in addition to having the function of aligning liquid-crystal molecules. The polymer to be used for the alignment film may be a polymer that is crosslinkable by itself or a polymer that is crosslinkable with a crosslinking agent, or may also be a combination of the two.

Examples of the polymer are methacrylate polymers, styrene polymers, polyolefins, polyvinyl alcohols and modified polyvinyl alcohols, poly(N-methylolacrylamides), polyesters, polyimides, vinyl acetate polymers, carboxymethyl cellulose and polycarbonates, as in JP-A 8-338913, [0022]. A silane coupling agent is also usable as the polymer. Preferably, the polymer is a water-soluble polymer (e.g., poly(N-methylolacrylamide), carboxymethyl cellulose, gelatin, polyvinyl alcohol, modified polyvinyl alcohol), more preferably gelatin, polyvinyl alcohol or modified polyvinyl alcohol, even more preferably polyvinyl alcohol or modified polyvinyl alcohol. Especially preferably, two different types of polyvinyl alcohols or modified polyvinyl alcohols having a different degree of polymerization are combined for use as the polymer.

Preferably, the degree of saponification of polyvinyl alcohol for use herein is from 70 to 100%, more preferably from 80 to 100%. Also preferably, the degree of polymerization of polyvinyl alcohol is from 100 to 5000.

The side branches having the function of aligning liquid-crystal molecules generally have a hydrophobic group as the functional group. Concretely, the type of the functional group may be determined depending on the type of the liquid-crystal molecules to be aligned and on the necessary alignment state of the molecules.

For example, the modifying group of modified polyvinyl alcohol may be introduced into the polymer through copolymerization modification, chain transfer modification or block polymerization modification. Examples of the modifying group are a hydrophilic group (e.g., carboxylic acid group, sulfonic acid group, phosphonic acid group, amino group, ammonium group, amido group, thiol group), a hydrocarbon group having from 10 to 100 carbon atoms, a fluorine atom-substituted hydrocarbon group, a thioether group, a polymerizing group (e.g., unsaturated polymerizing group, epoxy group, aziridinyl group), and an alkoxysilyl group (e.g., trialkoxy group, dialkoxy group, monoalkoxy group). Specific examples of such modified polyvinyl alcohol compounds are described, for example, in JP-A 2000-155216, [0022] to [0145], and in JP-A 2002-62426, [0018] to [0022].

When crosslinking functional group-having side branches are bonded to the backbone chain of an alignment film polymer, or when a crosslinking functional group is introduced into the side branches of a polymer having the function of aligning liquid-crystal molecules, then the polymer of the alignment film may be copolymerized with the polyfunctional monomer in an optically-anisotropic layer. As a result, not only between the polyfunctional monomers but also between the alignment film polymers, and even between the polyfunctional monomer and the alignment film polymer, they may be firmly bonded to each other in a mode of covalent bonding to each other. Accordingly, introducing such a crosslinking functional group into an alignment film polymer significantly improves the mechanical strength of the resulting retardation plate.

Preferably, the crosslinking functional group of the alignment film polymer contains a polymerizing group, like the polyfunctional monomer. Concretely, for example, those described in JP-A 2000-155216, [0080] to [0100] are referred to herein.

Apart from the above-mentioned crosslinking functional group, the alignment film polymer may also be crosslinked with a crosslinking agent.

The crosslinking agent includes, for example, aldehydes, N-methylol compounds, dioxane derivatives, compounds capable of being active through activation of the carboxyl group thereof, active vinyl compounds, active halide compound, isoxazoles and dialdehyde starches. Two or more different types of crosslinking agents may be combined for use herein. Concretely, for example, the compounds described in JP-A 2002-62426, [0023] to [0024] are employable herein. Preferred are aldehydes of high reactivity, and more preferred is glutaraldehyde.

Preferably, the amount of the crosslinking agent to be added to polymer is from 0.1 to 20% by mass of the polymer, more preferably from 0.5 to 15% by mass. Also preferably, the amount of the unreacted crosslinking agent that may remain in the alignment film is at most 1.0% by mass, more preferably at most 0.5% by mass. When the crosslinking agent in the alignment film is controlled to that effect, then the film ensures good durability with no reticulation even though it is used in liquid-crystal display devices for a long period of time and even though it is left in a high-temperature high-humidity atmosphere for a long period of time.

Basically, the alignment film may be formed by applying the alignment film-forming material of the above-mentioned polymer to a crosslinking agent-containing transparent support, then heating and drying it for crosslinking it and then optionally rubbing the thus-formed film. The crosslinking reaction may be effected in any stage after the film-forming material has been applied onto the transparent support, as so mentioned herein above. When a water-soluble polymer such as polyvinyl alcohol is used as the alignment film-forming material, then it is desirable that the solvent for the coating solution is a mixed solvent of a defoaming organic solvent (e.g., methanol) and water. The ratio by mass of water/methanol is preferably (more than 0 to 99)/(100 to less than 1), more preferably (more than 0 to 91)/(less than 100 to 9). The mixed solvent of the type is effective for preventing the formation of bubbles in the coating solution and, as a result, the surface defects of the alignment film and even the optically-anisotropic layer are significantly reduced.

For forming the alignment film, preferably employed is a spin-coating method, a dip-coating method, a curtain-coating method, an extrusion-coating method, a rod-coating method or a roll-coating method. Especially preferred is a rod-coating method. Also preferably, the thickness of the film is from 0.1 to 10 μm, after dried. The drying under heat may be effected, for example, at 20 to 110° C. For sufficient crosslinking, the heating temperature is preferably from 60 to 100° C., more preferably from 80 to 100° C. The drying time may be from 1 minute to 36 hours, but preferably from 1 to 30 minutes. The pH of the coating solution is preferably so defined that it is the best for the crosslinking agent used. For example, when glutaraldehyde is used, the pH of the coating solution is preferably from 4.5 to 5.5, more preferably pH 5.

The alignment film is provided on a support or on an undercoat layer. The alignment film may be formed by crosslinking the polymer layer as above, and then rubbing the surface of the layer.

For the rubbing treatment, usable is any method widely employed for liquid crystal alignment treatment in producing LCD devices. Concretely, for example, the surface of an alignment film is rubbed in a predetermined direction by the use of paper, gauze, felt, rubber, nylon, or polyester fibers, whereby the film may be aligned in the intended direction. In general, a cloth uniformly planted with fibers having the same length and the same thickness is used, and the surface of the film is rubbed a few times with the cloth.

After the liquid-crystal compound is aligned on the alignment film, if desired, the alignment film polymer and the polyfunctional monomer in the optically-anisotropic layer may be reacted, or the alignment film polymer may be crosslinked with a crosslinking agent. Preferably, the thickness of the alignment film is from 0.1 to 10 μm. A coating solution prepared by dissolving the above-mentioned alignment film polymer in a solvent is applied onto the surface of a support, and then the solvent in the coating solution is removed and dried at 25° C. to 140° C. to thereby form the intended alignment film. If possible, the film may also be formed in a mode of vapor deposition, but is preferably formed according to a coating process. The thickness of the alignment film thus formed is preferably from 0.01 to 5 μm, more preferably from 0.05 to 2 μm.

The solvent for use in preparing the alignment film-forming coating solution includes, for example, water, alcohols (e.g., methanol, ethanol, isopropanol), amides (e.g., N,N-dimethylformamide), acetonitrile, acetone, methyl ethyl ketone, methyl isobutyl ketone, ethyl acetate; preferably water, alcohols and their mixed solvents. The concentration of the alignment film polymer in the coating solution is preferably from 0.1% by mass to 40% by mass, more preferably from 0.5% by mass to 20% by mass, even more preferably from 2% by mass to 10% by mass. The viscosity of the coating solution is preferably from 0.1 cp to 100 cp, more preferably from 0.5 cp to 50 cp.

The coating solution may contain any other additives in addition to the above-mentioned alignment film polymer therein. For example, when the alignment film polymer is hardly soluble in a water-soluble solvent, then a basic compound (e.g., sodium hydroxide, lithium hydroxide, triethylamine) or an acid compound (e.g., hydrochloric acid, acetic acid, succinic acid) may be added thereto to promote its dissolution in the solvent.

The alignment film formed according to the above method is preferably rubbed on its surface thereby having a property of aligning liquid-crystal molecules. The rubbing treatment may be attained by rubbing the surface of the polymer-coated surface a few times with paper or cloth in one direction (generally in the machine direction). Apart from such rubbing treatment, the alignment film may also be processed for impartation of an electric field of a magnetic field thereto, thereby having a property of aligning liquid-crystal molecules. For making the alignment film have the property of aligning liquid-crystal molecules, preferred is the method of rubbing the alignment film in which the thus-rubbed polymer may have the intended property.

(3) Support:

The retardation plate may have a support, in which the support is preferably a transparent support. Not specifically defined, the material of the support may be any one that is essentially optically isotropic and has a light transmittance of at least 80%. Preferably, however, the support is a polymer film. Examples of the polymer are cellulose esters (e.g., cellulose diacetate, cellulose triacetate), norbornene polymers, poly(meth)acrylates. Many commercially-available polymers may be favorably used for the support. Of those, more preferred are cellulose esters in view of the optical properties thereof; even more preferred are lower fatty acid esters of cellulose. The lower fatty acid is a fatty acid having at most 6 carbon atoms, preferably having 2, 3 or 4 carbon atoms. Concretely, herein usable are cellulose acetate, cellulose propionate and cellulose butyrate. Of those, especially preferred is cellulose triacetate. A mixed fatty acid ester such as cellulose acetate propionate, cellulose acetate butyrate may also be used. Conventional polymers that may readily express birefringence, such as polycarbonates or polysulfones are also usable herein so far as they are modified according to molecule modification as in WO00/26705 to thereby lower their ability to express birefringence.

Cellulose ester preferred for use as support is described in detail hereinunder.

The cellulose ester for support is preferably cellulose acetate having a degree of acetylation of from 55.0 to 62.5%, more preferably from 57.0 to 62.0%. The degree of acetylation as referred to herein means the amount of the bonding acetic acid per cellulose unit mass. The degree of acetylation may be determined according to determination and computation in ASTM: D-817-91 (method for testing cellulose acetate, etc.). Preferably, the viscosity-average degree of polymerization (DP) of the cellulose ester is at least 250, more preferably at least 290. Preferably, the molecular weight distribution, Mw/Mn by gel permeation chromatography (Mw is a mass-average molecular weight, and Mn is a number-average molecular weight) of the cellulose ester for use in the invention is narrow. Concretely, Mw/Mn of the ester is preferably from 1.0 to 1.7, more preferably from 1.3 to 1.65, even more preferably from 1.4 to 1.6.

In cellulose ester, the overall degree of substitution is not always uniformly divided into 3 for the degree of substitution at the 2-, 3- and 6-positioned hydroxyl groups of cellulose to be ⅓ each, but the degree of substitution at the 6-positioned hydroxyl group tends to be small. In the invention, however, the degree of substitution at the 6-positioned hydroxyl group of cellulose is preferably higher than that at the 2- and 3-positioned hydroxyl groups thereof. Preferably, the degree of substitution at the 6-positioned hydroxyl group is from 30% to 40% of the overall degree of substitution; and also preferably, the hydroxyl group is substituted with an acyl group. Preferably, the degree of substitution with an acyl group is at least 31%, more preferably at least 32%. Also preferably, the degree of substitution at the 6-position is at least 0.88. The 6-positioned hydroxyl group may be substituted with any other acyl group having 3 or more carbon atoms (e.g., propionyl group, butyryl group, valeroyl group, benzoyl group, acryloyl group), apart from with an acetyl group. The degree of substitution at each position may be determined through NMR. Cellulose ester having a high degree of substitution at the 6-positioned hydroxyl group may be produced with reference to JP-A 11-5851, concretely, the method of Production Example 1 in paragraphs [0043] to [0044], Production Example 2 in paragraphs [0048] to [0049] and Production Example 3 in paragraphs [0051] to [0052].

The polymer film, especially the cellulose acetate film for support may contain an aromatic compound having at least two aromatic groups and serving as a retardation improver for the purpose of controlling the retardation value of the film. When such a retardation improver is added to the film, then its amount is preferably from 0.01 to 20 parts by mass, more preferably from 0.05 to 15 parts by mass, even more preferably from 0.1 to 10 parts by mass, relative to 100 parts by mass of cellulose acetate. Two or more aromatic compounds may be combined and used for the retardation improver.

The aromatic ring of the aromatic compound as referred to herein is meant to include not only aromatic hydrocarbon rings but also aromatic hetero rings.

The aromatic hydrocarbon ring is preferably a 6-membered ring (that is, benzene ring). The aromatic hetero ring is generally an unsaturated hetero ring. The aromatic hetero ring is preferably a 5-membered, 6-membered or 7-membered ring, more preferably a 5-membered or 6-membered ring. The aromatic hetero ring generally has a largest number of double bonds. The hetero atom of the ring is preferably a nitrogen atom, an oxygen atom and a sulfur atom, more preferably a nitrogen atom. Examples of the aromatic hetero ring are a furan ring, a thiophene ring, a pyrrole ring, an oxazole ring, an isoxazole ring, a thiazole ring, an isothiazole ring, an imidazole ring, a pyrazole ring, a furazan ring, a triazole ring, a pyran ring, a pyridine ring, a pyridazine ring, a pyrimidine ring, a pyrazine ring and a 1,3,5-triazine ring. The aromatic ring is preferably a benzene ring, a furan ring, a thiophene ring, a pyrrole ring, an oxazole ring, a thiazole ring, an imidazole ring, a triazole ring, a pyridine ring, a pyrimidine ring, a pyrazine ring and a 1,3,5-triazine ring, more preferably a benzene ring and a 1,3,5-triazine ring. More preferably, the aromatic compound has at least one 1,3,5-triazine ring.

The number of the aromatic rings that the aromatic compound has is preferably from 2 to 20, more preferably from 2 to 12, even more preferably from 2 to 8, still more preferably from 2 to 6. The bonding relation between two aromatic rings in the compound may be grouped into (a) a case where the two rings form a condensed ring, (b) a case where the two rings bond to each other via a single bond, and (c) a case where the two rings bond to each other via a linking group (in this, since the rings are aromatic rings, they could not form a spiro bond). In the invention, the bonding relation may be any of (a) to (c). The retardation improver of the type is described in WO01/88574, WO00/2619, JP-A 2000-111914, JP-A 2000-275435, JP-A 2002-363343.

The cellulose acetate film for use herein is preferably produced from a prepared cellulose acetate solution (dope) according to a solution-casting process. The above-mentioned retardation improver may be added to the dope. The dope is cast on a drum or a band, on which the solvent is evaporated away to form a film. Before cast, the concentration of the dope is preferably so controlled that the solid content thereof is from 18 to 35%. Preferably, the surface of the drum or the band is finished to have a mirror face. The casting and drying method in the solution-casting process is described in U.S. Pat. Nos. 2,336,310, 2,367,603, 2,492,078, 2,492,977, 2,492,978, 2,607,704, 2,739,069, 2,739,070; British Patent 640731, 736892; JP-B 45-4554, 49-5614; JP-A 60-176834, 60-203430, 62-115035. Preferably, the dope is cast onto a drum or a band having a surface temperature of at most 10° C. Preferably, the cast dope is dried through exposure to air for at least 2 seconds. The formed film is peeled away from the drum or band, and it may be further dried with hot air of which the temperature is successively changed up to 100 to 160° C., thereby evaporating away the remaining solvent. This method is described in JP-B 5-17844. According to the method, the time to be taken from casting to peeling may be shortened. To be processed according to the method, the dope must gel at the surface temperature of the drum or band on which it is cast.

The dope is prepared by dissolving the starting material flakes in a solvent of, for example, halogenohydrocarbons (e.g., dichloromethane), alcohols (e.g., methanol, ethanol, butanol), esters (e.g., methyl formate, methyl acetate), ethers (e.g., dioxane, dioxolan, diethyl ether). The solvent to dissolve cellulose acylate is typically dichloromethane. However, from the viewpoint of global environment and working environment protection, it is desirable that the solvent does not substantially contain a halogenohydrocarbon such as dichloromethane. "Not substantially contain" means that the halogenohydrocarbon content of the organic solvent is less than 5% by mass (preferably less than 2% by mass).

Cellulose acylate film not substantially containing a halogenohydrocarbon such as dichloromethane and its production method are described in Hatsumei Kyokai Disclosure Bulletin (No. 2001-1745, issued Mar. 15, 2001—hereinafter referred to as Disclosure Bulletin No. 2001-1745).

The prepared cellulose acetate solutions (dopes) may be cast into two or more layers to form a film. The dope may be cast onto a drum or a band, on which the solvent may be evaporated away to give a film. Before cast, the concentration of the dope is preferably so controlled that the solid content thereof could be from 10 to 40%. Preferably, the surface of the drum or the band is finished to have a mirror face. In case where plural cellulose acetate solutions are cast, the cellulose acetate-containing solutions may be separately cast from the respective casting ports disposed at intervals in the machine direction in which the support travels, and laminated into a multi-layered film. For example, the methods described in JP-A 61-158414, 1-122419, 11-198285 may be employed. Cellulose acetate solutions may be cast through two casting ports. For example, the methods described in JP-B 60-27562, JP-A 61-94724, 61-947245, 61-104813, 61-158413, 6-134933 may be employed. In addition, the method described in JP-A 56-162617 is also employable herein, which is a casting method for producing a cellulose acetate film and comprises enveloping a flow of a high-viscosity cellulose acetate solution in a low-viscosity cellulose acetate solution and simultaneously extruding the high-density and low-density cellulose acetate solutions.

The retardation of the cellulose acetate film may be controlled by stretching the film. Preferably, the draw ratio in stretching the film is from 0 to 100%. The cellulose acetate film for use in the invention is stretched preferably with a tenter. Preferably, for accurately controlling the slow axis of the stretched film, the difference in the tenter clip speed and the release timing between the left clip and the right clip is as small as possible.

A plasticizer may be added to the cellulose ester film for improving the physical properties of the film and for improving the driability of the film. Phosphates or carboxylates may be used for the plasticizer. Examples of the phosphates are triphenyl phosphate (TPP) and tricresyl phosphate (TCP). The carboxylates are typically phthalates and citrates. Examples of the phthalates are dimethyl phthalate (DMP), diethyl phthalate (DEP), dibutyl phthalate (DBP), dioctyl phthalate (DOP), diphenyl phthalate (DPP) and di-2-ethyl-hexyl phthalate (DEHP). Examples of the citrates are triethyl o-acetylcitrate (OACTE) and tributyl o-acetylcitrate (OACTB). Examples of the other carboxylates are butyl oleate, methylacetyl ricinoleate, dibutyl sebacate, and various trimellitates. Preferred are phthalate plasticizers (DMP, DEP, DBP, DOP, DPP, DEHP). More preferred are DEP and DPP. The amount of the plasticizer to be added is preferably from 0.1 to 25% by weight of the amount of cellulose ester, more preferably from 1 to 20% by mass, most preferably from 3 to 15% by mass.

A degradation inhibitor (e.g., antioxidant, peroxide-decomposing agent, radical inhibitor, metal inactivator, acid scavenger, amine) and a UV inhibitor may be added to the cellulose ester film. The degradation inhibitor is described in JP-A 3-199201, 5-1907073, 5-194789, 5-271471, 6-107854.

The amount of the degradation inhibitor to be added is preferably from 0.01 to 1% by mass of the prepared solution (dope), more preferably from 0.01 to 0.2% by mass. When the amount thereof is at least 0.01% by mass, then the degradation inhibitor could be effective; but when the amount thereof is more than 1% by mass, then the degradation inhibitor may bleed out on the film surface. Especially preferably, the degradation inhibitor is butylated hydroxytoluene (BHT). The UV inhibitor is described in JP-A 7-11056.

Preferably, the cellulose acetate film is surface-treated. Concretely, the surface treatment includes corona discharge treatment, glow discharge treatment, flame treatment, acid treatment, alkali treatment, UV irradiation treatment. As in JP-A 7-333433, it may be desirable to form an undercoat layer on the film. From the viewpoint of keeping the surface smoothness thereof, the temperature of the cellulose acetate film in the surface treatment is preferably not higher than Tg (glass transition temperature), concretely not higher than 150° C.

From the viewpoint of the adhesiveness thereof to alignment film, the surface treatment of the cellulose acetate film is preferably acid treatment or alkali treatment for saponification of cellulose acetate.

An example of alkali saponification treatment is concretely described below.

Preferably, alkali saponification comprises a cycle of dipping a film surface in an alkali solution, neutralizing it with an acid solution, washing it and drying it. The alkali solution may be a potassium hydroxide solution or a sodium hydroxide solution. The normality concentration of the hydroxide ion in the solution is preferably from 0.1 to 3.0 N, more preferably from 0.5 to 2.0 N. The temperature of the alkali solution is preferably from room temperature (e.g., 25° C.) to 90° C., more preferably from 40 to 70° C.

Preferably, the surface energy of the cellulose acetate film is at least 55 mN/m, more preferably from 60 to 75 mN/m.

Preferably, the thickness of the cellulose acetate film is from 5 to 500 μm, more preferably from 20 to 250 μm, even more preferably from 30 to 180 μm, still more preferably from 30 to 110 μm.

The retardation film may be combined with a polarizing film for use for elliptically-polarizing plates. As combined with a polarizing film, the retardation film may also be used in transmission-type, reflection-type and semitransmission-type liquid-crystal display devices, in which the film may contribute toward enlarging the viewing angle of the devices. An elliptically-polarizing plate and a liquid-crystal display device that comprise the retardation plate are described below.

Elliptically-Polarizing Plate:

An elliptically-polarizing plate may be produced by laminating a retardation plate and a polarizing film. Comprising a retardation plate, the elliptically-polarizing plate may be built in a liquid-crystal display device, in which the plate may act to enlarge the viewing angle of the device. The polarizing plate includes an iodine-containing polarizing plate, a dichroic dye-containing polarizing plate and a polyene-containing polarizing plate. The iodine-containing polarizing plate and the dye-containing polarizing plate may be produced generally from polyvinyl alcohol films. The polarization axis of the polarizing film corresponds to the direction vertical to the stretching direction of the film.

The polarizing film is laminated on the side of the optically-anisotropic layer of a retardation plate. Preferably, a protective film is formed on the opposite side to the side of the retardation plate laminated with the polarizing film. The protective film is preferably a transparent film having a light transmittance of at least 80%. The transparent protective film may be generally formed of a cellulose ester film, preferably a triacetyl cellulose film. Preferably, the cellulose ester film is formed according to a solution-casting process. Preferably, the thickness of the protective film is from 20 to 500 μm, more preferably from 50 to 200 μm.

Liquid-Crystal Display Device:

The retardation plate of the invention contributes toward enlarging the viewing angle of liquid-crystal display devices comprising it. A liquid-crystal display device generally comprises a liquid-crystal cell, a polarizing element and a retardation plate (optical compensatory sheet). The polarizing element generally comprises a polarizing film and a protective film, in which the polarizing film and the protective film may be the same as those mentioned for the above elliptically-polarizing plate. A retardation plate (optical compensatory sheet) for TN-mode liquid-crystal cells is described in JP-A 6-214116, U.S. Pat. Nos. 5,583,679, 5,646,703, and German Patent 3911620A1. A retardation plate for IPS-mode or FLC-mode liquid-crystal cells is described in JP-A 10-54982. A retardation plate for OCB-mode or HAN-mode liquid-crystal cells is described in U.S. Pat. No. 5,805,253 and WO96/37804. A retardation plate for STN-mode liquid-crystal cells is described in JP-A9-26572. A retardation plate for VA-mode liquid-crystal cells is described in Japanese Patent 2866372.

In the invention, retardation plates (optical compensatory sheets) for various modes of liquid-crystal cells as above may be produced with reference to the description of the above-mentioned patent publications. The retardation plates may be used in various display modes of liquid-crystal display devices, such as TN (twisted nematic)-mode, IPS (in-plane switching)-mode, FLC (ferroelectric liquid-crystal)-mode, OCB (optically-compensatory bend)-type, STN (super-twisted nematic)-mode, VA (vertically-aligned)-mode and HAN (hybrid aligned nematic)-mode liquid-crystal display devices. The retardation plate is especially effective for optical compensation for TN (twisted nematic)-mode or OCB (optically-compensatory bend)-mode liquid-crystal display devices.

EXAMPLES

The characteristics of the invention are described more concretely with reference to the following Examples and Comparative Examples. In the following Examples, the material used, its amount and ratio, the details of the treatment and the treatment process may be suitably modified or changed not overstepping the spirit and the scope of the invention. Accordingly, the invention should not be limitatively interpreted by the Examples mentioned below.

Production Example 1

Production of D3-10

This was produced according to the following scheme 1:

Scheme 1:

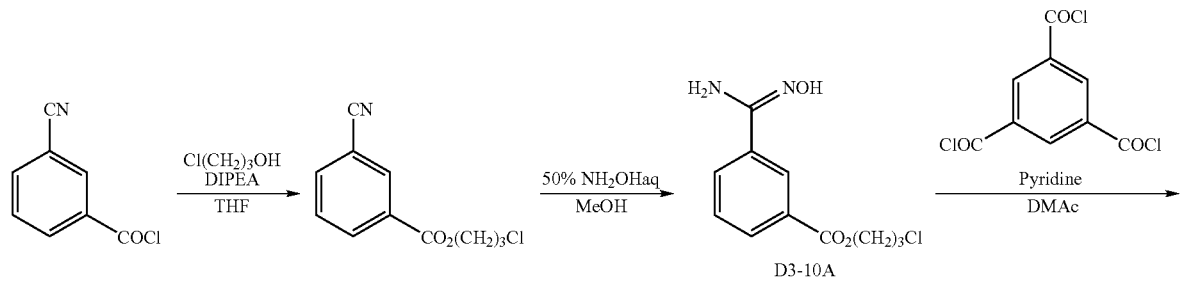

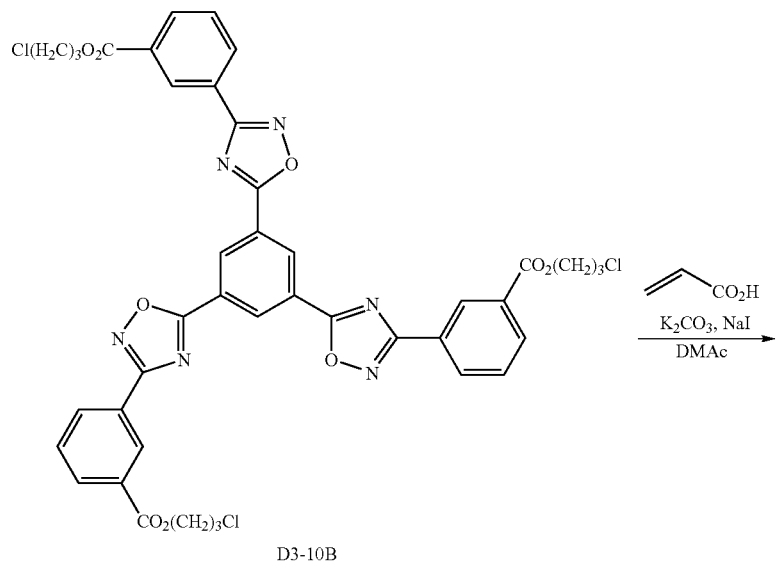

D3-10B

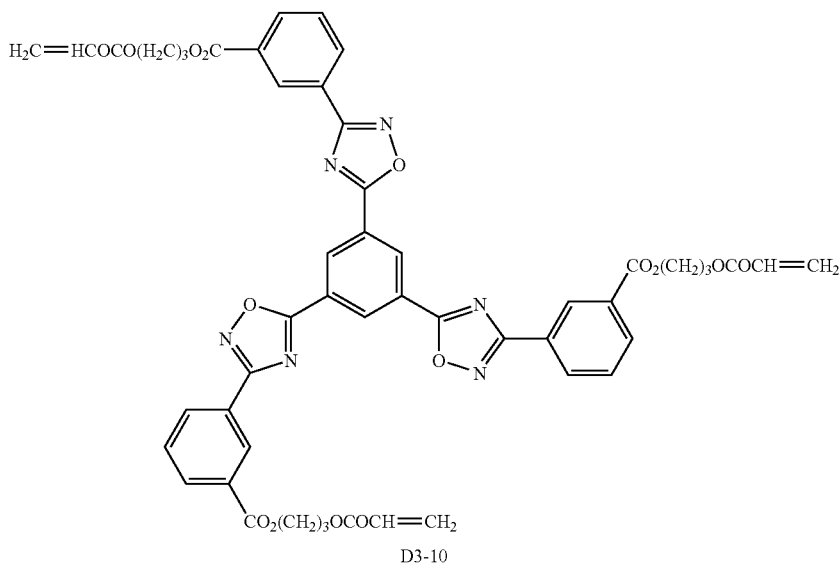

D3-10

Production of D3-10A 2.5 g of 3-cyanobenzoyl chloride was dissolved in 20 ml of tetrahydrofuran (THF), then 1.3 ml of 3-chloro-1-propanol and 3.0 ml of diisopropylethylamine (DIPEA) were added thereto, and stirred at room temperature for 1 hour. Water was added to the reaction liquid, extracted with ethyl acetate, and the organic layer was concentrated under reduced pressure. The residue was dissolved in 100 ml of methanol (MeOH), 2.8 ml of 50% hydroxylamine solution was added thereto, and stirred at 40° C. for 1 hour. After cooled, water was added to the reaction liquid, and the precipitated crystal was taken out through filtration, and dried to obtain 3.4 g of D3-10A.

Production of D3-10B 3.4 g of D3-10A was dissolved in 10 ml of dimethylacetamide (DMAc), then 1.2 ml of pyridine and 1.2 g of trimesyl chloride were added thereto, and stirred at 120° C. for 1 hour. After cooled, methanol was added to it, and the precipitated crystal was taken out through filtration and dried to obtain 3.9 g of D3-10B.

Production of D3-10

3.9 g of D3-10B was dissolved in 50 ml of dimethylacetamide, then 3.7 g of potassium carbonate, 2.0 g of sodium iodide and 1.9 ml of acrylic acid were added thereto, and stirred at 100° C. for 3 hours. Water was added to the reaction liquid, and the precipitated crystal was taken out through filtration. This was purified through column chromatography to obtain 3.0 g of D3-10. The NMR spectrum of the thus-obtained D3-10 is as follows:

$^1$H-NMR (solvent: CDCl$_3$, standard: tetramethylsilane) δ (ppm): 2.30 (6H, quint), 4.40 (6H, t), 4.55 (6H, t), 5.85 (3H. dd), 6.15 (3H, dd), 6.45 (3H, dd), 7.65 (3H, t), 8.25 (3H, d), 8.45 (3H, d), 8.90 (3H, s), 9.30 (3H, s).

The phase transition temperature profile of the compound D3-10 was determined through texture observation with a polarizing microscope. While the compound was heated, it changed from a crystal phase to a discotic nematic liquid-crystal phase at around 115° C., and then changed to an isotropic liquid phase at higher 178° C. This confirms that D3-10 exhibits a discotic nematic liquid-crystal phase between 115° C. and 178° C.

Production Example 2

Production of D3-12

D3-12 was produced in the same manner as in Production Example 1, for which, however, 5-bromo-1-pentanol (by Tokyo Kasei) was used in place of 3-chloro-1-propanol. The product was purified through column chromatography, and 5.6 g of D3-12 was obtained (yield: 54%). The NMR spectrum of the thus-obtained D3-12 is as follows:

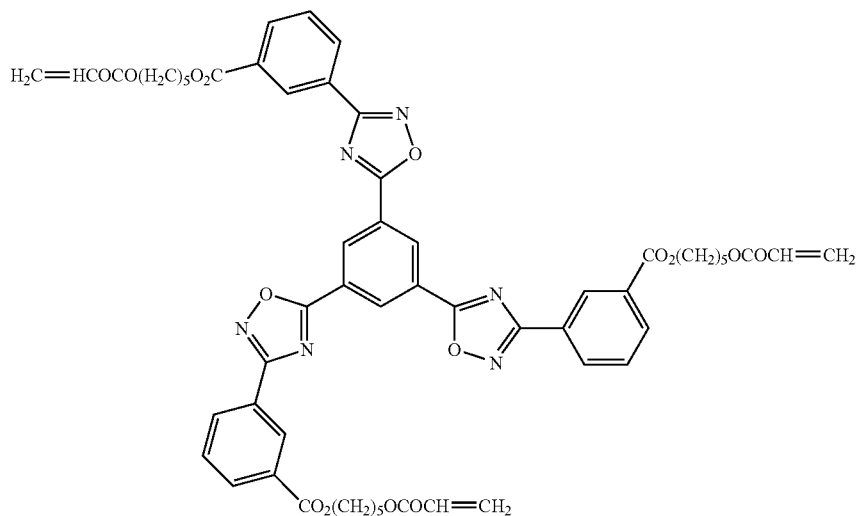

D3-12

¹H-NMR (solvent: CDCl₃, standard: tetramethylsilane) δ (ppm): 1.60 (6H, m), 1.80-1.90 (12H, m), 4.25 (6H, t), 4.45 (6H, t), 5.80 (3H, dd), 6.15 (3H, dd), 6.40 (3H, dd), 7.65 (3H, t), 8.25 (3H, d), 8.45 (3H, d), 8.90 (3H, s), 9.30 (3H, s).

The phase transition temperature profile of the compound D3-12 was determined through texture observation with a polarizing microscope. While the compound was heated, it changed from a crystal phase to a discotic nematic liquid-crystal phase at around 86° C., and then changed to an isotropic liquid phase at higher 142° C. This confirms that D3-12 exhibits a discotic nematic liquid-crystal phase between 86° C. and 142° C.

Production Example 3

Monomer A-1'

This was produced according to the following scheme 2:

Scheme 2:

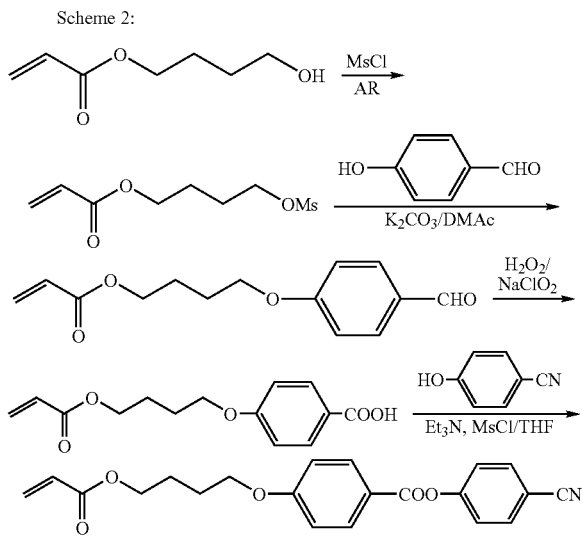

4-Hydroxybutyl acrylate (by Tokyo Kasei) was methanesulfonylated with methanesulfonyl chloride (MsCl) in acetonitrile, then this was reacted with N,N-dimethylacetamide (DMAc) in 4-hydroxybenzaldehyde (by Wako Pure Chemical Industries) to obtain 4-(4-acryloxybutoxy)phenylaldehyde. The resulting aldehyde compound was oxidized with hydrogen peroxide/sodium chlorite to obtain 4-(4-acryloxybutoxy)benzoic acid. The benzoic acid compound was condensed with 4-hydroxybenzonitrile (by Tokyo Kasei) according to a mixed acid anhydride process of using methanesulfonyl chloride (MsCl) and triethylamine (Et₃N) in THF, thereby obtaining 41 g of 1-cyano-4-(4'-acryloxybutoxy)benzoyloxy)benzene (this is abbreviated as A-1'). Its overall yield was 75%. The NMR spectrum of A-1' is as follows:

¹H-NMR (solvent: CDCl₃, standard: tetramethylsilane) δ (ppm): 1.90 (4H, m), 4.10 (2H, t), 4.25 (2H, t), 5.85 (1H, dd), 6.15 (1H, dd), 6.45 (1H, dd), 6.95 (2H, d), 7.35 (2H, d), 7.75 (2H, d), 8.12 (2H, d).

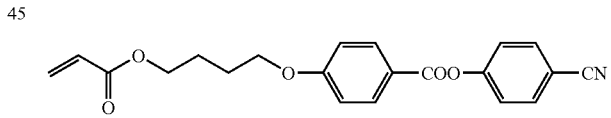

Production Example 4

Monomer A-2'

23 g (yield: 65%) of 1-methoxy-4-(4'-acryloyloxybutoxy)benzoyloxy)benzene was obtained in the same manner as in Production Example 3, for which, however, 4-methoxyphenol (by Tokyo Kasei) was used in place of 4-hydroxybenzonitrile. This is hereinafter abbreviated as A-2'. Its NMR spectrum is as follows:

¹H-NMR (solvent: CDCl₃, standard: tetramethylsilane) δ (ppm): 1.92 (4H, m), 3.80 (3H, s), 4.10 (2H, t), 4.26 (2H, t), 5.85 (1H, dd), 6.15 (1H, dd), 6.45 (1H, dd), 6.94 (4H, m), 7.10 (2H, d), 8.12 (2H, d).

67

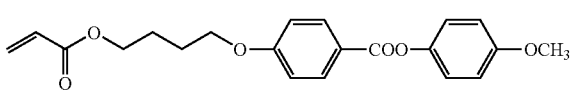

Production Example 5

A-3'

This was produced according to the following scheme 3:

Scheme 3:

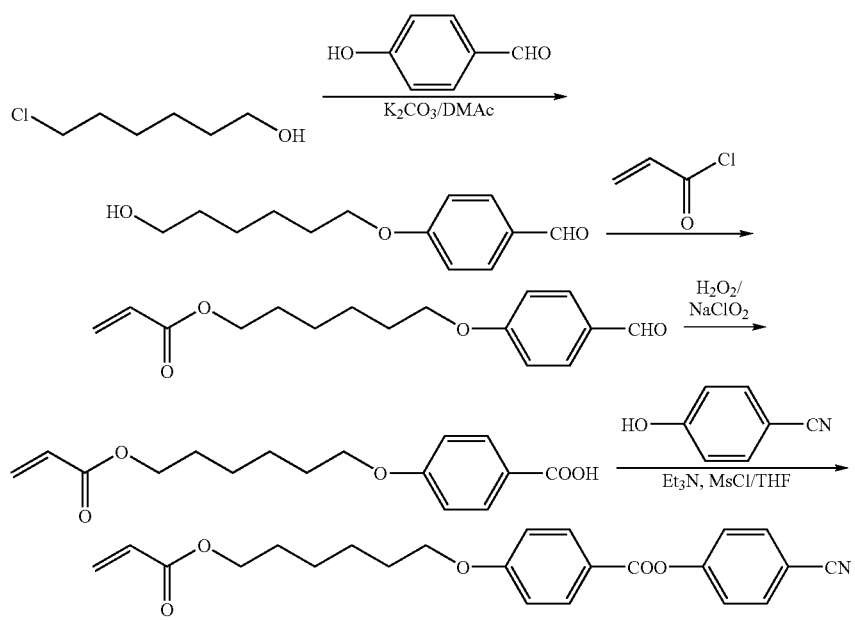

6-Chloro-1-hexanol (by Wako Pure Chemical Industries) and 4-hydroxybenzaldehyde (by Wako Pure Chemical Industries) were dissolved in DMAc, and with stirring it, potassium carbonate powder was added thereto, and reacted at 90°. This was recrystallized from ethanol to obtain 4-(6-hydroxyhexyloxy)phenylaldehyde. Then, the resulting 4-(6-hydroxyhexyloxy)phenylaldehyde and triethylamine were dissolved in THF, and in an ice-water bath, acryloyl chloride was added thereto and stirred. After the reaction, this was purified through silica gel column chromatography, and recrystallized from ethanol to obtain 4-(6-acryloyloxyhexyloxy)phenylaldehyde. The resulting aldehyde compound was oxidized with hydrogen peroxide/sodium chlorite to obtain 4-(6-acryloyloxyhexyloxy)benzoic acid. The product 4-(6-acryloyloxyhexyloxy)benzoic acid and 4-hydroxybenzonitrile (by Tokyo Kasei) were condensed according to a mixed acid anhydride process of using MsCl and triethylamine in THF to obtain 31 g of 1-cyano-4-(6'-acryloyloxyhexyloxy)benzoyloxy)benzene, A-3'. Its overall yield was 50%.

68

The NMR spectrum of A-3' is as follows:

$^1$H-NMR (solvent: CDCl$_3$, standard: tetramethylsilane) δ (ppm): 1.40-1.60 (4H, m), 1.73 (2H, quint), 1.82 (2H, quint), 4.05 (2H, t), 4.16 (2H, t), 5.80 (1H, dd), 6.12 (1H, dd), 6.40 (1H, dd), 6.96 (2H, d), 7.35 (2H, d), 7.74 (2H, d), 8.12 (2H, d).

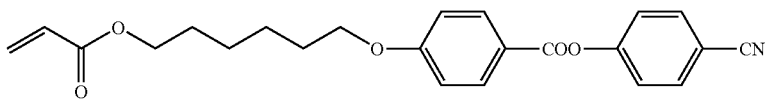

Production Example 6

Monomer A-8'

This was produced according to the following scheme 4:

Scheme 4:

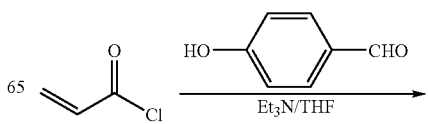

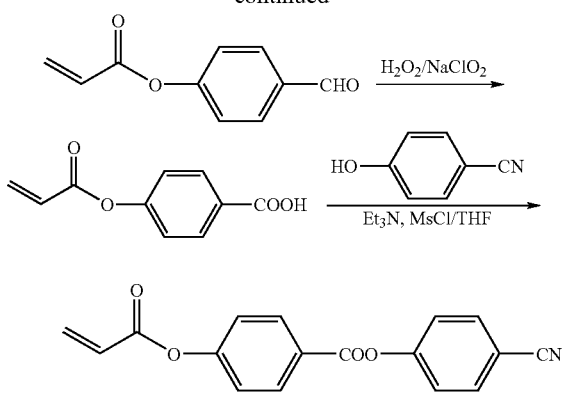

4-Hydroxybenzaldehyde (by Wako Pure Chemical Industries) and triethylamine were dissolved in THF, and in an ice-water bath, acryloyl chloride was added thereto and stirred. After the reaction, the system was recrystallized from ethanol to obtain 4-acryloyloxyphenylaldehyde. Then, the thus-obtained aldehyde compound was oxidized with hydrogen peroxide/sodium chlorite to obtain 4-acryloyloxybenzoic acid. The benzoic acid compound and 4-hydroxybenzonitrile (by Tokyo Kasei) were condensed according to a mixed acid anhydride process of using methanesulfonyl chloride and triethylamine in THF to obtain 26 g (overall yield: 57%) of A-8'. Its NMR spectrum is as follows:

¹H-NMR (solvent: heavy acetone, standard: tetramethylsilane) δ (ppm): 6.16 (1H, dd), 6.42 (1H, dd), 6.62 (1H, dd), 7.45 (2H, d), 7.60 (2H, d), 7.95 (2H, d), 8.30 (2H, d).

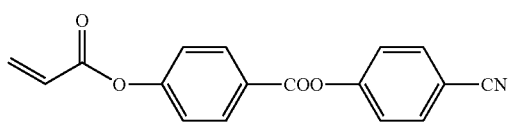

Production Example 7

Monomer A-25'

42 g (yield: 84%) of 1-cyano-2-fluoro-4-(4'-acryloyloxybutoxy)benzoyloxy)benzene was obtained in the same manner as in Production Example 3, for which, however, 3-fluoro-4-hydroxybenzonitrile (by Tokyo Kasei) was used in place of 4-hydroxybenzonitrile. This is hereinafter abbreviated as A-25'. Its NMR spectrum is as follows:

¹H-NMR (solvent: CDCl₃, standard: tetramethylsilane) δ (ppm): 1.90 (4H, m), 4.10 (2H, t), 4.26 (2H, t), 5.85 (1H, dd), 6.15 (1H, dd), 6.45 (1H, dd), 6.96 (2H, d), 7.20 (2H, m), 7.68 (1H, t), 8.10 (2H, d).

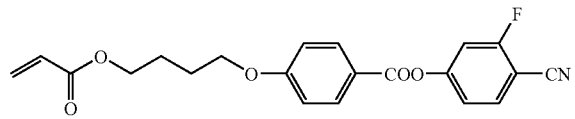

Production Example 8

Monomer A-28'

This was produced according to the following scheme 5:

Scheme 5:

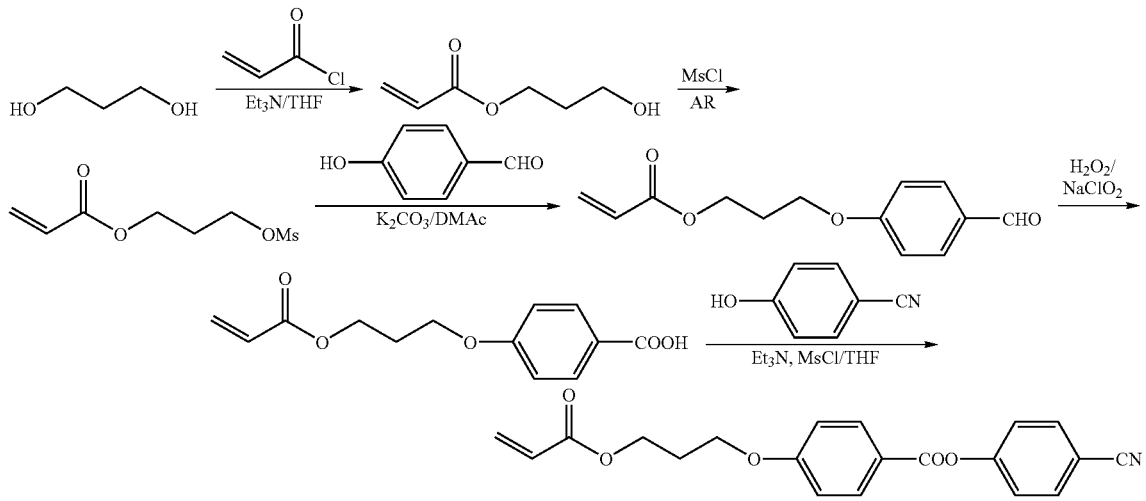

1,3-Propanediol (by Tokyo Kasei) and triethylamine were dissolved in THF, and in an ice-water bath, acryloyl chloride was added thereto. After the reaction, the reaction liquid was washed with aqueous saturated sodium hydrogencarbonate solution added thereto, and then the organic layer was washed with 1 N hydrochloric acid and saturated saline water. The organic layer was dried with anhydrous magnesium sulfate, and the solvent was evaporated away. The crude product was purified through silica gel column chromatography to obtain 32 g of 3-hydroxypropyl acrylate (yield: 50%).

$^1$H-NMR (solvent: CDCl$_3$, standard: tetramethylsilane) δ (ppm): 1.90 (2H, m), 3.70 (2H, t), 4.32 (2H, t), 5.82 (1H, dd), 6.12 (1H, dd), 6.42 (1H, dd).

In the same manner as in Production Example 3 but using 3-hydroxypropyl acrylate in place of 4-hydroxybutyl acrylate, 22 g of 1-cyano-4-(3'-acryloyloxypropyloxy)benzoyloxy)benzene was obtained (overall yield: 34%). This is hereinafter abbreviated as A-28'. Its NMR spectrum is as follows:

$^1$H-NMR (solvent: CDCl$_3$, standard: tetramethylsilane) δ (ppm): 2.20 (2H, quint), 4.15 (2H, t), 4.38 (2H, t), 5.85 (1H, dd), 6.15 (1H, dd), 6.42 (1H, dd), 7.00 (2H, d), 7.35 (2H, d), 7.72 (2H, d), 8.13 (2H, d).

loxy)benzene was obtained (yield: 51%). This is hereinafter abbreviated as A-32'. Its NMR spectrum is as follows:

$^1$H-NMR (solvent: CDCl$_3$, standard: tetramethylsilane) δ (ppm): 1.90 (4H, m), 4.10 (2H, t), 4.26 (2H, t), 5.85 (1H, dd), 6.15 (1H, dd), 6.45 (1H, dd), 6.92 (2H, m), 7.15 (2H, d), 7.35 (2H, d), 8.10 (2H, d).

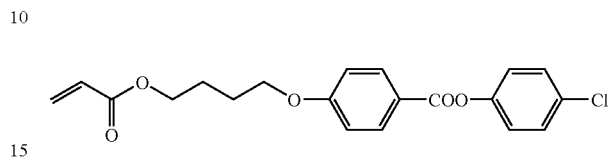

Production Example 10

Production of Polymer AD-1

Polymer AD-1 was produced according to the following scheme:

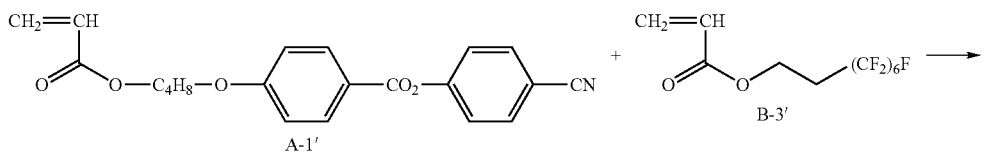

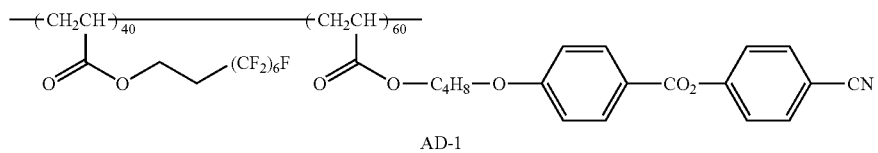

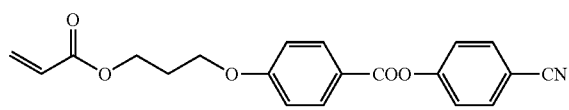

Production Example 9

Monomer A-32'

In the same manner as in Production Example 3 but using 4-chlorophenol (by Tokyo Kasei) in place of 4-hydroxybutyl acrylate, 27 g of 1-chloro-4-(4'-acryloyloxybutoxy)benzoy- N-methylpyrrolidone (5 g) was put into a 100-mL three-neck flask, and heated at 78° C. while nitrogen was introduced thereinto at a flow rate of 35 ml/min. Then, a solution of A-1' (12 g), B-3' (by Daikin Industry, 8 g) and a polymerization initiator (V-65 by Wako Pure Chemical Industries, 200 mg) in N-methylpyrrolidone (20 ml) was dropwise added to it, taking 3 hours. After the addition, this was reacted for 4 hours at the temperature at which it was. Next, the reaction system was restored to room temperature, and then slowly introduced into methanol (800 ml) kept stirred. Then, the precipitated polymer was taken out through suction filtration, and then dried. 14.5 g of a polymer, AD-1 for use in the invention was thus produced. Through GPC (in terms of polystyrene), the data of the polymer were as follows: Mn=10,000. Mw/Mn=2.30. The proportion of the obtained polymer was confirmed through $^1$H-NMR.

Production Example 11

Production of Polymer AD-2

Polymer AD-2 was produced according to the following scheme:

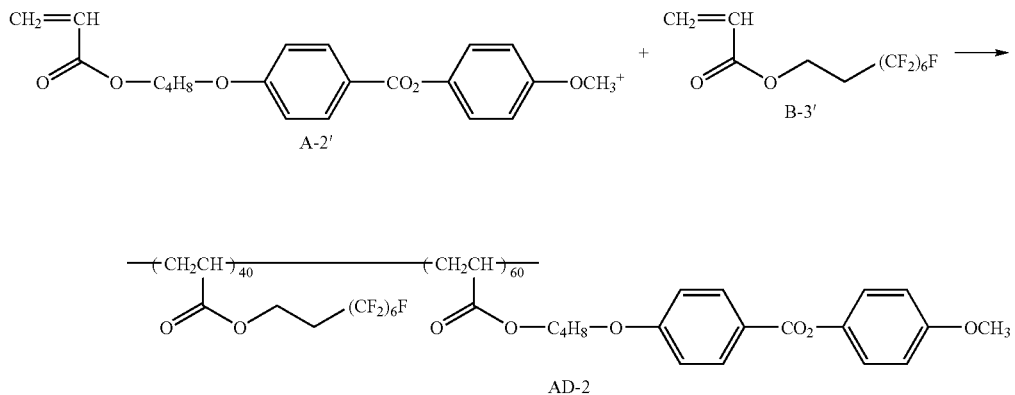

Polymer AD-2 (14.0 g) was obtained in the same manner as in Production Example 10, for which, however, A-2' was used in place of A-1'. Through GPC (in terms of polystyrene), the data of the polymer were as follows: Mn=9,000. Mw/Mn=2.45. The proportion of the obtained polymer was confirmed through $^1$H-NMR.

Production Example 12

Production of Polymer AD-3

Polymer AD-3 was produced according to the following scheme:

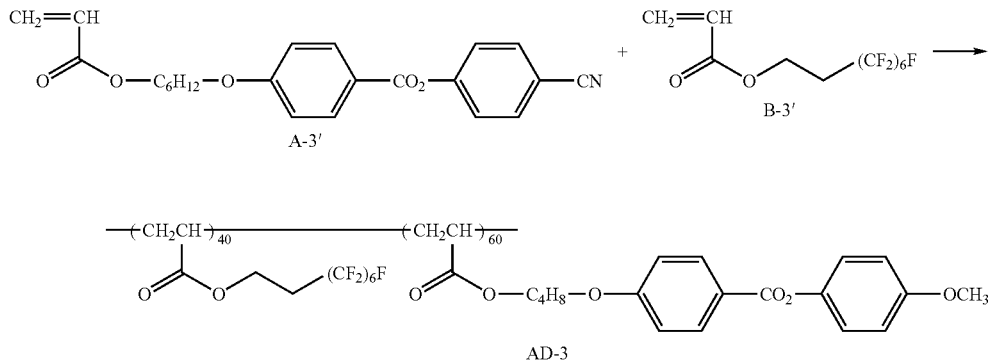

Polymer AD-3 (13.8 g) was obtained in the same manner as in Production Example 10, for which, however, A-3' was used in place of A-1'. Through GPC (in terms of polystyrene), the data of the polymer were as follows: Mn=12,000. Mw/Mn=2.20. The proportion of the obtained polymer was confirmed through $^1$H-NMR.

Production Example 13

Production of Polymer AD-12

Polymer AD-12 was produced according to the following scheme:

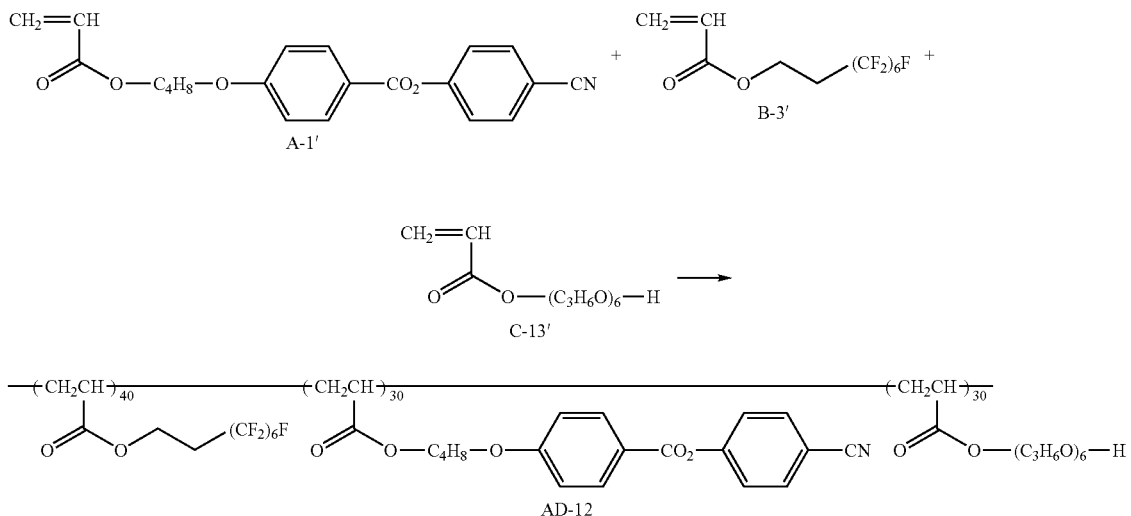

N-methylpyrrolidone (5 g) was put into a 100-mL three-neck flask, and heated at 78° C. while nitrogen was introduced thereinto at a flow rate of 35 ml/min. Then, a solution of A-1' (6 g), B-3' (by Daikin Industry, 8 g), C-13' (Blemmer AP-400 by Nippon Yushi, 6 g) and a polymerization initiator (V-601 by Wako Pure Chemical Industries, 600 mg) in N-methylpyrrolidone (15 ml) was dropwise added to it, taking 3 hours. After the addition, this was reacted for 4 hours at the temperature at which it was. Next, the reaction system was restored to room temperature, and then slowly introduced into methanol/water mixture (800 ml) kept stirred. Then, the precipitated polymer was taken out through suction filtration, and then dried. 10.2 g of a polymer, AD-12 for use in the invention was thus produced. Through GPC (in terms of polystyrene), the data of the polymer were as follows: Mn=16,500. Mw/Mn=2.45.

Production Example 14

Production of Polymer AD-13

Polymer AD-13 was produced according to the following scheme:

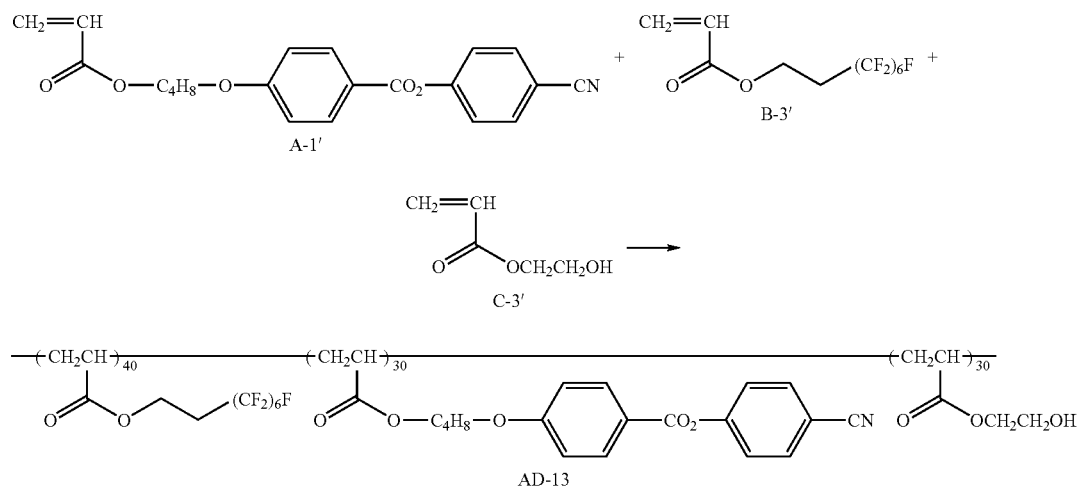

Polymer AD-13 (13.5 g) was obtained in the same manner as in Production Example 13, for which, however, C-3' was used in place of C-13'. Through GPC (in terms of polystyrene), the data of the polymer were as follows: Mn=12,000. Mw/Mn=2.35.

Production Example 15

Production of Polymer AD-21

Polymer AD-21 was produced according to the following scheme:

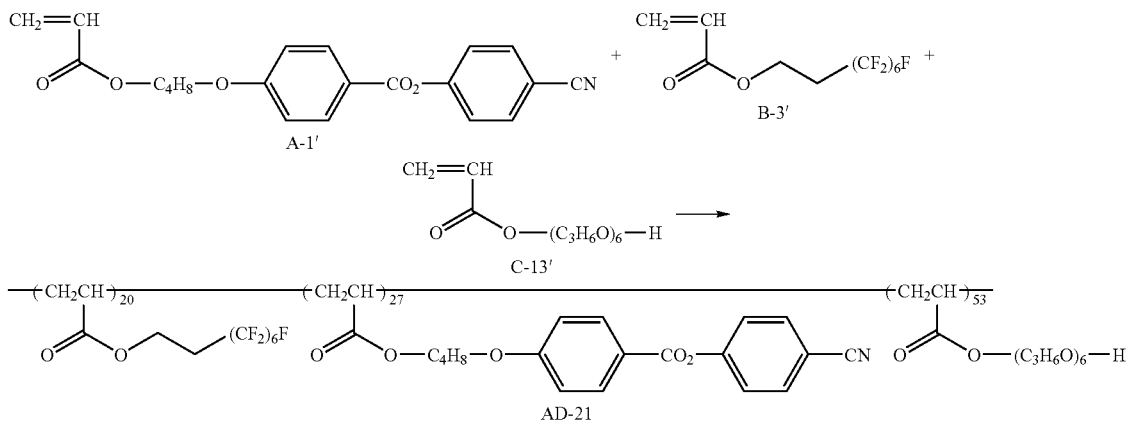

Production Example 16
Production of Polymer AD-22

Polymer AD-22 was produced according to the following scheme:

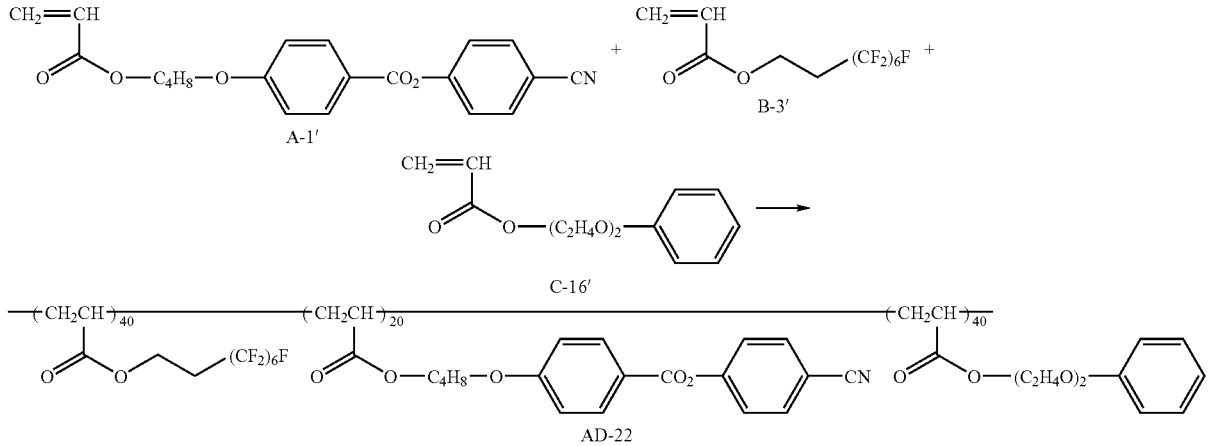

N,N-dimethylacetamide (DMAc) (4 g) was put into a 100-mL three-neck flask, and heated at 78° C. while nitrogen was introduced thereinto at a flow rate of 35 ml/min. Then, a solution of A-1' (4.3 g), B-3' (by Daikin Industry, 3.2 g), C-13' (Blemmer AP-400 by Nippon Yushi, 8.5 g) and a polymerization initiator (V-601 by Wako Pure Chemical Industries, 600 mg) in N,N-dimethylacetamide (DMAc, 8 g) was dropwise added to it, taking 3 hours. After the addition, this was reacted for 4 hours at the temperature at which it was. Next, the reaction system was restored to room temperature, and then slowly introduced into methanol/water mixture (10/90 by volume, 800 ml) kept stirred. Then, the precipitated polymer was taken out through centrifugation, and then dried. 14.7 g of a polymer, AD-21 for use in the invention was thus produced. Through GPC (in terms of polystyrene), the data of the polymer were as follows: $Mn=16,000$. $Mw/Mn=2.52$.

Methyl ethyl ketone (MEK) (4 g) was put into a 100-mL three-neck flask, and heated at 78° C. while nitrogen was introduced thereinto at a flow rate of 35 ml/min. Then, a solution of A-1' (3.2 g), B-3' (by Daikin Industry, 6.4 g), C-16' (NK ester, AMP-20G by Shin-Nakamura Chemical Industry, 6.4 g) and a polymerization initiator (V-601 by Wako Pure Chemical Industries, 600 mg) in methyl ethyl ketone (MEK, 8 g) was dropwise added to it, taking 3 hours. After the addition, this was reacted for 4 hours at the temperature at which it was. Next, the reaction system was restored to room temperature, and then slowly introduced into methanol/water mixture (10/90 by volume, 800 ml) kept stirred. Then, the precipitated polymer was taken out through centrifugation, and then dried. 13.0 g of a polymer, AD-22 for use in the invention was thus produced. Through GPC (in terms of polystyrene), the data of the polymer were as follows: $Mn=18,000$. $Mw/Mn=2.70$.

Production Example 17

Production of Polymer AD-23

Polymer AD-23 was produced according to the following scheme:

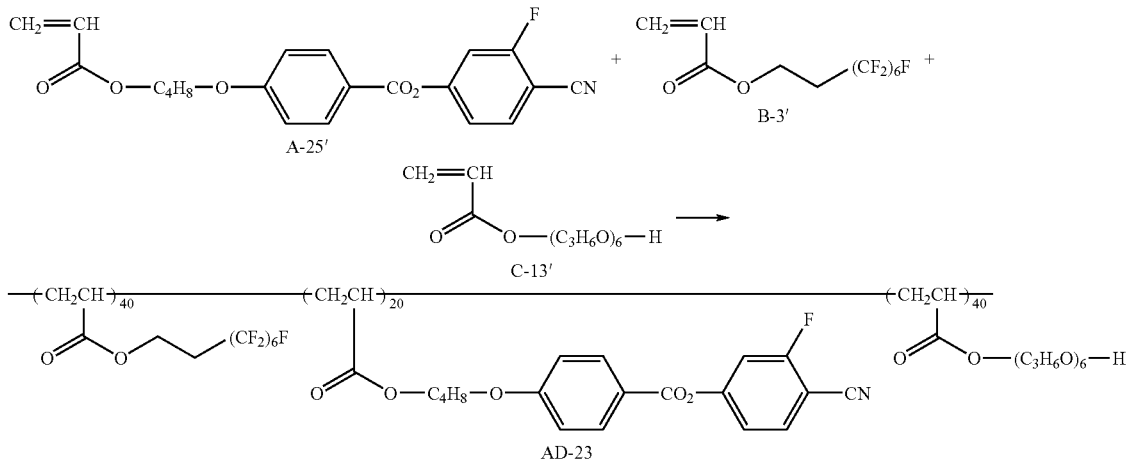

Methyl ethyl ketone (MEK) (4 g) was put into a 100-mL three-neck flask, and heated at 78° C. while nitrogen was introduced thereinto at a flow rate of 35 ml/min. Then, a solution of A-25' (3.2 g), B-3' (by Daikin Industry, 6.4 g), C-13' (Blemmer AP-400 by Nippon Yushi, 6.4 g) and a polymerization initiator (V-601 by Wako Pure Chemical Industries, 600 mg) in methyl ethyl ketone (MEK, 8 g) was dropwise added to it, taking 3 hours. After the addition, this was reacted for 4 hours at the temperature at which it was. Next, the reaction system was restored to room temperature, and then slowly introduced into methanol/water mixture (10/90 by volume, 800 ml) kept stirred. Then, the precipitated polymer was taken out through centrifugation, and then dried. 14.6 g of a polymer, AD-23 for use in the invention was thus produced. Through GPC (in terms of polystyrene), the data of the polymer were as follows: Mn=15,000. Mw/Mn=2.44.

Production Example 18

Production of Polymer AD-24

Polymer AD-24 was produced according to the following scheme:

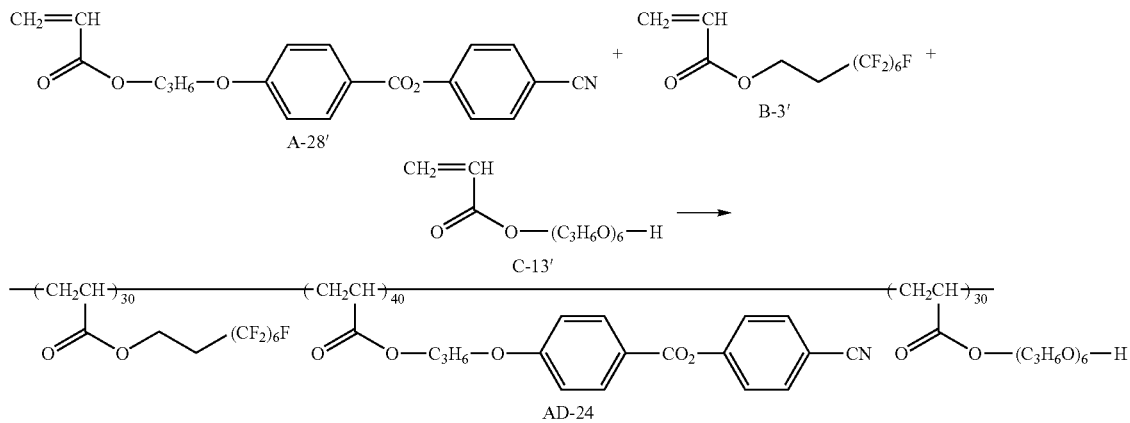

N,N-dimethylacetamide (DMAc) (4 g) was put into a 100-mL three-neck flask, and heated at 78° C. while nitrogen was introduced thereinto at a flow rate of 35 ml/min. Then, a solution of A-28' (6.4 g), B-3' (by Daikin Industry, 4.8 g), C-13' (Blemmer AP-400 by Nippon Yushi, 4.8 g) and a polymerization initiator (V-601 by Wako Pure Chemical Industries, 600 mg) in N,N-dimethylacetamide (DMAc, 8 g) was dropwise added to it, taking 3 hours. After the addition, this was reacted for 4 hours at the temperature at which it was. Next, the reaction system was restored to room temperature, and then slowly introduced into methanol/water mixture (10/90 by volume, 800 ml) kept stirred. Then, the precipitated polymer was taken out through centrifugation, and then dried. 15.0 g of a polymer, AD-24 for use in the invention was thus produced. Through GPC (in terms of polystyrene), the data of the polymer were as follows: Mn=21,000. Mw/Mn=2.30.

Production Example 19

Production of AD-25

Polymer AD-25 was produced according to the following scheme:

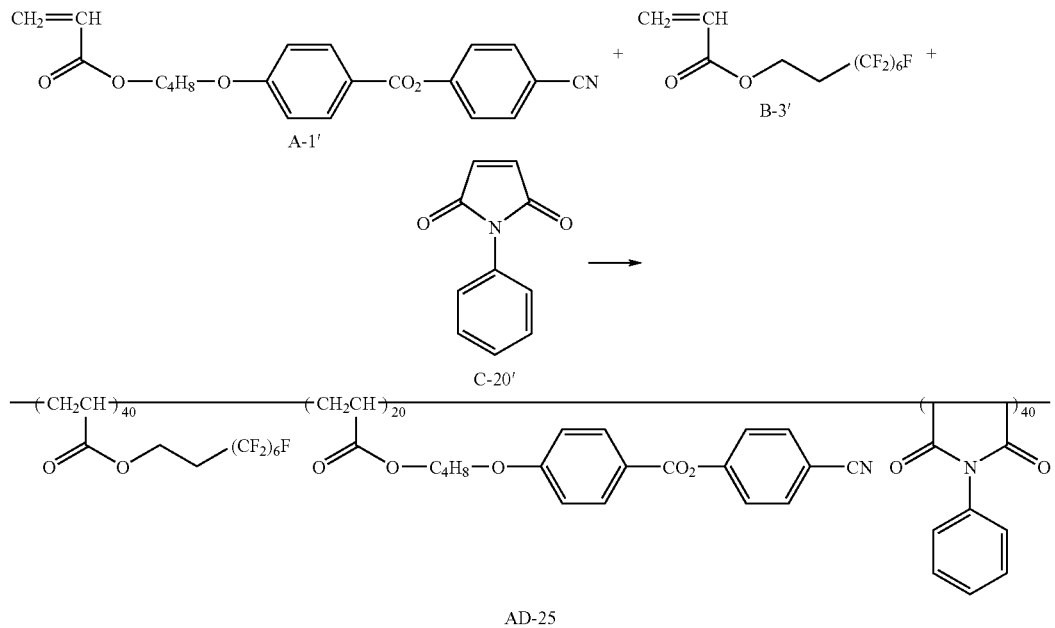

AD-25

Methyl ethyl ketone (MEK) (4 g) was put into a 100-mL three-neck flask, and heated at 78° C. while nitrogen was introduced thereinto at a flow rate of 35 ml/min. Then, a solution of A-1' (3.2 g), B-3' (by Daikin Industry, 6.4 g), C-20' (by Tokyo Kasei, 6.4 g) and a polymerization initiator (V-601 by Wako Pure Chemical Industries, 600 mg) in methyl ethyl ketone (MEK, 8 g) was dropwise added to it, taking 3 hours. After the addition, this was reacted for 4 hours at the temperature at which it was. Next, the reaction system was restored to room temperature, and then slowly introduced into methanol (800 ml) kept stirred. Then, the precipitated polymer was taken out through centrifugation, and then dried. 14.0 g of a polymer, AD-25 for use in the invention was thus produced. Through GPC (in terms of polystyrene), the data of the polymer were as follows: Mn=19,000. Mw/Mn=2.60.

Production Example 20

Production of Polymer AD-26

Polymer AD-26 was produced according to the following scheme:

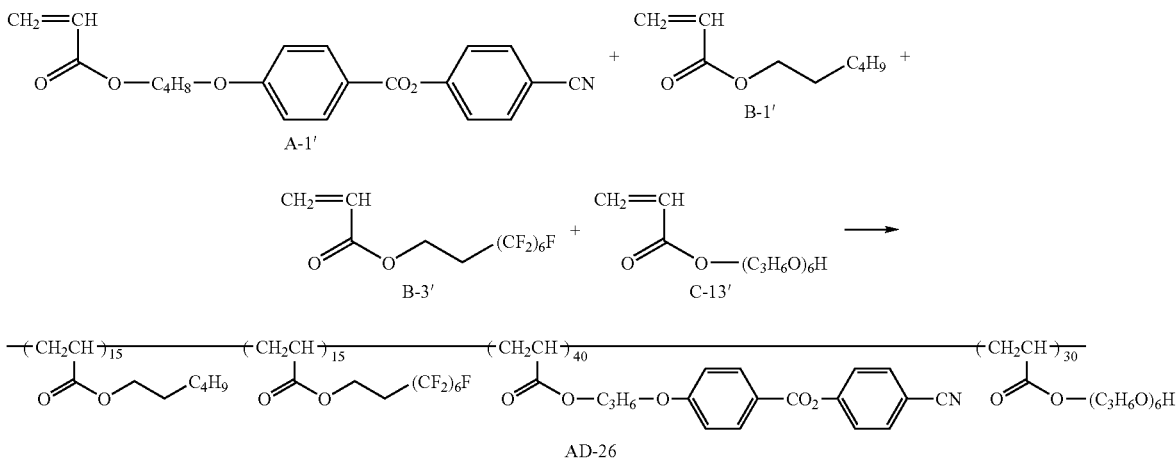

AD-26

N,N-dimethylacetamide (DMAc) (4 g) was put into a 100-mL three-neck flask, and heated at 78° C. while nitrogen was introduced thereinto at a flow rate of 35 ml/min. Then, a solution of A-1' (6.4 g), B-1' (by Daikin Industry, 2.4 g), B-3' (by Daikin Industry, 2.4 g), C-13' (Blemmer AP-400 by Nippon Yushi, 4.8 g) and a polymerization initiator (V-601 by Wako Pure Chemical Industries, 600 mg) in N,N-dimethylacetamide (DMAc, 8 g) was dropwise added to it, taking 3 hours. After the addition, this was reacted for 4 hours at the temperature at which it was. Next, the reaction system was restored to room temperature, and then slowly introduced into methanol/water mixture (10/90 by volume, 800 ml) kept stirred. Then, the precipitated polymer was taken out through centrifugation, and then dried. 15.0 g of a polymer, AD-26 for use in the invention was thus produced. Through GPC (in terms of polystyrene), the data of the polymer were as follows: Mn=17,500. Mw/Mn=2.42.

Production Example 21

Production of Polymer AD-27

Polymer AD-27 was produced according to the following scheme:

N,N-dimethylacetamide (DMAc) (4 g) was put into a 100-mL three-neck flask, and heated at 78° C. while nitrogen was introduced thereinto at a flow rate of 35 ml/min. Then, a solution of A-1' (6.4 g), B-3' (by Daikin Industry, 4.8 g), C-13' (Blemmer AP-400 by Nippon Yushi, 2.4 g), C-20' (by Tokyo Kasei, 2.4 g) and a polymerization initiator (V-601 by Wako Pure Chemical Industries, 600 mg) in N,N-dimethylacetamide (DMAc, 8 g) was dropwise added to it, taking 3 hours. After the addition, this was reacted for 4 hours at the temperature at which it was. Next, the reaction system was restored to room temperature, and then slowly introduced into methanol/water mixture (10/90 by volume, 800 ml) kept stirred. Then, the precipitated polymer was taken out through centrifugation, and then dried. 15.2 g of a polymer, AD-27 for use in the invention was thus produced. Through GPC (in terms of polystyrene), the data of the polymer were as follows: Mn=14,600. Mw/Mn=2.30.

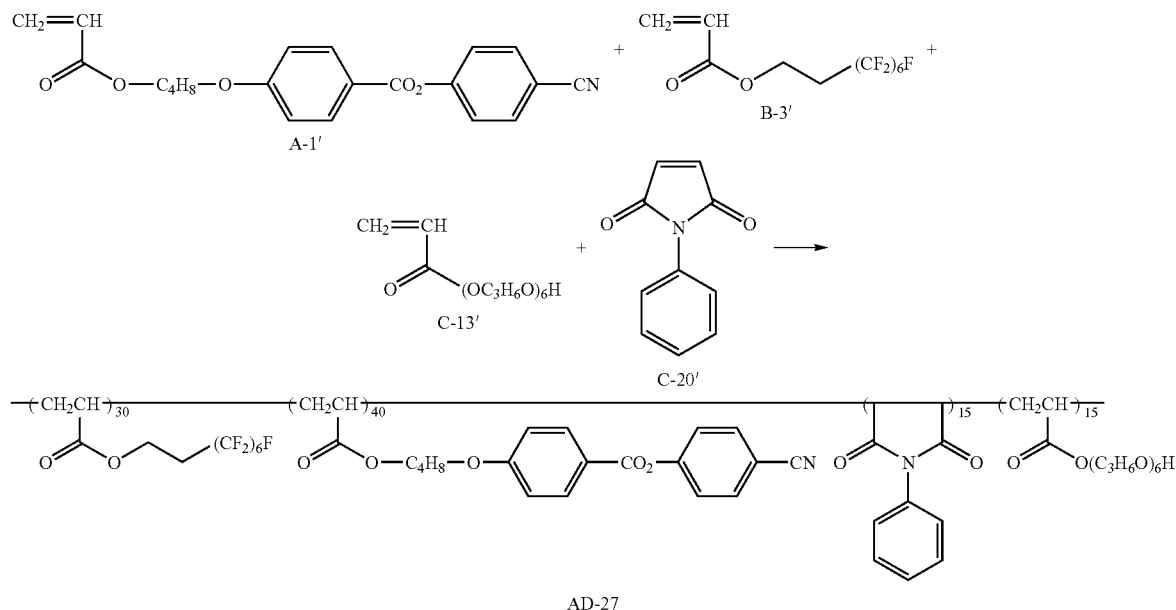

Production Example 22
Production of Comparative Polymer AD-R
Polymer AD-R was produced according to the following scheme:

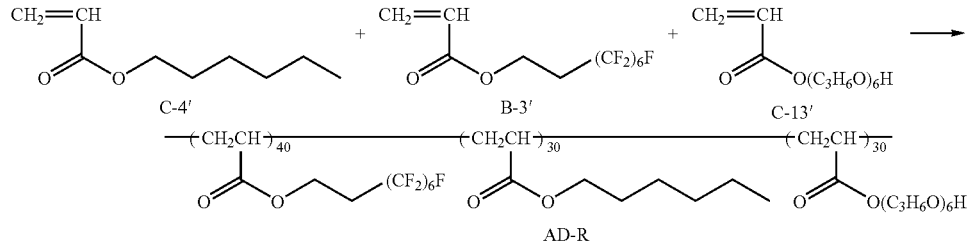

Methyl ethyl ketone (MEK) (4 g) was put into a 100-mL three-neck flask, and heated at 78° C. while nitrogen was introduced thereinto at a flow rate of 35 ml/min. Then, a solution of C-4' (by Tokyo Kasei, 4.8 g), B-3' (by Daikin Industry, 6.4 g), C-13' (Blemmer AP-400 by Nippon Yushi, 4.8 g) and a polymerization initiator (V-601 by Wako Pure Chemical Industries, 600 mg) in methyl ethyl ketone (MEK, 8 g) was dropwise added to it, taking 3 hours. After the addition, this was reacted for 4 hours at the temperature at which it was. Next, the reaction system was restored to room temperature, and then slowly introduced into methanol (800 ml) kept stirred. Then, the precipitated polymer was taken out through centrifugation, and then dried. 15.2 g of a comparative polymer (AD-R), which is used for comparison with the invention, was thus produced. Through GPC (in terms of polystyrene), the data of the polymer were as follows: Mn=13,000. Mw/Mn=2.50.

Example 1

Preparation of Composition (LM-1) of the Invention

A liquid-crystal compound (D3-12), a polymer for use in the invention (AD-1), an photopolymerization initiator, Irgacure 907 (by Ciba Speciality Chemicals), and an optical sensitizer, diethylthioxanthone were weighed out in a ratio to give the composition mentioned below, and dissolved in methyl ethyl ketone to prepare a composition of the invention (LM-1).
Composition of (LM-1):
  Liquid-crystal compound, D3-12 100 parts by mass
  Polymer for use in the invention, AD-1 0.4 parts by mass
  Irgacure 907 (by Ciba Speciality Chemicals) 3.0 parts by mass
  Diethylthioxanthone 1.0 part by mass
  Methyl ethyl ketone 250 parts by mass Example 2

Preparation of Compositions (LM-2 to LM-10) of the Invention

Compositions of the invention, (LM-2) to (LM-10) were prepared in the same manner as in Example 1, for which, however, the polymer (AD-1) was changed to a polymer shown in Table 2 below.

Example 3

Preparation of Compositions (LM-11 to LM-17) of the Invention

A composition of the invention (LM-11) was prepared in the same manner as in Example 1, to which, however, 0.5 parts by mass of the following surfactant (F-22) was added. In the same manner as that for the composition (LM-11), other compositions of the invention (LM-12 to LM-17) were prepared, for which, however, the polymer (AD-1) was changed to a polymer shown in Table 2 below.

Surfactant F-22:

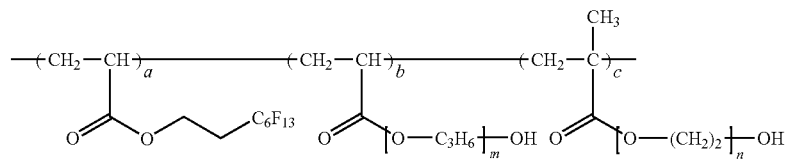

$a/b/c=40/55/5$ wt %, $m \approx 8$, $n \approx 11$

Comparative Example 1

Preparation of Comparative Compositions (LH-1, LH-2, LH-3)

A comparative composition (LH-1) was prepared in the same manner as that for the composition (LM-1) in Example 1, to which, however, the polymer (AD-1) was not added. A comparative composition (LH-2) was prepared in the same manner as that for the composition (LM-11) in Example 3, to which, however, the polymer (AD-1) was not added. A comparative composition (LH-3) was prepared in the same manner as that for the composition (LM-1) in Example 1, to which, however, the polymer (AD-R) that had been produced for comparison with the invention was added in place of the polymer (AD-1).

TABLE 2

|  | Composition | Liquid-Crystal Compound | Polymer | Surfactant |
|---|---|---|---|---|
| Example 1 | LM-1 | D3-12 | AD-1 | no |
| Example 2 | LM-2 | D3-12 | AD-4 | no |
|  | LM-3 | D3-12 | AD-5 | no |
|  | LM-4 | D3-12 | AD-12 | no |
|  | LM-5 | D3-12 | AD-15 | no |
|  | LM-6 | D3-12 | AD-21 | no |
|  | LM-7 | D3-12 | AD-22 | no |
|  | LM-8 | D3-12 | AD-24 | no |
|  | LM-9 | D3-12 | AD-25 | no |
|  | LM-10 | D3-12 | AD-27 | no |
| Example 3 | LM-11 | D3-12 | AD-1 | F-22 |
|  | LM-12 | D3-12 | AD-12 | F-22 |
|  | LM-13 | D3-12 | AD-21 | F-22 |
|  | LM-14 | D3-12 | AD-22 | F-22 |
|  | LM-15 | D3-12 | AD-24 | F-22 |
|  | LM-16 | D3-12 | AD-25 | F-22 |
|  | LM-17 | D3-12 | AD-27 | F-22 |
| Comparative Example 1 | LH-1 | D3-12 | no | no |
|  | LH-2 | D3-12 | no | F-22 |
|  | LH-3 | D3-12 | AD-R | no |

Example 4

Formation of Retardation Plate of the Invention (RM-1)

Preparation of Transparent Support:

The following ingredients were put into a mixing tank, and stirred under heat to prepare a cellulose acetate solution (this may be hereinafter referred to as "dope").

| Composition of Cellulose Acetate Solution: | |
| --- | --- |
| Cellulose acetate having a degree of acetylation of 60.9% | 100 parts by mass |
| Triphenyl phosphate | 6.5 parts by mass |
| Biphenyldiphenyl phosphate | 5.2 parts by mass |
| Retardation Improver (1) mentioned below | 0.1 parts by mass |
| Retardation Improver (2) mentioned below | 0.2 parts by mass |
| Methylene chloride | 310.25 parts by mass |
| Methanol | 54.75 parts by mass |
| 1-Butanol | 10.95 parts by mass |

Retardation Improver (1)

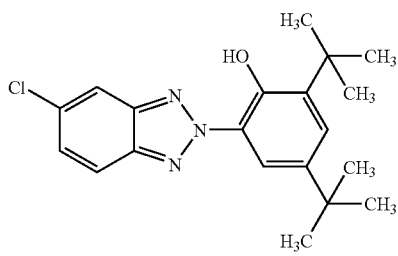

Retardation Improver (2):

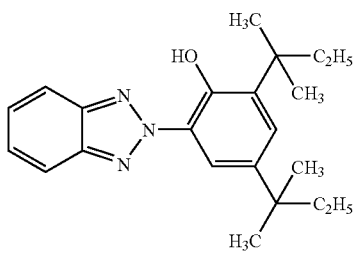

The resulting dope was cast on a drum cooled at 0° C., through a casting port. The film was peeled away when the solvent content thereof was 70% by mass. Both edges of the film in the cross direction were fixed with a pin tenter, and the film was dried in such a manner that the range of the solvent content thereof could be from 3 to 5% by mass and the draw ratio in stretching of the film in the cross direction (in the direction vertical to the machine direction) could be 3%. Next, the film was conveyed between rolls in a heating device, in which the film was further dried at a temperature over 120° C. in such a manner that the draw ratio in the machine direction could be substantially 0% and that the ratio of the draw ratio in the cross direction to the draw ratio in the machine direction could be 0.75. The process gave a cellulose acetate film having a thickness of 100 μm. Thus produced, the retardation of the film was measured at a wavelength of 632.8 nm. The retardation of the film in the thickness direction was 40 nm; and the in-plane retardation of the film was 4 nm. The cellulose acetate film was used as a support.

Formation of First Undercoat Layer:

A coating liquid having the composition mentioned below was applied onto the above transparent support in an amount of 28 mL/m², and dried to form a first undercoat layer thereon.

| Composition of Coating Liquid for first undercoat layer: | |
| --- | --- |
| Gelatin | 5.44 parts by mass |
| Formaldehyde | 1.38 parts by mass |
| Salicylic acid | 1.62 parts by mass |
| Acetone | 391 parts by mass |
| Methanol | 158 parts by mass |
| Methylene chloride | 406 parts by mass |
| Water | 12 parts by mass |

Formation of Second Undercoat Layer:

A coating liquid having the composition mentioned below was applied onto the first undercoat layer in an amount of 7 mL/m², and dried to form a second undercoat layer thereon.

| Composition of Coating Liquid for second undercoat layer: | |
| --- | --- |
| Anionic polymer mentioned below | 0.77 parts by mass |
| Monoethyl citrate | 10.1 parts by mass |
| Acetone | 200 parts by mass |
| Methanol | 877 parts by mass |
| Water | 40.5 parts by mass |

Anionic Polymer:

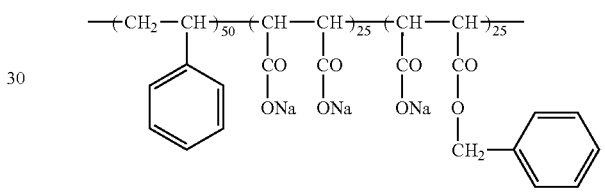

Formation of Back Layer:

A coating liquid having the composition mentioned below was applied onto the back surface of the transparent support in an amount of 25 mL/m², and dried to form a back layer thereon.

| Composition of Coating Liquid for back layer: | |
| --- | --- |
| Cellulose diacetate having a degree of acetylation of 55% | 6.56 parts by mass |
| Silica-containing mat agent (mean particle size, 1 μm) | 0.65 parts by mass |
| Acetone | 679 parts by mass |
| Methanol | 104 parts by mass |

Formation of Alignment Film:

The following modified polyvinyl alcohol and glutaraldehyde (5% by mass of the modified polyvinyl alcohol) were dissolved in a mixed solvent of methanol/water (20/80 by volume) to prepare a 5 mas. % solution.

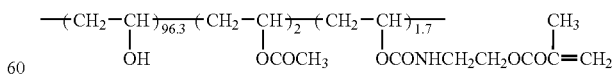

The resulting solution was applied onto the second undercoat layer, dried with hot air at 100° C. for 120 seconds, and rubbed to form an alignment film thereon. The thickness of the thus-formed alignment film was 0.5 μm. The rubbing direction of the alignment film was parallel to the casting direction of the transparent support.

Formation of Optically-Anisotropic Layer:

A coating liquid of the composition (LM-1) of the invention that had been prepared in Example 1 was applied onto the rubbing-treated surface of the alignment film formed in the above, using a wire bar. The film thus coated with an optically-anisotropic layer was aligned in a thermostat tank at 120° C., at which the film was irradiated with UV rays at 200 mJ/cm$^2$ to thereby fix the alignment state of the optically-anisotropic layer. This was cooled to room temperature, and the process gave a retardation plate of the invention (RM-1). The thickness of the optically-anisotropic layer formed in the plate was about 1.0 μm.

Example 5

Formation of Retardation Plates of the Invention (RM-2 to RM-17)

Retardation plates (RM-2) to (RM-17) were produced in the same manner as in Example 4, for which, however, the composition (LM-1) was changed to any of compositions (LM-2) to (LM-17).

Comparative Example 2

Formation of Comparative Retardation Plates (RH-1, RH-2, RH-3)

Comparative retardation plates (RH-1), (RH-2) and (RH-3) were produced in the same manner as in Example 4, for which, however, the composition (LM-1) was changed to any of compositions (LH-1), (LH-2) and (LH-3).

TABLE 3

|  | Composition | Retardation Plate |
|---|---|---|
| Example 4 | LM-1 | RM-1 |
| Example 5 | LM-2 | RM-2 |
|  | LM-3 | RM-3 |
|  | LM-4 | RM-4 |
|  | LM-5 | RM-5 |
|  | LM-6 | RM-6 |
|  | LM-7 | RM-7 |
|  | LM-8 | RM-8 |
|  | LM-9 | RM-9 |
|  | LM-10 | RM-10 |
|  | LM-11 | RM-11 |
|  | LM-12 | RM-12 |
|  | LM-13 | RM-13 |
|  | LM-14 | RM-14 |
|  | LM-15 | RM-15 |
|  | LM-16 | RM-16 |
|  | LM-17 | RM-17 |
| Comparative | LH-1 | RH-1 |
| Example 2 | LH-2 | RH-2 |
|  | LH-3 | RH-3 |

Evaluation of Retardation Plates:

Example 6

Evaluation of Retardation Plates (RM-1 to RM-17)

Determination of Re, Rth:

Re (589 nm) and Rth (589 nm) mean an in-plane retardation and a thickness-direction retardation at 589 nm, respectively. Re (589 nm) of the retardation plates obtained in Examples 4 and 5 and Comparative Example 2 was measured by applying light having a wavelength of 589 nm in the normal direction of the film, using KOBRA 21ADH (by Oji Scientific Instruments). Rth (589 nm) was determined as follows: Based on three retardation data determined in three different directions, or that is, Re (589 nm) as above, a retardation value measured by applying light having a wavelength of 589 nm to the sample in the direction tilted by +40° relative to the normal direction of the film with the slow axis (judged by KOBRA 21ADH) as the tilt axis (rotation axis) thereof, and a retardation value measured by applying light having a wavelength of 589 nm to the sample in the direction tilted by −40° relative to the normal direction of the film with the slow axis as the tilt axis thereof, Rth (589 nm) was computed by KOBRA 21ADH.

Determination of Mean Tilt Angle:

With the tilt angle θ1 in one face of the above optically-anisotropic layer and the tilt angle θ2 in the other face thereof fitted as variables in order that the calculated data of the angle dependence of the retardation of the optically-anisotropic layer could be the same as the found data thereof, θ1 and θ2 were computed.

The mean value ((θ1+θ2)/2) is the mean tile angle.

Comparative Example 3

Evaluation of Comparative Retardation Plates RH-1 to RH-3

The mean tilt angle of the retardation plates RH-1 to RH-3 was determined in the same manner as above.

Using a microtome, cross-cut ultra-thin pieces of the retardation plates of Example 6 and Comparative Example 3 were prepared, and observed with a polarizing microscope. It was confirmed that the optically-anisotropic layer in the retardation plates of the invention, RM-1 to RM-17, and the comparative retardation plates RH-1 and RH-2 in Comparative Example 3 was in hybrid alignment. It was also confirmed that the optically-anisotropic layer in RH-3 in Comparative Example 3 was in horizontal alignment. Temperature Dependence of Mean Tilt Angle:

In forming the optically-anisotropic layer, the layer was cooled to 100° C. after processed for alignment, and its alignment state was cured through irradiation with UV rays, but the other process was the same as in the above. The mean tilt angle of the sample was determined. The data after alignment fixation at 120° C. were compared with those after alignment at 100° C., and the value of the mean tilt angle difference thus obtained is referred to as mean tilt angle temperature dependence, and shown in Table 4 below.

TABLE 4

| | Retardation Plate | Mean Tilt Angle (120° C.) | Mean Tilt Angle (100° C.) | Mean Tilt Angle Temperature Dependence | Alignment State (observation of cross section) |
|---|---|---|---|---|---|
| Example 6 | RM-1 | about 25° | about 25° | about 0° | hybrid |
| | RM-2 | about 24° | about 25° | about 1° | hybrid |
| | RM-3 | about 26° | about 26° | about 1° | hybrid |
| | RM-4 | about 23° | about 24° | about 1° | hybrid |
| | RM-5 | about 27° | about 28° | about 1° | hybrid |
| | RM-6 | about 15° | about 17° | about 2° | hybrid |
| | RM-7 | about 30° | about 30° | about 0° | hybrid |
| | RM-8 | about 20° | about 21° | about 1° | hybrid |
| | RM-9 | about 30° | about 32° | about 2° | hybrid |
| | RM-10 | about 28° | about 30° | about 2° | hybrid |
| | RM-11 | about 28° | about 29° | about 1° | hybrid |
| | RM-12 | about 29° | about 31° | about 2° | hybrid |
| | RM-13 | about 16° | about 17° | about 1° | hybrid |
| | RM-14 | about 34° | about 36° | about 2° | hybrid |
| | RM-15 | about 22° | about 24° | about 2° | hybrid |
| | RM-16 | about 30° | about 31° | about 1° | hybrid |
| | RM-17 | about 30° | about 32° | about 2° | hybrid |
| Comparative Example 3 | RH-1 | about 34° | about 40° | about 6° | hybrid |
| | RH-2 | about 34° | about 41° | about 7° | hybrid |
| | RH-3 | about 2° | about 3° | about 1° | horizontal |

The results in Table 4 confirm that in the retardation plates of the invention, (RM-1) to (RM-17), the mean tilt angle could be controlled within a range of from 10° to 40°, as compared with that in the comparative retardation plates (RH-1), (RH-2) and (RH-3). In addition, it is also confirmed that the temperature dependence of the mean tilt angle in the retardation plates of the invention is small.

From the results, it is confirmed that, in the retardation plates formed with the composition of the invention that contains a polymer having a group of formula (A) as the constitutive unit thereof, the discotic liquid-crystal molecules can be hybrid-aligned and their alignment has little temperature dependence.

In the retardation plates (RM-11) to (RM-17) formed with a composition that contains both a polymer having a group of formula (A) as the constitutive unit thereof and a polymer not having a group of formula (A) as the constitutive unit thereof (the latter polymer is hereinafter referred to as "surfactant"), the mean tile angle may differ, depending on the content of the fluoroaliphatic group-having monomer-derived constitutive unit of each polymer, as compared with that in the retardation plates (RM-1), (RM-4), (RM-6) to (RM-10) formed with a composition that contains a polymer having a group of formula (A) as the constitutive unit thereof.

Specifically, it is confirmed that, in the samples in which the content of the constitutive unit derived from the fluoroaliphatic group-having monomer of the surfactant is nearly the same as that of the polymer that contains a group of formula (A) as the constitutive unit thereof (in Table 4, (RM-11), (RM-12), (RM-14)), the mean tilt angle is controlled high, as compared with that in the corresponding samples but not containing a surfactant ((RM-1), (RM-4), (RM-7)).

On the other hand, it is confirmed that, in the samples in which the content of the constitutive unit derived from the fluoroaliphatic group-having monomer of the surfactant is lower than that of the polymer that contains a group of formula (A) as the constitutive unit thereof (in Table 4, (RM-13), (RM-15) to (RM-17)), the mean tilt angle doe not almost change, as compared with that in the corresponding samples but not containing a surfactant ((RM-6), (RM-8) to (RM-10)).

These results confirm that the addition of a surfactant makes it possible to control the mean tilt angle to a desired level in accordance with the object of the retardation plates.

These also confirm that a surfactant may be added not causing any change in the mean tile angle. It is confirmed that the mean tilt angle in the retardation plates may be determined by the difference between the content of the constitutive unit derived from the fluoroaliphatic group-having monomer of the surfactant and the content of the constitutive unit derived from the fluoroaliphatic group-having monomer of the polymer for use in the invention that has a structure of formula (A).

The invention claimed is:

1. A composition comprising at least one liquid-crystal compound and a polymer having at least one group of the following formula (A) as a constitutive unit thereof:

wherein Mp represents a trivalent linking group; L represents a single bond, or a divalent linking group; X represents a substituted or unsubstituted cyclic linking group; Y represents a single bond, or a divalent linking group; Z represents a substituted or unsubstituted cyclic group; n indicates an integer of from 1 to 10; when n is 2 or more, then X's and Y's may be the same or different, wherein at least one liquid-crystal compound is represented by the following formula (DI):

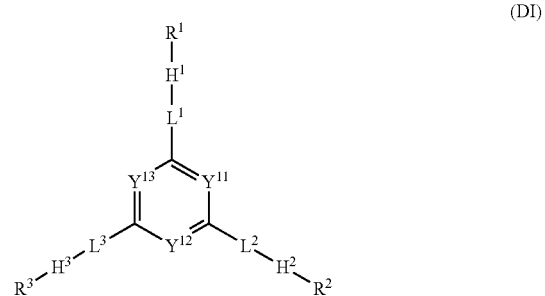

wherein $Y^{11}$, $Y^{12}$ and $Y^{13}$ each independently represent a methine group or a nitrogen atom; $L^1$, $L^2$ and $L^3$ each independently represent a single bond or a divalent linking group; $H^1$, $H^2$ and $H^3$ each independently represent the following formula (DI-A) or (DI-B); $R^1$, $R^2$ and $R^3$ each independently represent the following formula (DI-R):

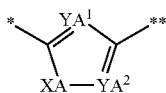 (DI-A)

wherein $YA^1$ and $YA^2$ each independently represent a methine group or a nitrogen atom; XA represents an oxygen atom, a sulfur atom, a methylene group or an imino group; * indicates the position at which the formula bonds to any of $L^1$ to $L^3$; and ** indicates the position at which the formula bonds to any of $R^1$ to $R^3$,

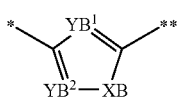 (DI-B)

wherein $YB^1$ and $YB^2$ each independently represent a methine group or a nitrogen atom; XB represents an oxygen atom, a sulfur atom, a methylene group or an imino group; * indicates the position at which the formula bonds to any of $L^1$ to $L^3$; and ** indicates the position at which the formula bonds to any of $R^1$ to $R^3$, (DI-R)

*-$(-L^{21}-F^1)_{n1}$-$L^{22}$-$L^{23}$-$Q^1$ wherein * indicates the position at which the formula bonds to $H^1$, $H^2$ or $H^3$ in formula (DI); $F^1$ represents a divalent linking group having at least one cyclic structure; $L^{21}$ represents a single bond or a divalent linking group; n1 indicates an integer of from 0 to 4; $L^{22}$ represents —O—, —O—CO—, —CO—O—, —O—CO—O—, —S—, —NH—, —SO$_2$—, —CH$_2$—, —CH=CH— or —C≡C—, $L^{23}$ represents a divalent linking group selected from the group consisting of —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^1$ represents a polymerizing group or a hydrogen atom.

2. The composition according to claim 1, wherein X in formula (A) has a liquid-crystalline group.

3. The composition according to claim 1, wherein X in formula (A) is a substituted or unsubstituted cyclic aliphatic group having from 3 to 20 carbon atoms, or a substituted or unsubstituted phenylene group having from 6 to 30 carbon atoms.

4. The composition according to claim 1, wherein in formula (A), Mp is the following Mp-1 or Mp-2:

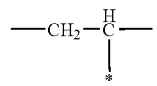 Mp-1

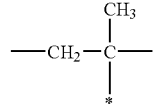 Mp-2 wherein * indicates the linking position to L;

and L is a divalent linking group selected from the group consisting of —O—, —NR$^{a11}$— (where R$^{a11}$ represents a hydrogen atom, a substituted or unsubstituted aliphatic hydrocarbon group having from 1 to 10 carbon atoms, or a substituted or unsubstituted aryl group having from 6 to 20 carbon atoms), —S—, —C(=O)—, —S(=O)$_2$—, and a substituted or unsubstituted alkylene group having from 1 to 20 carbon atoms, and a group formed by linking two or more of these.

5. The composition according to claim 1, wherein in formula (A), Y is a single bond, or a divalent linking group selected from the group consisting of —O—, —NR$^{a12}$— (where R$^{a12}$ represents a hydrogen atom, a substituted or unsubstituted aliphatic hydrocarbon group having from 1 to 10 carbon atoms, or a substituted or unsubstituted aryl group having from 6 to 20 carbon atoms), —S—, —C(=O)—, and —S(=O)$_2$—, and a group formed by linking two or more of these; Z is a substituted or unsubstituted phenyl group; and n is an integer of from 1 to 4.

6. The composition according to claim 1, wherein the polymer further has a constitutive unit derived from a fluoroaliphatic group-having monomer.

7. The composition according to claim 1, which contains a polymer not having a group of formula (A) as a constitutive unit thereof but having a constitutive unit derived from a fluoroaliphatic group-having monomer.

8. The composition according to claim 1, which contains a polymer not having a group of formula (A) as a constitutive unit thereof but having a constitutive unit derived from a fluoroaliphatic group-having monomer and having a hydrophilic group.

9. The composition according to claim 1, which contains a polymer having a repetitive unit of the following formula (F):

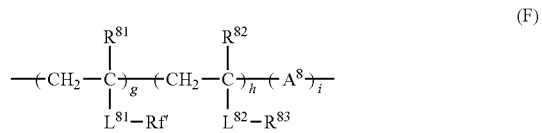 (F)

wherein $R^{81}$ and $R^{82}$ each independently represent a hydrogen atom or a methyl group; $L^{81}$ and $L^{82}$ each independently represent a single bond or a divalent linking group having from 1 to 20 carbon atoms; Rf" represents a fluoroalkyl group having from 1 to 30 carbon atoms; $R^{83}$ represents a hydrogen atom or a hydrophilic group; $A^8$ represents a polymerization unit; g, h and i each indicate a mass fraction of the respective polymerization units.

10. The composition according to claim 1, wherein at least one liquid-crystal compound has a viscosity of from 500 to 1000 mPa·s at 80 to 150° C.

11. The composition according to claim 1, wherein at least one liquid-crystal compound is a liquid-crystal compound of the following formula (DII) or a liquid-crystal compound of the following formula (DIII):

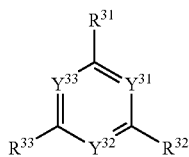

(DII)

wherein $Y^{31}$, $Y^{32}$ and $Y^{33}$ each independently represent a methine group or a nitrogen atom; $R^{31}$, $R^{32}$ and $R^{33}$ each independently represent the following formula (DII-R):

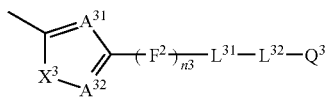

(DII-R)

wherein $A^{31}$ and $A^{32}$ each independently represent a methine group or a nitrogen atom; $X^3$ represents an oxygen atom, a sulfur atom, a methylene group or an imino group; $F^2$ represents a divalent cyclic linking group having a 6-membered cyclic structure; n3 indicates an integer of from 1 to 3; $L^{31}$ represents —O—, —O—CO—, —CO—O—, —O—CO—O—, —S—, —NH—, —SO$_2$—, —CH$_2$—, —CH=CH— or —C≡C—, $L^{32}$ represents a divalent linking group selected from the group consisting of —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^3$ represents a polymerizing group or a hydrogen atom,

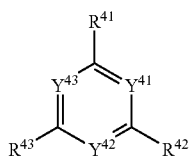

(DIII)

wherein $Y^{41}$, $Y^{42}$ and $Y^{43}$ each independently represent a methine group or a nitrogen atom; $R^{41}$, $R^{42}$ and $R^{43}$ each independently represent the following formula (DIII-A), (DIII-B) or (DIII-C):

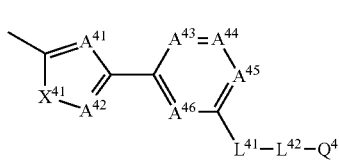

(DIII-A)

wherein $A^{41}$, $A^{42}$, $A^{43}$, $A^{44}$, $A^{45}$ and $A^{46}$ each independently represent a methine group or a nitrogen atom; $X^{41}$ represents an oxygen atom, a sulfur atom, a methylene group or an imino group; $L^{41}$ represents —O—, —O—CO—, —CO—O—, —O—CO—O—, —S—, —NH—, —SO$_2$—, —CH$_2$—, —CH=CH— or —C≡C—, $L^{42}$ represents a divalent linking group selected from the group consisting of —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^4$ represents a polymerizing group or a hydrogen atom,

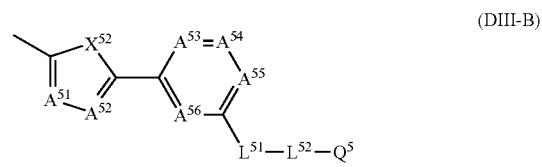

(DIII-B)

wherein $A^{51}$, $A^{52}$, $A^{53}$, $A^{54}$, $A^{55}$ and $A^{56}$ each independently represent a methine group or a nitrogen atom; $X^{52}$ represents an oxygen atom, a sulfur atom, a methylene group or an imino group; $L^{51}$ represents —O—, —O—CO—, —CO—O—, —O—CO—O—, —S—, —NH—, —SO$_2$—, —CH$_2$—, —CH=CH— or —C≡C—, $L^{52}$ represents a divalent linking group selected from the group consisting of —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^5$ represents a polymerizing group or a hydrogen atom,

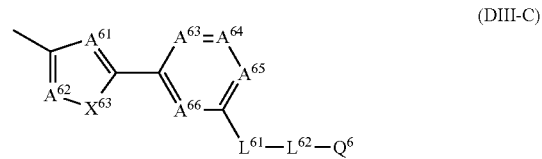

(DIII-C)

wherein $A^{61}$, $A^{62}$, $A^{63}$, $A^{64}$, $A^{65}$ and $A^{66}$ each independently represent a methine group or a nitrogen atom; $X^{63}$ represents an oxygen atom, a sulfur atom, a methine group or an imino group; $L^{61}$ represents —O—, —O—CO—, —CO—O—, —O—CO—O—, —S—, —NH—, —SO$_2$—, —CH$_2$—, —CH=CH— or —C≡C—, $L^{62}$ represents a divalent linking group selected from the group consisting of —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^6$ represents a polymerizing group or a hydrogen atom.

12. A retardation plate having an optically-anisotropic layer formed with a composition of claim 1.

13. A liquid-crystal display device having a retardation plate of claim 12.

14. A method for producing a retardation plate, which comprises forming an optically-anisotropic layer with a composition of claim 1.

* * * * *